United States Patent
Mano et al.

(10) Patent No.: US 12,459,419 B2
(45) Date of Patent: Nov. 4, 2025

(54) VEHICLE HEADLIGHT HAVING AN IMAGING GENERATION UNIT AND A MATRIX LIGHT SOURCE UNIT FOR PRODUCING OVERLAPPING IMAGES IN A LIGHT DISTRIBUTION

(71) Applicant: KOITO MANUFACTURING CO., LTD., Tokyo (JP)

(72) Inventors: Mitsuharu Mano, Shizuoka (JP);
Naoki Kawabata, Shizuoka (JP);
Tomoki Wakasugi, Shizuoka (JP);
Shuji Matsuura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/716,740

(22) PCT Filed: Dec. 6, 2022

(86) PCT No.: PCT/JP2022/044996
§ 371 (c)(1),
(2) Date: Dec. 12, 2024

(87) PCT Pub. No.: WO2023/106304
PCT Pub. Date: Jun. 15, 2023

(65) Prior Publication Data
US 2025/0121767 A1    Apr. 17, 2025

(30) Foreign Application Priority Data

Dec. 8, 2021  (JP) ................................. 2021-199385
Dec. 8, 2021  (JP) ................................. 2021-199386

(Continued)

(51) Int. Cl.
*F21S 41/153*  (2018.01)
*B60Q 1/08*  (2006.01)
*B60Q 1/14*  (2006.01)

(52) U.S. Cl.
CPC ............. *B60Q 1/08* (2013.01); *B60Q 1/1423* (2013.01); *F21S 41/153* (2018.01)

(58) Field of Classification Search
CPC ....... F21S 41/153; B60Q 1/14; B60Q 1/1407; B60Q 1/1415; B60Q 1/1423; B60Q 1/143;

(Continued)

(56) References Cited

U.S. PATENT DOCUMENTS 11,713,861 B2 *  8/2023  Huester ................. F21S 41/663
362/512
2014/0029289 A1   1/2014  Mochizuki et al.

(Continued)

FOREIGN PATENT DOCUMENTS

DE    102018123407 A1    3/2020
FR    3096433 A1    11/2020

(Continued)

OTHER PUBLICATIONS

Extended European Search Report issued Mar. 7, 2025 in Application No. 22904232.0.

(Continued)

*Primary Examiner* — Robert J May
(74) *Attorney, Agent, or Firm* — Sughrue Mion, PLLC

(57) ABSTRACT

A vehicle headlight includes: an image generation unit; a light source unit configured to emit light based on an image generated by the image generation unit; and a memory configured to store a reference image for forming a reference light distribution pattern and a plurality of additional images, in which each of the plurality of additional images (Continued)

is one of a plurality of darkened images, and a plurality of brightened images, and the image generation unit generates the image for forming a predetermined light distribution pattern by light emitted from the light source unit by selecting at least one additional image and superimposing the selected additional image on a part of the reference image, the predetermined light distribution pattern being obtained by changing an amount of light of a predetermined region overlapping a predetermined target object in the reference light distribution pattern.

10 Claims, 31 Drawing Sheets

(30) Foreign Application Priority Data

| Dec. 8, 2021 | (JP) | 2021-199387 |
|---|---|---|
| Dec. 8, 2021 | (JP) | 2021-199388 |
| Dec. 24, 2021 | (JP) | 2021-211415 |

(58) Field of Classification Search
CPC .. B60Q 1/1438; B60Q 1/1446; B60Q 1/1453; B60Q 1/1461; B60Q 1/1469; B60Q 1/1476; B60Q 1/1484; B60Q 1/1492
See application file for complete search history.

(56) References Cited

U.S. PATENT DOCUMENTS

| 2016/0040848 A1 | 2/2016 | Tsukamoto |
| 2020/0215963 A1 | 7/2020 | Lahmer |
| 2022/0203883 A1 | 6/2022 | Prat et al. |
| 2023/0098917 A1 | 3/2023 | Mochizuki et al. |
| 2023/0142677 A1 | 5/2023 | Sugimoto |

FOREIGN PATENT DOCUMENTS

| JP | 2014-24399 A | 2/2014 |
| JP | 2016-39110 A | 3/2016 |
| JP | 2020-69986 A | 5/2020 |
| WO | 2019/028483 A1 | 2/2019 |
| WO | 2021/182151 A1 | 9/2021 |
| WO | 2021/200701 A1 | 10/2021 |

OTHER PUBLICATIONS

International Search Report for PCT/JP2022/044996 dated Feb. 14, 2023 (PCT/ISA/210).

* cited by examiner

VEHICLE HEADLIGHT HAVING AN IMAGING GENERATION UNIT AND A MATRIX LIGHT SOURCE UNIT FOR PRODUCING OVERLAPPING IMAGES IN A LIGHT DISTRIBUTION

CROSS REFERENCE TO RELATED APPLICATIONS

This application is a National Stage of International Application No. PCT/JP2022/044996 filed Dec. 6, 2022, claiming priorities based on Japanese Patent Application No. 2021-199385 filed Dec. 8, 2021, Japanese Patent Application No. 2021-199386 filed Dec. 8, 2021, Japanese Patent Application No. 2021-199387 filed Dec. 8, 2021, Japanese Patent Application No. 2021-199388 filed Dec. 8, 2021 and on Japanese Patent Application No. 2021-211415 filed Dec. 24, 2021.

TECHNICAL FIELD

The present invention relates to a vehicle headlight.

BACKGROUND ART

A vehicle headlight that changes a light distribution pattern of emitted light is known as a vehicle headlight typified by an automobile headlight, and Patent Literature 1 below discloses such a vehicle headlight.

The vehicle headlight described in Patent Literature 1 below includes a light distribution pattern forming unit including a micro light emitting diode (LED) array and a memory. The light distribution pattern forming unit can form a light distribution pattern corresponding to the amount of light emitted from each micro LED by adjusting the amount of light emitted from each micro LED. The memory stores a table in which information regarding the amount of light emitted from each micro LED is associated with a steering angle of the vehicle. In the vehicle headlight of Patent Literature 1 below, the light distribution pattern forming unit changes the amount of light emitted from the micro LED based on the information stored in the memory, thereby changing the light distribution pattern of the emitted light to a light distribution pattern corresponding to the steering angle of the vehicle.

[Patent Literature 1] WO 2021/182151 A1

SUMMARY OF INVENTION

As described above, the light distribution pattern forming unit forms the light distribution pattern by adjusting the amount of light emitted from each micro LED. Therefore, the light distribution pattern formed by the light distribution pattern forming unit can be expressed as an image based on the amount of light emitted from each micro LED, and it can be considered that the light distribution pattern forming unit emits light based on the image.

A vehicle headlight of a first aspect of the present invention includes: an image generation unit configured to generate an image representing at least one of at least a part of a low beam light distribution pattern or at least a part of a high beam light distribution pattern; a light source unit including a plurality of light emitting units and configured to emit light based on the image generated by the image generation unit, the plurality of light emitting units being configured to individually change the amount of light to be emitted, and arranged in a matrix; and a memory configured to store a first image for forming a first light distribution pattern by light emitted from the light source unit, and a second image for forming a second light distribution pattern by light emitted from the light source unit, the second light distribution pattern being different from the first light distribution pattern and at least partially overlapping the first light distribution pattern, in which the image generation unit generates the image by superimposing the second image on at least a part of the first image and fading in the second image, and fading out the first image.

In the vehicle headlight of the first aspect, as described above, the light source unit emits light based on the first image to form the first light distribution pattern, and the light source unit emits light based on the second image to form the second light distribution pattern. The first light distribution pattern and the second light distribution pattern are each at least one of at least a part of the low beam light distribution pattern or at least a part of the high beam light distribution pattern, and the second light distribution pattern is different from the first light distribution pattern and at least partially overlaps the first light distribution pattern. Therefore, in the vehicle headlight of the first aspect, the light emitted from the light source unit is changed from the light based on the first image to the light based on the second image, whereby the low beam light distribution pattern to be emitted can be changed, the high beam light distribution pattern to be emitted can be changed, or the light distribution pattern of the emitted light can be switched between the low beam light distribution pattern and the high beam light distribution pattern. Further, in the vehicle headlight of the first aspect, the image generation unit generates an image by superimposing the second image on at least a part of the first image and fading in the second image, and fading out the first image, and the light source unit emits light based on the generated image. Therefore, with the vehicle headlight of the first aspect, it is possible to suppress a steep change from the first light distribution pattern to the second light distribution pattern, and it is possible to suppress a driver from feeling uncomfortable for the change in light distribution pattern. In the vehicle headlight of the first aspect, an image in the middle of change from the first light distribution pattern to the second light distribution pattern is generated by the image generation unit based on the first image and the second image stored in the memory. Therefore, an increase in amount of information stored in the memory can be suppressed as compared with a case where an image in the middle of change from the first light distribution pattern to the second light distribution pattern is stored in the memory.

In the vehicle headlight of the first aspect, one of the first light distribution pattern and the second light distribution pattern may be at least a part of the low beam light distribution pattern, and the other of the first light distribution pattern and the second light distribution pattern may be at least a part of the high beam light distribution pattern.

With the vehicle headlight of the first aspect, in switching between the low beam light distribution pattern and the normal high beam light distribution pattern, it is possible to suppress the driver from feeling uncomfortable for the change in light distribution pattern.

Alternatively, the first light distribution pattern and the second light distribution pattern include a predetermined region in a predetermined light distribution pattern obtained by changing the amount of light of the predetermined region overlapping a predetermined target object positioned in front of the vehicle detected by the detection device in the low beam light distribution pattern or the high beam light distribution pattern, and at least a part of the predetermined region in the first light distribution pattern and at least a part of the predetermined region in the second light distribution pattern may be different from each other.

In the vehicle headlight of the first aspect, in a case where a human such as a pedestrian is detected as the target object by the detection device, the amount of light emitted to the detected human changes, and in a case where a retroreflective object such as a sign is detected as the target object by the detection device, the amount of light emitted to the detected retroreflective object changes. In a case where the amount of light emitted to the detected human is increased, the vehicle headlight of the first aspect can make it easier to visually recognize the human and facilitate driving as compared with a case where the amount of light emitted to the human does not change. In addition, in the vehicle headlight of the first aspect, in a case where the amount of light emitted to the retroreflective object is small, the amount of light reflected by the retroreflective object toward a host vehicle is decreased as compared with a case where the amount of light emitted to the retroreflective object does not change, and it t is thus possible to suppress glare to the driver of the host vehicle due to the reflected light and to facilitate driving. Further, for example, when a relative position between the target object and the host vehicle changes, the predetermined region in which the amount of light is changed moves, and the light distribution pattern to be emitted changes. With the vehicle headlight of the first aspect, it is possible to suppress feeling uncomfortable for such a change in light distribution pattern.

Alternatively, the first light distribution pattern and the second light distribution pattern may include an elbow point of the low beam light distribution pattern, and the elbow point of the first light distribution pattern and the elbow point of the second light distribution pattern may be shifted in a horizontal direction.

In the vehicle headlight of the first aspect, the elbow point in the low beam light distribution pattern can be moved in the horizontal direction. Therefore, with the vehicle headlight of the first aspect, the visibility can be improved by changing the low beam light distribution pattern emitted according to a change in traveling direction of the vehicle.

Alternatively, the first light distribution pattern may include an additional light distribution pattern added to the low beam light distribution pattern to form the high beam light distribution pattern, and the second light distribution pattern may include another additional light distribution pattern having a width different from a width of the additional light distribution pattern in the horizontal direction.

For example, in order to improve the visibility, there is a demand for decreasing the width of the additional light distribution pattern added to the low beam in the horizontal direction when traveling at a high speed, or increasing the width when traveling in an urban area or the like. In the vehicle headlight of the first aspect, as described above, the width of the additional light distribution pattern included in the first light distribution pattern in the horizontal direction is different from the width of the another additional light distribution pattern included in the second light distribution pattern in the horizontal direction. Therefore, with the vehicle headlight of the first aspect, the width of the additional light distribution pattern in the horizontal direction can be changed according to a traveling situation of the vehicle, and the visibility can be improved.

In the vehicle headlight of the first aspect, a part of the first image and a part of the second image may be the same as each other, and the image generation unit may generate the image by fading in only a portion different from the first image in the second image on the first image and fading out only a portion different from the second image in the first image.

With such a configuration, an operation load of the image generation unit can be reduced.

Further, in the vehicle headlight of the first aspect, the image generation unit may perform interlace processing when generating the image.

With such a configuration, an operation load of the image generation unit can be reduced.

A vehicle headlight of a second aspect of the present invention includes: an image generation unit configured to generate an image representing at least a part of a high beam light distribution pattern; a light source unit including a plurality of light emitting units and configured to emit light based on the image generated by the image generation unit, the plurality of light emitting units being configured to individually change the amount of light to be emitted, and arranged in a matrix; and a memory configured to store a low beam image for forming at least a part of a low beam light distribution pattern by light emitted from the light source unit, and an additional light distribution image for forming an additional light distribution pattern added to the low beam light distribution pattern to form the high beam light distribution pattern by light emitted from the light source unit, in which the image generation unit generates a plurality of the images while moving the additional light distribution image in a predetermined direction in a state where the low beam image and the additional light distribution image are superimposed.

In the vehicle headlight of the second aspect, the image generation unit generates a plurality of images in a process of moving the additional light distribution image in the predetermined direction, thereby generating an image in the middle of movement of the additional light distribution pattern. The image in the middle of movement of the additional light distribution pattern is generated based on the low beam image and the additional light distribution image stored in the memory. Therefore, it is possible to suppress an increase in amount of information stored in the memory as compared with a case where the image in the middle of movement of the additional light distribution pattern is stored in the memory.

In the vehicle headlight of the second aspect, the low beam image may be an image for forming the low beam light distribution pattern, and the image generation unit may move the low beam image in the predetermined direction by a distance smaller than a movement distance of the additional light distribution image in a process of moving the additional light distribution image.

In the vehicle headlight of the second aspect, the movement distance of the low beam image is smaller than the movement distance of the additional light distribution image, and a movement distance of the low beam light distribution pattern is smaller than a movement distance of the additional light distribution pattern. The light forming the low beam light distribution pattern irradiates a side closer to the vehicle than the light forming the additional light distribution pattern. A shift amount of a curved road with respect to the vehicle in the horizontal direction tends to increase with increasing distance from the vehicle. For example, in a case where the low beam light distribution pattern and the additional light distribution pattern move in the horizontal direction according to a curved road, in the vehicle headlight of the second aspect, the movement distance of the low beam light distribution pattern in the horizontal direction is smaller than the movement distance of the additional light distribution pattern in the horizontal direction. Therefore, the vehicle headlight of the second aspect can suppress deterioration in visibility of a side close to the vehicle as compared with a case where the movement amounts of the low beam light distribution pattern and the additional light distribution pattern in the horizontal direction are the same while improving the visibility on a far side of a curved road. In addition, for example, in a case where the vehicle is positioned in front of a specific point where a change from a flat road to an uphill road is made, or the like, the driver tends to raise the line of sight in order to visually recognize a place farther than the specific point. In a case where the low beam light distribution pattern and the additional light distribution pattern move in the vertical direction according to a change of a gradient of a road surface, in the vehicle headlight of the second aspect, the movement distance of the low beam light distribution pattern in the vertical direction is smaller than the movement distance of the additional light distribution pattern in the vertical direction. Therefore, the vehicle headlight of the second aspect can suppress deterioration in visibility of a side close to the vehicle as compared with a case where the movement distances of the low beam light distribution pattern and the additional light distribution pattern in the vertical direction are the same while improving visibility of a far side.

In the vehicle headlight of the second aspect, the predetermined direction may include a vertical direction component, and the image generation unit may change the additional light distribution image in such a way that a lower side of the additional light distribution pattern extends downward in a case where a distance between a predetermined portion in the low beam image and a specific portion in the additional light distribution image in a vertical direction is equal to or larger than a predetermined value in a process of moving the additional light distribution image.

In a case where the additional light distribution pattern moves upward with respect to the low beam light distribution pattern, a gap is generated between the additional light distribution pattern and the low beam light distribution pattern, and a dark region may be formed in the high beam light distribution pattern. With the vehicle headlight of the second aspect, even in a case where the additional light distribution pattern moves upward with respect to the low beam light distribution pattern, a lower side of the additional light distribution pattern extends downward, and thus, it is possible to suppress generation of a gap between the additional light distribution pattern and the low beam light distribution pattern and to suppress formation of a dark region in the high beam light distribution pattern.

In the vehicle headlight of the second aspect, the predetermined direction may include a vertical direction component, and the image generation unit may change the low beam image in such a way that an upper side of the low beam light distribution pattern extends upward in a case where a distance between a predetermined portion in the low beam image and a specific portion in the additional light distribution image in a vertical direction is equal to or larger than a predetermined value in a process of moving the additional light distribution image.

In the vehicle headlight of the second aspect, even in a case where the additional light distribution pattern moves upward with respect to the low beam light distribution pattern, the upper side of the low beam light distribution pattern extends upward. Therefore, with the vehicle headlight, it is possible to suppress generation of a gap between the additional light distribution pattern and the low beam light distribution pattern, and it is possible to suppress formation of a dark region in the high beam light distribution pattern.

Alternatively, the predetermined direction may include a vertical direction component, the image generation unit may superimpose the low beam image, the additional light distribution image, and a supplementary image in a case where a distance between a predetermined portion in the low beam image and a specific portion in the additional light distribution image in a vertical direction is equal to or larger than a predetermined value in a process of moving the additional light distribution image, and the supplementary image may overlap an edge representing a cutoff line of the low beam light distribution pattern in the low beam image and an edge representing a lower edge of the additional light distribution pattern in the additional light distribution image.

In the vehicle headlight of the second aspect, even in a case where a gap is formed between the edge representing the cutoff line of the low beam light distribution pattern in the low beam image and the edge representing the lower edge of the additional light distribution pattern in the additional light distribution image, the gap can be filled with the supplementary image. Therefore, even in a case where the additional light distribution pattern moves upward with respect to the low beam light distribution pattern, it is possible to suppress formation of a dark region in the high beam light distribution pattern.

Further, a vehicle headlight of a third aspect of the present invention includes: an image generation unit configured to generate an image representing at least a part of a high beam light distribution pattern; a light source unit including a plurality of light emitting units and configured to emit light based on the image generated by the image generation unit, the plurality of light emitting units being configured to individually change the amount of light to be emitted, and arranged in a matrix; and a memory configured to store an extended low beam image and an extended additional light distribution image, in which the extended low beam image includes a reference low beam image for forming a reference low beam light distribution pattern by light emitted from the light source unit, and a low beam supplementary image having a predetermined brightness and connected to at least one of both left and right edges in the reference low beam image or an edge representing a lower edge of the reference low beam light distribution pattern in the reference low beam image, the extended additional light distribution image includes a reference additional light distribution image for forming a reference additional light distribution pattern added to the reference low beam light distribution pattern to form a reference high beam light distribution pattern by light emitted from the light source unit, and an additional light distribution supplementary image having a specific brightness and connected to at least one of both left and right edges, an upper edge, or a lower edge in the reference additional light distribution image, and the image generation unit extracts a predetermined image including a portion representing a region including an elbow point and a hot zone in the reference low beam light distribution pattern in the extended low beam image, extracts a plurality of specific images while moving an extraction range in a predetermined direction in such a way as to extract the specific image including a portion representing a hot zone of the reference additional light distribution pattern and a part of the additional light distribution supplementary image in the extended additional light distribution image, and generates a plurality of the images by superimposing each of the extracted specific images and the extracted predetermined image.

In the vehicle headlight of the third aspect, as described above, the image generation unit extracts a plurality of specific images while moving the extraction range of the extended additional light distribution image in the predetermined direction. The specific image includes a portion representing the hot zone of the reference additional light distribution pattern in the extended additional light distribution image and a part of the additional light distribution supplementary image. Therefore, with the vehicle headlight of the third aspect, the hot zone of the additional light distribution pattern can be moved in the predetermined direction. Further, in the vehicle headlight of the third aspect, the image in the middle of movement of the hot zone of the additional light distribution pattern is generated by the image generation unit based on the extended low beam image and the extended additional light distribution image stored in the memory. Therefore, it is possible to suppress an increase in amount of information stored in the memory as compared with a case where an image in the middle of movement of the hot zone is stored in the memory.

In this case, the image generation unit may extract a plurality of the predetermined images while moving an extraction range of the extended low beam image in the predetermined direction in such a way that a part of the low beam supplementary image is included in the predetermined image, extract a plurality of the specific images while moving the extraction range of the extended additional light distribution image in the predetermined direction, and generate a plurality of the images by superimposing each of the extracted specific images and each of the extracted predetermined images.

With the vehicle headlight of the third aspect, the hot zone of the additional light distribution pattern and the hot zone of the low beam light distribution pattern can be moved in the predetermined direction. In this case, a movement distance of the extraction range of the extended low beam image may be smaller than a movement distance of the extraction range of the extended additional light distribution image. In this case, a movement distance of the hot zone of the low beam light distribution pattern is smaller than a movement distance of the hot zone of the additional light distribution pattern. Therefore, for example, in a case where the hot zone in the low beam light distribution pattern and the hot zone in the additional light distribution pattern move in the horizontal direction according to a curved road, similarly to the vehicle lamp of the second aspect, it is possible to improve visibility of a far side of the curved road and suppress deterioration in visibility of a side close to the vehicle. In addition, for example, in a case where the hot zone in the low beam light distribution pattern and the hot zone in the additional light distribution pattern move in the vertical direction according to a change of a gradient of a road surface, similarly to the vehicle headlight of the second aspect, it is possible to improve visibility of a far side and suppress deterioration in visibility of a side close to the vehicle.

Further, a vehicle headlight as a fourth aspect of the present invention includes: an image generation unit configured to generate an image representing a low beam light distribution pattern and a high beam light distribution pattern; a light source unit including a plurality of light emitting units and configured to emit light based on the image generated by the image generation unit, the plurality of light emitting units being configured to individually change the amount of light to be emitted, and arranged in a matrix; and a memory configured to store a first image for forming an additional light distribution pattern added to the low beam light distribution pattern to form the high beam light distribution pattern by light emitted from the light source unit, and a second image for forming the low beam light distribution pattern by light emitted from the light source unit, in which when a light distribution pattern of light emitted from the light source unit is switched from the low beam light distribution pattern to the high beam light distribution pattern, the image generation unit extracts a plurality of the first images in an extraction frame as intermediate images while moving the extraction frame in a direction from an edge representing an upper edge of the additional light distribution pattern to an edge representing a lower edge of the additional light distribution pattern in the first image in such a way as to increase a range of the first image positioned in the extraction frame from which the first image is extracted, and generates a plurality of the images by combining each of the extracted intermediate images and the second image in a state where at least a part of each of the intermediate images overlaps the second image.

Further, a vehicle headlight as a fifth aspect of the present invention includes: an image generation unit configured to generate an image representing a low beam light distribution pattern and a high beam light distribution pattern; a light source unit including a plurality of light emitting units and configured to emit light based on the image generated by the image generation unit, the plurality of light emitting units being configured to individually change the amount of light to be emitted, and arranged in a matrix; and a memory configured to store a first image for forming an additional light distribution pattern added to the low beam light distribution pattern to form the high beam light distribution pattern by light emitted from the light source unit, and a second image for forming the low beam light distribution pattern by light emitted from the light source unit, in which when a light distribution pattern of light emitted from the light source unit is switched from the high beam light distribution pattern to the low beam light distribution pattern, the image generation unit extracts a plurality of the first images in an extraction frame as intermediate images while moving the extraction frame in a direction from an edge representing a lower edge of the additional light distribution pattern to an edge representing an upper edge of the additional light distribution pattern in the first image in such a way as to decrease a range of the first image positioned in the extraction frame from which the first image is extracted, and generates a plurality of the images by combining each of the extracted intermediate images and the second image in a state where at least a part of each of the intermediate images overlaps the second image.

In the vehicle headlight of the fourth aspect, the intermediate image in a case where the range of the first image positioned in the extraction frame is a part of the first image is a part of the first image including the edge representing the upper edge of the additional light distribution pattern. The intermediate image extracted by the extraction frame having a large movement distance is an image whose extraction range in the first image is wider in the movement direction of the extraction frame. The movement direction of the extraction frame is a direction from the edge representing the upper edge of the additional light distribution pattern to the edge representing the lower edge of the additional light distribution pattern in the first image. In addition, the intermediate image in a case where the entire first image is positioned within the extraction frame is the first image.

Therefore, the intermediate image is an image in which the additional light distribution pattern gradually extends upward from an upper side in accordance with an increase in movement distance of the extraction frame. Therefore, with the vehicle headlight of the fourth aspect, the additional light distribution pattern changes in such a way as to gradually extend upward from the low beam light distribution pattern, so that the low beam light distribution pattern can become the high beam light distribution pattern. Further, in the vehicle headlight of the fifth aspect, the intermediate image in a case where the range of the first image positioned in the extraction frame is a part of the first image is a part of the first image including the edge representing the upper edge of the additional light distribution pattern. The intermediate image extracted by the extraction frame having a large movement distance is an image whose extraction range in the first image is narrower in the movement direction of the extraction frame. The movement direction of the extraction frame is a direction from the edge representing the lower edge of the additional light distribution pattern to the edge representing the upper edge of the additional light distribution pattern in the first image. In addition, the intermediate image in a case where the first image is not positioned within the extraction frame is an empty image. Therefore, the intermediate image is an image in which the additional light distribution pattern gradually contracts downward from a lower side in accordance with an increase in movement distance of the extraction frame. Therefore, with the vehicle headlight of the fifth aspect, the additional light distribution pattern changes in such a way as to gradually contract downward, so that the high beam light distribution pattern can become low beam light distribution pattern. Therefore, with the vehicle headlight of the fourth and fifth aspects, it is possible to further suppress the driver from feeling uncomfortable for a change in light distribution pattern as compared with a case where the low beam light distribution pattern and the high beam light distribution pattern instantaneously change. In the vehicle headlight of the fourth and fifth aspects, an image in the middle of change of the light distribution pattern is generated by the image generation unit based on the first image and the second image stored in the memory. Therefore, with the vehicle headlight of the fourth and fifth aspects, it is possible to suppress an increase in amount of information stored in the memory as compared with a case where the image in the middle of change of the light distribution pattern is stored in the memory.

Further, a vehicle headlight as a sixth aspect of the present invention includes: an image generation unit configured to generate an image representing a low beam light distribution pattern and a high beam light distribution pattern; a light source unit including a plurality of light emitting units and configured to emit light based on the image generated by the image generation unit, the plurality of light emitting units being configured to individually change the amount of light to be emitted, and arranged in a matrix; and a memory configured to store a first image for forming the high beam light distribution pattern by light emitted from the light source unit and a second image for forming the low beam light distribution pattern by light emitted from the light source unit, in which when a light distribution pattern of light emitted from the light source unit is switched from the low beam light distribution pattern to the high beam light distribution pattern, the image generation unit extracts a plurality of the first images in a first extraction frame as first intermediate images while moving the first extraction frame in a direction from an edge representing an upper edge of the high beam light distribution pattern to an edge representing a lower edge of the high beam light distribution pattern in the first image in such a way as to increase a range of the first image positioned in the first extraction frame from which the first image is extracted, extracts a plurality of the second images in a second extraction frame as second intermediate images while moving the second extraction frame in a direction from an edge representing a lower edge of the low beam light distribution pattern to an edge representing an upper edge of the low beam light distribution pattern in the second image in such a way as to decrease a range of the second image positioned in the second extraction frame from which the second image is extracted, and generates a plurality of the images by combining each of the first intermediate images and each of the second intermediate images in a state where at least a part of each of the extracted first intermediate images and at least a part of each of the extracted second intermediate images overlap each other.

In the vehicle headlight of the sixth aspect, the first intermediate image in a case where the range of the first image positioned in the first extraction frame is a part of the first image is a part of the first image including the edge representing the upper edge of the high beam light distribution pattern. The first intermediate image extracted by the first extraction frame having a larger movement distance is an image whose extraction range in the first image is wider in the movement direction of the first extraction frame. The movement direction of the first extraction frame is a direction from the edge representing the upper edge of the high beam light distribution pattern to the edge representing the lower edge of the high beam light distribution pattern in the first image. In addition, the first intermediate image in a case where the entire first image is positioned within the first extraction frame is the first image. Therefore, the first intermediate image is an image in which the high beam light distribution pattern gradually extends upward from an upper side in accordance with an increase in movement distance of the first extraction frame. In addition, the second intermediate image in a case where the range of the second image positioned in the second extraction frame is a part of the second image is a part of the second image including the edge representing the upper edge of the low beam light distribution pattern. The second intermediate image extracted by the second extraction frame having a larger movement distance is an image whose extraction range in the second image is narrower in the movement direction of the second extraction frame. The movement direction of the second extraction frame is a direction from the edge representing the lower edge of the low beam light distribution pattern to the edge representing the upper edge of the low beam light distribution pattern in the second image. In addition, the second intermediate image in a case where the second image is not positioned within the second extraction frame is an empty image. Therefore, the second intermediate image is an image in which the low beam light distribution pattern gradually contracts downward from a lower side in accordance with an increase in movement distance of the second extraction frame. Therefore, with the vehicle headlight of the sixth aspect, the low beam light distribution pattern gradually contracts downward, and the high beam light distribution pattern gradually extends upward, so that the low beam light distribution pattern can become the high beam light distribution pattern. Therefore, with the vehicle headlight of the sixth aspect, it is possible to suppress the driver from feeling uncomfortable for a change in light distribution pattern as compared with a case where the low beam light distribution pattern instantaneously changes to the high beam light distribution pattern. In addition, in the vehicle headlight of the third aspect, an image in the middle of change of the light distribution pattern is generated by the image generation unit based on the first image and the second image stored in the memory. Therefore, with the vehicle headlight of the third aspect, it is possible to suppress an increase in amount of information stored in the memory as compared with a case where the image in the middle of change of the light distribution pattern is stored in the memory.

In this case, the image generation unit may start movement of the second extraction frame after the range of the first image positioned in the first extraction frame becomes the entire first image.

With such a configuration, after the entire high beam light distribution pattern comes out and the entire low beam light distribution pattern and the high beam light distribution pattern overlap each other, the low beam light distribution pattern can be gradually contracted downward. Therefore, it is possible to prevent the front of the vehicle from being darker than when the low beam is emitted during the change of the light distribution pattern.

Alternatively, the image generation unit may move the first extraction frame and the second extraction frame in such a way that at least a part of a period in which the first image and the first extraction frame intersect each other and at least a part of a period in which the second image and the second extraction frame intersect each other overlap each other.

With such a configuration, it is possible to gradually extend the high beam light distribution pattern upward while gradually contracting the low beam light distribution pattern downward.

Further, a vehicle headlight as a seventh aspect of the present invention includes: an image generation unit configured to generate an image representing a low beam light distribution pattern and a high beam light distribution pattern; a light source unit including a plurality of light emitting units and configured to emit light based on the image generated by the image generation unit, the plurality of light emitting units being configured to individually change the amount of light to be emitted, and arranged in a matrix; and a memory configured to store a first image for forming the high beam light distribution pattern by light emitted from the light source unit and a second image for forming the low beam light distribution pattern by light emitted from the light source unit, in which when a light distribution pattern of light emitted from the light source unit is switched from the high beam light distribution pattern to the low beam light distribution pattern, the image generation unit extracts a plurality of the first images in a first extraction frame as first intermediate images while moving the first extraction frame in a direction from an edge representing a lower edge of the high beam light distribution pattern to an edge representing an upper edge of the high beam light distribution pattern in the first image in such a way as to decrease a range of the first image positioned in the first extraction frame from which the first image is extracted, extracts a plurality of the second images in a second extraction frame as second intermediate images while moving the second extraction frame in a direction from an edge representing an upper edge of the low beam light distribution pattern to an edge representing a lower edge of the low beam light distribution pattern in the second image in such a way as to increase a range of the second image positioned in the second extraction frame from which the second image is extracted, and generates a plurality of the images by combining each of the first intermediate images and each of the second intermediate images in a state where at least a part of each of the extracted first intermediate images and at least a part of each of the extracted second intermediate images overlap each other.

In the vehicle headlight of the seventh aspect, the first intermediate image in a case where the range of the first image positioned in the first extraction frame is a part of the first image is a part of the first image including the edge representing the upper edge of the high beam light distribution pattern. The first intermediate image extracted by the first extraction frame having a larger movement distance is an image whose extraction range in the first image is narrower in the movement direction of the first extraction frame. The movement direction of the first extraction frame is a direction from the edge representing the lower edge of the high beam light distribution pattern to the edge representing the upper edge of the high beam in the first image. In addition, the first intermediate image in a case where the first image is not positioned within the first extraction frame is an empty image. Therefore, the first intermediate image is an image in which the high beam light distribution pattern gradually contracts downward from a lower side in accordance with an increase in movement distance of the first extraction frame. In addition, the second intermediate image in a case where the range of the second image positioned in the second extraction frame is a part of the second image is a part of the second image including the edge representing the upper edge of the low beam light distribution pattern. The second intermediate image extracted by the second extraction frame having a larger movement distance is an image whose extraction range in the second image is wider in the movement direction of the second extraction frame. The movement direction of the second extraction frame is a direction from the edge representing the upper edge of the low beam light distribution pattern to the edge representing the lower edge of the low beam light distribution pattern in the second image. In addition, the second intermediate image in a case where the entire second image is positioned within the second extraction frame is the second image. Therefore, with the vehicle headlight of the seventh aspect, the high beam light distribution pattern gradually contracts downward and the low beam light distribution pattern gradually extends upward, so that the high beam light distribution pattern can become the low beam light distribution pattern. Therefore, with the vehicle headlight of the seventh aspect, it is possible to suppress the driver from feeling uncomfortable for a change in light distribution pattern as compared with a case where the high beam light distribution pattern instantaneously changes to the low beam light distribution pattern. In addition, in the vehicle headlight of the fourth aspect, an image in the middle of change of the light distribution pattern is generated by the image generation unit based on the first image and the second image stored in the memory. Therefore, with the vehicle headlight of the fourth aspect, it is possible to suppress an increase in amount of information stored in the memory as compared with a case where the image in the middle of change of the light distribution pattern is stored in the memory.

In this case, the image generation unit may start movement of the first extraction frame after the range of the second image positioned in the second extraction frame becomes the entire second image.

With such a configuration, after the entire low beam light distribution pattern comes out and the entire low beam light distribution pattern and the high beam light distribution pattern overlap each other, the high beam light distribution pattern can be gradually contracted downward. Therefore, it is possible to prevent the front of the vehicle from being darker than when the low beam is emitted during the change of the light distribution pattern.

Alternatively, the image generation unit may move the first extraction frame and the second extraction frame in such a way that at least a part of a period in which the first image and the first extraction frame intersect each other and at least a part of a period in which the second image and the second extraction frame intersect each other overlap each other.

With such a configuration, it is possible to gradually extend the low beam light distribution pattern upward while gradually contracting the high beam light distribution pattern downward.

Further, a vehicle headlight of an eighth aspect of the present invention includes: an image generation unit configured to generate an image representing a light distribution pattern including a reference light distribution pattern that is at least a part of a low beam light distribution pattern or at least a part of a high beam light distribution pattern; a light source unit including a plurality of light emitting units and configured to emit light based on the image generated by the image generation unit, the plurality of light emitting units being configured to individually change the amount of light to be emitted, and arranged in a matrix; and a memory configured to store a reference image for forming the reference light distribution pattern by light emitted from the light source unit and a plurality of additional images to be superimposed on a part of the reference image, in which each of the plurality of additional images is one of a plurality of darkened images of which at least parts overlapping a region of the reference image are different from each other and which are darker than the reference image of the region, and a plurality of brightened images of which at least parts overlapping a region of the reference image are different from each other and which are brighter than the reference image of the region, and the image generation unit generates the image for forming a predetermined light distribution pattern by light emitted from the light source unit by selecting at least one additional image from among the plurality of additional images based on information from a detection device that detects a predetermined target object positioned in front of a vehicle and superimposing the selected additional image on a part of the reference image, the predetermined light distribution pattern being obtained by changing the amount of light of a predetermined region overlapping the predetermined target object in the reference light distribution pattern.

In the vehicle headlight of the eighth aspect, the light distribution pattern of the emitted light changes from the reference light distribution pattern to the predetermined light distribution pattern according to a situation in front of the vehicle, and the amount of light emitted to the predetermined target object changes. That is, the vehicle headlight of the eighth aspect controls a light distribution of the emitted light according to the situation in front of the vehicle. For example, in a case where a human such as a pedestrian, a retroreflective object such as a sign, or the like is detected as the target object by the detection device, the amount of light emitted to the detected object changes. In a case where the amount of light emitted to the detected human is increased, the vehicle headlight of the eighth aspect can make it easier to visually recognize the human as compared with a case where the amount of light emitted to the human does not change. In addition, in the vehicle headlight of the eighth aspect, in a case where the amount of light emitted to the retroreflective object is small, the amount of light reflected by the retroreflective object toward a host vehicle is decreased as compared with a case where the amount emitted to the retroreflective object does not change, and it is thus possible to suppress glare to the driver of the host vehicle due to the reflected light. Further, in the vehicle headlight of the eighth aspect, the image generation unit generates an image representing the predetermined light distribution pattern by superimposing at least one additional image selected from among the plurality of additional images on a part of the reference image. Therefore, the number of generatable images representing the predetermined light distribution pattern is the number of combinations of images in an image group including the plurality of darkened images and the brightened images. However, the information stored in the memory is the images of the image group and the reference image. Therefore, with the vehicle headlight of the eighth aspect, it is possible to further suppress an increase in amount of information stored in the memory as compared with a case of storing all the images representing the predetermined light distribution pattern that can be generated by the image generation unit in the memory. The brightness of the darkened image may be 0, and in this case, light emitted to the target object can be blocked.

In the vehicle headlight of the eighth aspect, the plurality of darkened images may include a slightly darkened image including a first image element and a highly darkened image including a second image element darker than the first image element.

In the vehicle headlight of the eighth aspect, the amount of light to be emitted can be decreased to a different amount according to the target object. For example, the amount of light emitted to another vehicle such as a preceding vehicle or an oncoming vehicle as the target object can be made different from the amount of light emitted to a retroreflective object as the target object. In a case where the amount of light emitted to the retroreflective object is larger than the amount of light emitted to the another vehicle, the vehicle headlight can further suppress deterioration in visibility of the retroreflective object while suppressing glare to the driver of the another vehicle, as compared with a case where the amount of light emitted to the retroreflective object is decreased to the same amount as the amount of light emitted to the another vehicle. Furthermore, in a case where the brightness of the highly darkened image is 0, glare to the driver of the another vehicle can be further suppressed.

In the vehicle headlight of the eighth aspect, the image generation unit may generate the image by superimposing the selected additional image on a part of the reference image and fading in the additional image.

With such a configuration, it is possible to make a change from the reference light distribution pattern to the predetermined light distribution pattern look smooth and to suppress the driver from feeling uncomfortable for the change in light distribution pattern.

In the vehicle headlight of the eighth aspect, after generating the image representing the predetermined light distribution pattern, the image generation unit may generate the image by fading out the additional image selected from the image in such a way that the image becomes the reference image.

With such a configuration, it is possible to make a change from the predetermined light distribution pattern to the reference light distribution pattern look smooth and to suppress the driver from feeling uncomfortable for the change in light distribution pattern.

In the vehicle headlight of the eighth aspect, the memory may store a drawing image for forming a drawing light distribution pattern in which light emitted from the light source unit draws a predetermined character on a road surface, and the image generation unit may generate the image by superimposing the drawing image on at least a part of the reference image.

With the vehicle headlight of the eighth aspect, the predetermined character can be drawn on the road surface while emitting a low beam or a high beam. The character means a figure, a symbol, a letter, or the like.

Further, a vehicle headlight of a ninth aspect of the present invention includes: an image generation unit configured to generate an image representing a light distribution pattern including a reference light distribution pattern that is at least a part of a low beam light distribution pattern; a light source unit including a plurality of light emitting units and configured to emit light based on the image generated by the image generation unit, the plurality of light emitting units being configured to individually change an amount of light to be emitted, and arranged in a matrix; and a memory configured to store a reference image for forming the reference light distribution pattern by light emitted from the light source unit, and a plurality of spot irradiation images for forming different spot light distribution patterns by light emitted from the light source unit, in which at least some of the spot light distribution patterns do not overlap the low beam light distribution pattern, the image generation unit selects at least one of the plurality of spot irradiation images based on information from a detection device that detects a predetermined target object positioned in front of a vehicle, and generates the image for forming a first light distribution pattern by light emitted from the light source unit from the selected spot irradiation image and the reference image, and the first light distribution pattern is a light distribution pattern in which the spot light distribution pattern overlapping a portion of the predetermined target object that does not overlap the low beam light distribution pattern is added to the reference light distribution pattern.

With the vehicle headlight of the ninth aspect, the light distribution pattern of the emitted light can be changed from the low beam light distribution pattern to the first light distribution pattern according to a situation in front of the vehicle, and a portion of the predetermined target object that does not overlap the low beam light distribution pattern can be irradiated with light. Therefore, with the vehicle headlight of the ninth aspect, it is possible to more easily visually recognize the predetermined target object and facilitate driving as compared with a case where a portion of the predetermined target object that does not overlap the low beam light distribution pattern is not irradiated with light. In the vehicle headlight of the ninth aspect, the image generation unit generates an image representing the first light distribution pattern from at least one spot irradiation image selected from among the plurality of spot irradiation images and reference image. Therefore, the number of generatable images representing the first light distribution pattern is the number of combinations of the plurality of spot irradiation images. However, the information stored in the memory is the spot irradiation image and the reference image. Therefore, with the vehicle headlight of the ninth aspect, it is possible to further suppress an increase in amount of information stored in the memory as compared with a case of storing all the images representing the first light distribution pattern that can be generated by the image generation unit in the memory.

In the vehicle headlight of the ninth aspect, the plurality of spot irradiation images may include a first spot irradiation image including a first image element and a second spot irradiation image including a second image element darker than the first image element.

The vehicle headlight of the ninth aspect can change the brightness of light to be emitted according to the target object. For example, in a case where a human such as a pedestrian and a retroreflective object such as a sign are detected as the target object by the detection device, the brightness of the light emitted to the human and the brightness of the light emitted to the retroreflective object can be made different. In a case where the brightness of the light emitted to the retroreflective object is lower than the brightness of the light emitted to the human, the vehicle headlight of the ninth aspect can further suppress glare to the driver of the host vehicle due to the reflected light from the retroreflective object while suppressing deterioration in visibility of the human as compared with a case where the brightness of the light emitted to the retroreflective object is higher than the brightness of the light emitted to the human.

In this case, when generating the image, the image generation unit may set a brightness of a region in which the first image element and the second image element overlap each other as a brightness of the region in the second image element.

With such a configuration, it is possible to suppress the brightness of the light emitted to the retroreflective object from unintentionally becoming higher than the brightness of the light emitted to the human, and it is possible to suppress glare to the driver of the host vehicle due to the reflected light from the retroreflective object.

In the vehicle headlight of the ninth aspect, the image generation unit may alternately generate the image for forming the first light distribution pattern by light emitted from the light source unit and the image for forming a second light distribution pattern by light emitted from the light source unit, and the second light distribution pattern may be a light distribution pattern obtained by changing an amount of light of at least a part of the spot light distribution pattern in the first light distribution pattern.

With the vehicle headlight of the ninth aspect, the amount of light emitted to the target object can be periodically changed according to the lapse of time. Therefore, the vehicle headlight of the ninth aspect can improve an ability to alert the driver of the host vehicle to the presence of the target object. In addition, in a case where a human as the target object is detected by the detection device, it is possible to improve an ability to alert the human to the presence of the vehicle together with the ability to alert the driver of the host vehicle to the presence of the human.

In this case, the second light distribution pattern may be a light distribution pattern obtained by removing the spot light distribution pattern overlapping the predetermined target object from the first light distribution pattern.

DESCRIPTION OF EMBODIMENTS

Figure 1:
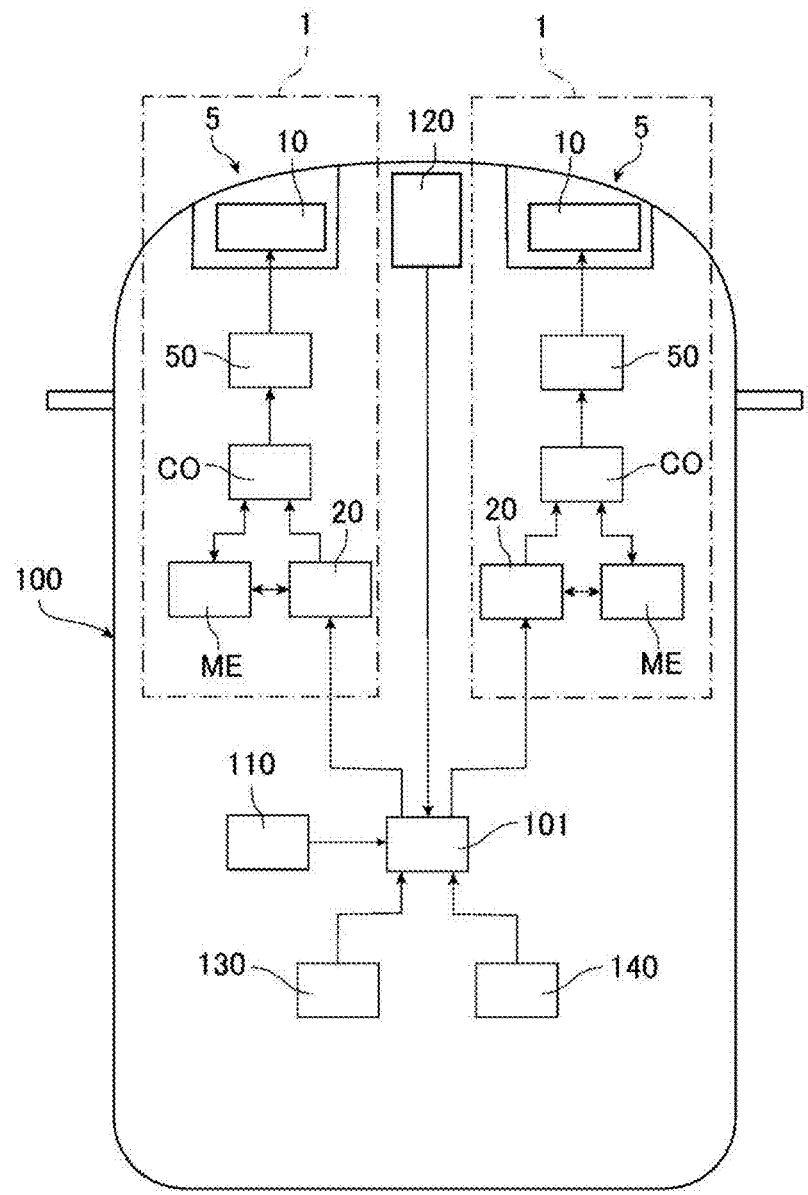
FIG. 1 is a plan view conceptually illustrating a vehicle including a vehicle headlight in a first embodiment as a first aspect of the present invention.

Hereinafter, modes for implementing a vehicle headlight according to the present invention will be exemplified with reference to the accompanying drawings. Embodiments exemplified below are intended to facilitate understanding of the present invention and are not intended to limit the present invention. The present invention can be changed and modified without departing from the gist of the present invention. In the present invention, constituent elements in the following embodiments may be appropriately combined. In the drawings referred to below, dimensions of each member may be changed for easy understanding.

First Embodiment

A first embodiment as a first aspect of the present invention will be described. FIG. 1 is a plan view conceptually illustrating a vehicle including a vehicle headlight in the present embodiment. As illustrated in FIG. 1, a vehicle 100 of the present embodiment is an automobile, and includes a pair of left and right vehicle headlights 1, a light switch 110, a detection device 120 that detects a predetermined target object positioned in front of the vehicle 100, a steering sensor 130, and a vehicle speed sensor 140.

In the present embodiment, each vehicle headlight 1 includes a lamp portion 5, a control unit CO, an image generation unit 20, a memory ME, and a power supply circuit 50 as main components. In the present specification, unless otherwise specified, "right" means a right side from the viewpoint of a driver of the vehicle 100 that is a host vehicle, and "left" means a left side from the viewpoint of the driver of the vehicle 100 that is the host vehicle.

In the present embodiment, a configuration of one vehicle headlight 1 is the same as that of the other vehicle headlight 1 except that a shape of the lamp portion 5 is substantially symmetrical. Therefore, one vehicle headlight 1 will be described below, and a description of the other vehicle headlight 1 will be omitted.

Figure 2:
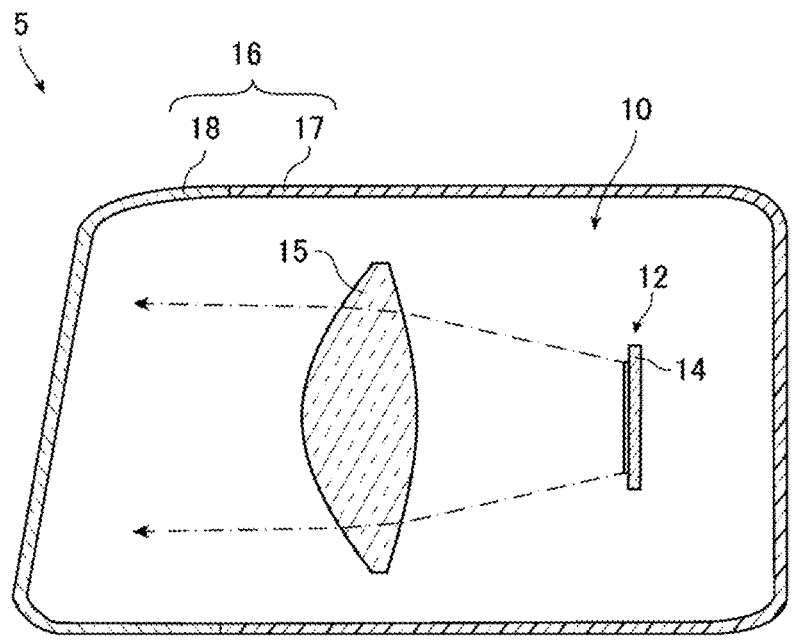
FIG. 2 is a cross-sectional view schematically illustrating one lamp portion of the vehicle headlight illustrated in FIG. 1.

FIG. 2 is a cross-sectional view schematically illustrating the lamp portion 5 of one vehicle headlight 1 illustrated in FIG. 1. As illustrated in FIG. 2, the lamp portion 5 includes a lamp unit 10 and a casing 16 as main components.

The casing 16 includes a housing 17 and a front cover 18 as main components. The front cover 18 transmits light emitted from the lamp unit 10. The housing 17 is formed in a box shape having an opening on a front side, and the front cover 18 is fixed to the housing 17 in such a way as to close the opening. In this way, a housing space surrounded by the housing 17 and the front cover 18 is formed in the casing 16, and the lamp unit 10 is disposed in the housing space. The lamp unit 10 includes a light source unit 12 and a projection lens 15 as main components.

Figure 3:
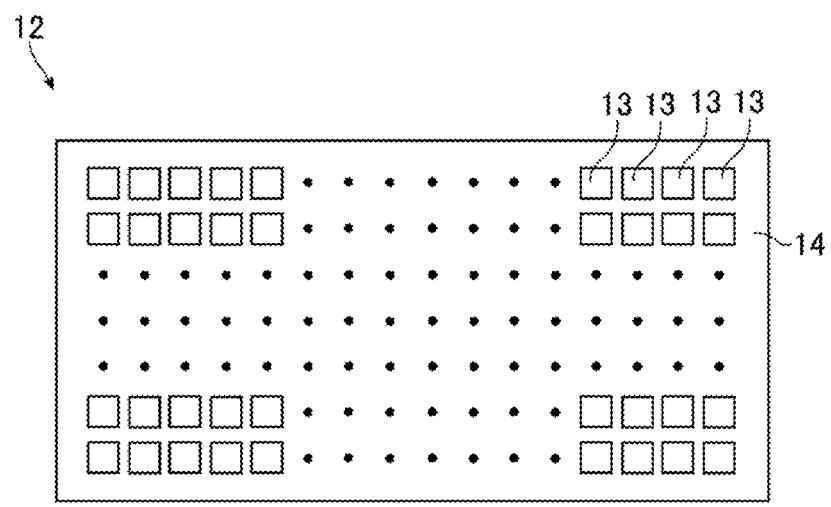
FIG. 3 is a front view schematically illustrating a light source unit illustrated in FIG. 2.

FIG. 3 is a front view schematically illustrating the light source unit 12 illustrated in FIG. 2. As illustrated in FIG. 3, the light source unit 12 of the present embodiment includes a plurality of light emitting elements 13 as light emitting units that emit light, and a circuit board 14 on which the plurality of light emitting elements 13 are mounted. The plurality of light emitting elements 13 are arranged in a matrix form to form rows in a vertical direction and a horizontal direction, and emit light forward. The light emitting elements 13 can individually change the amount of light to be emitted. In the present embodiment, the light emitting elements 13 are micro light emitting diodes (micro LEDs), and the light source unit 12 is a so-called micro LED array. The number of light emitting elements 13 arranged in the horizontal direction and the number of light emitting elements 13 arranged in the vertical direction are not particularly limited.

In the present embodiment, each light emitting element 13 corresponds to a pixel of an image generated by the image generation unit 20 described below. The light source unit 12 adjusts the amount of light emitted from each light emitting element 13 according to data of the pixel corresponding to the light emitting element 13, thereby emitting light based on the image, and forms a light distribution pattern based on the image with the light. In the present embodiment, the light emitting element 13 and the pixel correspond to each other on a one-to-one basis, but a relationship therebetween is not particularly limited.

The projection lens 15 is disposed in front of the light source unit 12, light emitted from the light source unit 12 is incident on the projection lens 15, and a divergence angle of the light is adjusted by the projection lens 15. Therefore, light whose divergence angle is adjusted by the projection lens 15 is emitted from the lamp unit 10, and the light is emitted from the lamp portion 5 to the front of the vehicle 100 via the front cover 18. The projection lens 15 of the present embodiment is a lens of which a light incident surface and a light emitting surface are formed in a convex shape, and a rear focal point of the projection lens 15 is positioned on or near a light emitting surface of any one of the light emitting elements 13 in the light source unit 12. Therefore, a light distribution pattern of the light emitted to the front of the vehicle 100 is obtained by vertically and horizontally inverting the light distribution pattern of the light emitted from the light source unit 12, and an image representing the light distribution pattern is obtained by vertically and horizontally inverting the image representing the light distribution pattern of the light emitted from the light source unit 12.

Next, the control unit CO illustrated in FIG. 1 includes, for example, an integrated circuit such as a microcontroller, an integrated circuit (IC), a large-scale integrated circuit (LSI), or an application specific integrated circuit (ASIC), or a numerical control (NC) device. In a case where the NC device is used, the control unit CO may use or does not have to use a machine learning device. The control unit CO controls the light source unit 12 by controlling the power supply circuit 50.

The power supply circuit 50 includes a driver, and when a control signal is input from the control unit CO, the driver adjusts power supplied to each light emitting element 13 of the light source unit 12. In this way, the amount of light emitted from each light emitting element 13 is adjusted. In the present embodiment, the driver of the power supply circuit 50 adjusts the power supplied to each light emitting element 13 by pulse width modulation (PWM) control, thereby adjusting the amount of light emitted from each light emitting element 13. However, a method for adjusting the amount of light emitted from each light emitting element 13 is not particularly limited.

The memory ME is configured to store information and read the stored information. The memory ME is, for example, a non-transitory recording medium, and is preferably a semiconductor recording medium such as a random access memory (RAM) or a read only memory (ROM), and can include any type of recording medium such as an optical recording medium or a magnetic recording medium. The "non-transitory" recording medium includes all computer-readable recording media except for a transitory propagating signal, and does not exclude a volatile recording medium.

The memory ME of the present embodiment stores information of a plurality of images and the like used when the image generation unit 20 described below generates an image. The plurality of images in the present embodiment are grayscale images in which data of each pixel in each image is a grayscale value, and a pixel having a larger grayscale value is brighter. However, the data of each pixel is not particularly limited. Furthermore, these pieces of information may be read from a memory outside the vehicle via a wireless communication device included in the vehicle 100.

The image generation unit 20 is configured to generate an image by combining the plurality of images stored in the memory ME. The image generation unit 20 may have a similar configuration to that of the control unit CO, and the control unit CO may also serve as the image generation unit 20. The image generated by the image generation unit 20 of the present embodiment is a grayscale image similarly to the image stored in the memory ME, but is not particularly limited. In the present embodiment, signals from the light switch 110, the detection device 120, the steering sensor 130, and the vehicle speed sensor 140 described below are input to the image generation unit 20. The image generation unit 20 of the present embodiment generates an image by combining the plurality of images stored in the memory ME according to the signals using a layer function, and outputs information of the image to the control unit CO.

Figure 4:
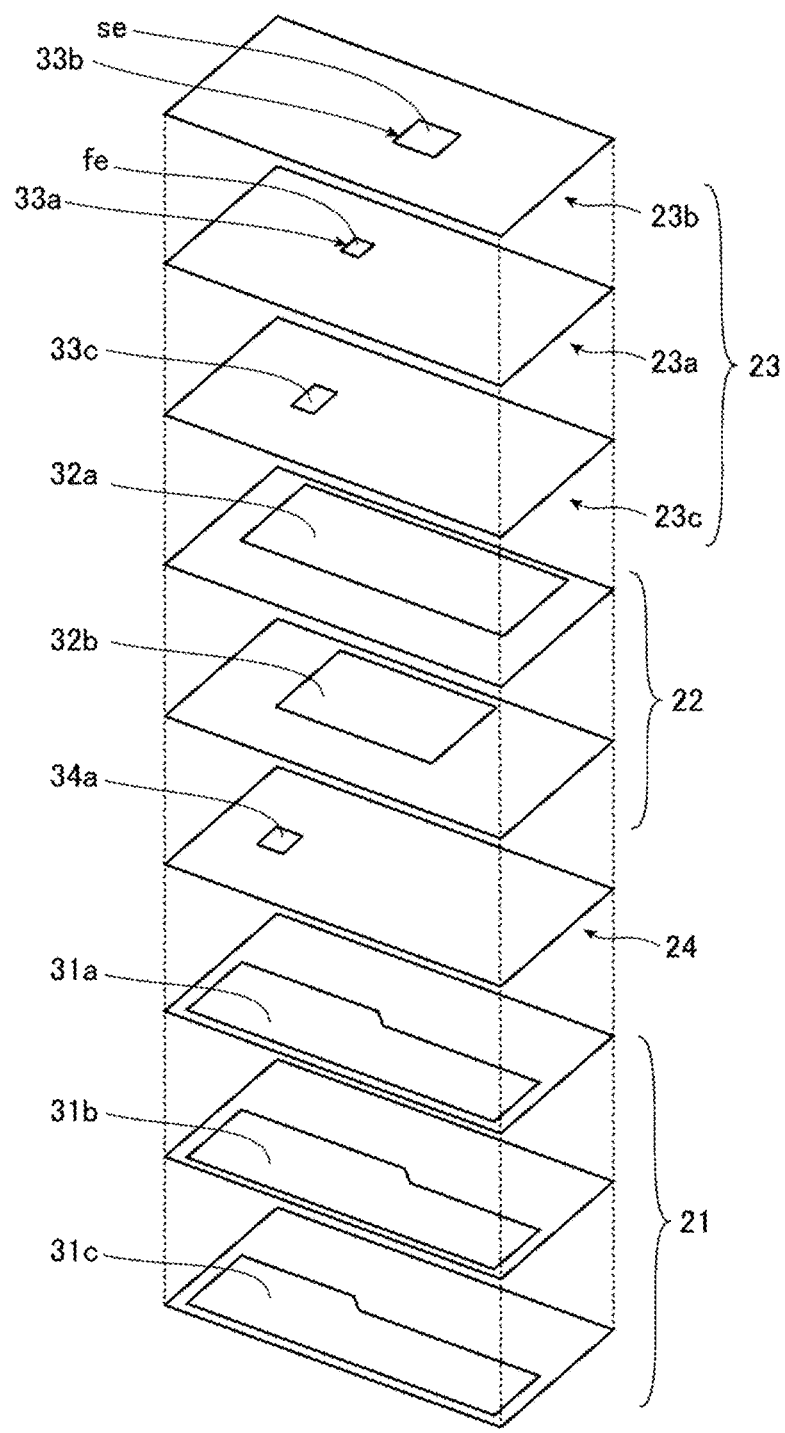
FIG. 4 is a view for describing a concept of a layer in an image generation unit of the first embodiment.

FIG. 4 is a view for describing a concept of a layer in the image generation unit 20 of the present embodiment. As illustrated in FIG. 4, the image generation unit 20 of the present embodiment includes a low beam layer group 21, an additional light distribution layer group 22, a first additional image layer group 23, and a second additional image layer group 24. The layer groups 21, 22, 23, and 24 each include at least one layer. In addition, a priority is set for each layer, and in FIG. 4, a layer with a lower priority is illustrated in the lower side. The priority indicates the order of superimposition, and a layer having a higher priority is superimposed on a layer having a lower priority. In the present embodiment, the priorities of the layer groups 21, 22, 23, and 24 are lower in the order of the first additional image layer group 23, the additional light distribution layer group 22, the second additional image layer group 24, and the low beam layer group 21. However, the priorities of the layer groups 21, 22, 23, and 24 are not particularly limited, and may be changeable. In addition, the priority of the layer in each of the layer groups 21, 22, 23, and 24 can be changed. Further, a variable opacity is set for each layer. In a case where the opacity is 100%, an image arranged in the corresponding layer is completely opaque. As the opacity decreases, the transparency of the image arranged in the corresponding layer increases. In a case where the opacity is 0%, the image arranged in the corresponding layer is completely transparent, and the image does not exist.

The low beam layer group 21 of the present embodiment includes a plurality of layers. The memory ME stores a plurality of low beam images for forming different low beam light distribution patterns by light emitted from the light source unit 12. The image generation unit 20 reads the low beam images from the memory ME and arranges the low beam images one by one in different layers in the low beam layer group 21. In the present embodiment, the low beam images are images of the low beam light distribution pattern in which an elbow point and a hot zone are shifted in the horizontal direction, and include a reference low beam image 31a representing a reference low beam light distribution pattern, a plurality of right curved road low beam images 31b, and a plurality of left curved road low beam images 31c. FIG. 4 illustrates three layers of a layer in which the reference low beam image 31a is arranged, a layer in which the specific right curved road low beam image 31b is arranged, and a layer in which the specific left curved road low beam image 31c is arranged, and a description of the other layers is omitted. As described above, the image representing the light distribution pattern of the light emitted to the front of the vehicle 100 is an image obtained by vertically and horizontally inverting the image representing the light distribution pattern of the light emitted from the light source unit 12. In the present embodiment, an upper right pixel in the image illustrated in FIG. 4 corresponds to a lower right light emitting element 13 illustrated in FIG. 3, and a lower left pixel in the image illustrated in FIG. 4 corresponds to an upper left light emitting element 13 illustrated in FIG. 3. That is, the correspondence relationship is vertically inverted. Therefore, the light distribution pattern of the light emitted to the front of the vehicle 100 is a light distribution pattern corresponding to the image illustrated in FIG. 4. Furthermore, pixels of images in the following drawings correspond to the light emitting elements 13, similarly to the image illustrated in FIG. 4. The right curved road low beam images 31b are associated with different right steering angles, and are images each representing a light distribution pattern obtained by moving the elbow point and the hot zone in the reference low beam light distribution pattern rightward by a predetermined distance corresponding to the steering angle. In addition, the left curved road low beam images 31c are associated with different left steering angles, and are images each representing a light distribution pattern obtained by moving the elbow point and the hot zone in the reference low beam light distribution pattern leftward by a predetermined distance corresponding to the steering angle. The predetermined distance corresponding to the steering angle is short when the steering angle is small, and is long when the steering angle is large. The low beam images 31a, 31b, and 31c arranged in the layers of the low beam layer group 21 at least partially overlap each other. Therefore, the light distribution patterns formed by the low beam images 31a, 31b, and 31c are different from each other and at least partially overlap each other.

The additional light distribution layer group 22 of the present embodiment includes a plurality of layers. The memory ME stores a plurality of additional light distribution images for forming different additional light distribution patterns by light emitted from the light source unit 12. The image generation unit 20 reads the additional light distribution images from the memory ME and arranges the additional light distribution images one by one in different layers in the additional light distribution layer group 22. The additional light distribution pattern is a light distribution pattern added to the low beam light distribution pattern to form a high beam light distribution pattern. In the present embodiment, the additional light distribution layer group 22 includes two layers. In one layer, a reference additional light distribution image 32a representing an additional light distribution pattern in a reference high beam used during normal traveling is arranged. In the other layer, a high-speed additional light distribution image 32b representing another additional light distribution pattern having a width different from a width of the additional light distribution pattern in the reference high beam in the horizontal direction is arranged. The width of the another additional light distribution pattern in the horizontal direction is smaller than the width of the additional light distribution pattern in the horizontal direction. The additional light distribution images 32a and 32b arranged in the additional light distribution layer group 22 at least partially overlap each other. Therefore, the light distribution patterns formed by the additional light distribution images 32a and 32b are different from each other and at least partially overlap each other. Further, a part of the additional light distribution images 32a and 32b and a part of each of the low beam images arranged in the layers of the low beam layer group 21 overlap each other.

The first additional image layer group 23 includes a plurality of layers. The memory ME stores a plurality of first additional images to be superimposed on a part of the additional light distribution images, and the image generation unit 20 reads the first additional images from the memory ME and arranges the first additional images one by one in different layers in the first additional image layer group 23. The plurality of first additional images are superimposed on a part of the reference additional light distribution image 32a and a part of the high-speed additional light distribution image 32b. In the present embodiment, the plurality of first additional images include a plurality of darkened images and a plurality of brightened images, and each of the plurality of first additional images is one of the plurality of darkened images and the plurality of brightened images. In the present embodiment, the plurality of darkened images include a plurality of slightly darkened images 33a including a first image element fe and a plurality of highly darkened images 33b including a second image element se darker than the first image element fe. Then, the first additional image layer group 23 includes a slightly darkened layer group 23a including a plurality of layers in which the plurality of slightly darkened images 33a are arranged, a highly darkened layer group 23b including a plurality of layers in which the plurality of highly darkened images 33b are arranged, and a brightened layer group 23c including a plurality of layers in which a plurality of brightened images 33c are arranged. FIG. 4 illustrates three layers in which one slightly darkened image 33a, one highly darkened image 33b, and one brightened image 33c are arranged, and a description of the other layers is omitted. In the present embodiment, priorities of the highly darkened layer group 23b, the slightly darkened layer group 23a, and the brightened layer group 23c are lower in the order of the highly darkened layer group 23b, the slightly darkened layer group 23a, and the brightened layer group 23c. However, the priorities of the layer groups 23a, 23b, and 23c and a priority of each layer in the layer groups 23a, 23b, and 23c are not particularly limited, and may be changeable. The first additional images may include only a plurality of darkened images or may include only a plurality of brightened images.

Figure 5:
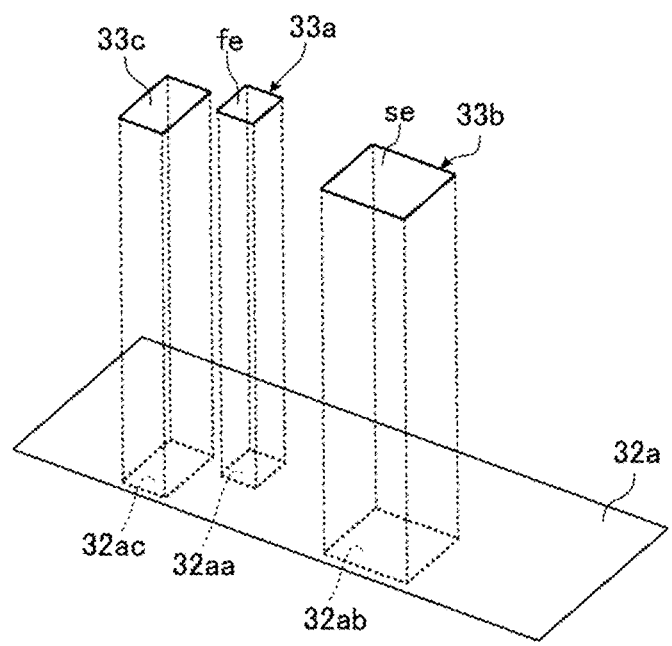
FIG. 5 is a view for describing a slightly darkened image, a highly darkened image, and a brightened image.

FIG. 5 is a view for describing the slightly darkened image 33a, the highly darkened image 33b, and the brightened image 33c, and illustrates an example of a state where the images 33a, 33b, and 33c are superimposed on a part of the reference additional light distribution image 32a. As illustrated in FIG. 5, images 33a, 33b, and 33c overlap regions 32aa, 32ab, and 32ac in the reference additional light distribution image 32a. The slightly darkened image 33a is darker than the region 32aa in the reference additional light distribution image 32a. Furthermore, although a description by illustration is omitted, at least parts of the plurality of slightly darkened images 33a that overlap the region 32aa in the reference additional light distribution image 32a are different from each other. Furthermore, the first image elements fe included in the slightly darkened images 33a are quadrangles having the same predetermined brightness value, and have different positions, areas, aspect ratios, and the like. However, the brightness in the first image element fe does not have to be constant, and the shape of the first image element fe is not particularly limited. Furthermore, the slightly darkened image 33a may include a plurality of first image elements fe separated from each other.

The highly darkened image 33b is darker than the region 32ab in the additional light distribution image 32a and the slightly darkened image 33a. Furthermore, although a description by illustration is omitted, at least parts of the plurality of highly darkened images 33b that overlap the region 32ab in the additional light distribution image 32a are different from each other. Furthermore, the second image elements se included in the highly darkened images 33b are quadrangles having the same predetermined brightness value, and have different positions, areas, aspect ratios, and the like. However, the brightness in the second image element se does not have to be constant, and the shape of the second image element se is not particularly limited. Furthermore, the highly darkened image 33b may include a plurality of second image elements se separated from each other. The brightness of the second image element se may be 0.

The brightened image 33c is brighter than the region 32ac in the reference additional light distribution image 32a. Furthermore, although a description by illustration is omitted, at least parts of the plurality of brightened images 33c that overlap the region 32ac in the reference additional light distribution image 32a are different from each other. In the present embodiment, the brightened images 33c each include one quadrangular image element having the same brightness, and the image elements have different positions, areas, aspect ratios, and the like. However, the plurality of brightened images 33c are not particularly limited, and may include image elements having different brightnesses, shapes, and the like, or may include a plurality of image elements separated from each other.

The second additional image layer group 24 includes a plurality of layers. The memory ME stores a plurality of second additional images to be superimposed on a part of the low beam images, and the image generation unit 20 reads the second additional images from the memory ME and arranges the second additional images one by one in different layers in the second additional image layer group 24. In the present embodiment, the plurality of second additional images are superimposed on the reference low beam image 31a, the right curved road low beam image 31b, and the left curved road low beam image 31c. Furthermore, the plurality of second additional images include a plurality of darkened images 34a. The darkened image 34a is similar to the slightly darkened image 33a of the first additional image except that a target on which the darkened image 34a is to be superimposed is the low beam image. Therefore, although not illustrated, the darkened image 34a overlaps with a partial region in the low beam image, and is darker than a low beam image in the region. Furthermore, at least parts of the plurality of darkened images 34a that overlap the region of the low beam image are different from each other.

In the present embodiment, the darkened images 34a each include one quadrangular image element having the same brightness as the first image element fe included in the slightly darkened image 33a of the first additional image, and the image elements have different positions, areas, aspect ratios, and the like. However, the plurality of darkened images 34a are not particularly limited, and may include an image element having a brightness different from that of the first image element fe, may include image elements having different brightnesses, shapes, and the like, or may include a plurality of image elements separated from each other. Furthermore, although a description is omitted, the plurality of second additional images may include a plurality of slightly darkened images, a plurality of highly darkened images, and a plurality of brightened images, similarly to the first additional images.

Next, the light switch 110 of the present embodiment illustrated in FIG. 1 is a switch that selects any of low beam emission, high beam emission, and non-light emission. In a case where the low beam emission or high beam emission is selected, the light switch 110 outputs a signal indicating the selected state to the image generation unit 20 via an electronic control unit (ECU) 101 of the vehicle 100. However, the light switch 110 may also output a signal indicating the selected state to the image generation unit 20 without passing through the ECU 101. In addition, the light switch 110 does not output a signal in a case where the non-light emission is selected.

The detection device 120 of the present embodiment detects a predetermined target object positioned in front of the vehicle 100. Examples of the predetermined target object include a retroreflective object, a human such as a pedestrian, other vehicles such as a preceding vehicle and an oncoming vehicle, and an obstacle. The retroreflective object of the present embodiment is an object that does not emit light by itself and retroreflects emitted light at a predetermined spread angle, and examples of such a retroreflective object include a road sign, a delineator, and the like. Examples of a configuration of the detection device 120 include a configuration including a camera and a detection unit. Examples of the camera include a visible light camera and an infrared camera, and examples of the cameras include a charged coupled device (CCD) camera. The camera is attached to a front portion of the vehicle 100 and captures an image of an area in front of the vehicle 100. The image captured by the camera includes at least a part of a region that can be irradiated with light emitted from the pair of vehicle headlights 1.

The detection unit has, for example, a configuration similar to that of the control unit CO. The detection unit performs predetermined image processing on the image captured by the camera, and detects the presence of the predetermined target object, a position where the predetermined target object is present in the captured image, the type of the predetermined target object, and the like from the image subjected to the image processing. In a case where the predetermined target object positioned in front of the vehicle 100 is detected, the detection device 120 outputs a signal indicating information such as the presence of the predetermined target object, the position where the predetermined target object is present in the captured image, and the type of the predetermined target object to the image generation unit 20 via the ECU 101. In a case where the predetermined target object positioned in front of the vehicle 100 is not detected, the detection device 120 outputs a signal indicating that the predetermined target object does not exist to the image generation unit 20 via the ECU 101. However, the detection device 120 does not have to output the signal.

The detection device 120 may be configured to detect a retroreflective object or a human, and the predetermined target object to be detected, the number of types of the predetermined target objects, and the configuration of the detection device 120 are not particularly limited. For example, the detection device 120 may include a millimeter wave radar, a light detection and ranging (LiDAR), or the like capable of detecting an object positioned in front of the vehicle 100 instead of the camera, or may include a millimeter wave radar, a LiDAR, or the like in addition to the camera.

The steering sensor 130 is a traveling state detection unit that detects a traveling state of the vehicle 100, and is a sensor that detects a steering angle of the vehicle 100. The steering sensor 130 detects the steering angle from, for example, a rotation angle of a steering wheel of the vehicle 100. The steering sensor 130 detects a right steering angle and a left steering angle while identifying the right steering angle and the left steering angle as different steering angles, and outputs a signal indicating the detected steering angles to the image generation unit 20 via the ECU 101. In the present embodiment, both the left and right steering angles are set to positive values.

The vehicle speed sensor 140 is a traveling state detection unit that detects a traveling state of the vehicle 100, and is a sensor that detects a traveling speed of the vehicle 100. The vehicle speed sensor 140 detects the traveling speed from a rotation speed of a tire, for example. The vehicle speed sensor 140 outputs a signal indicating the detected traveling speed to the image generation unit 20 via the ECU 101.

Figure 6:
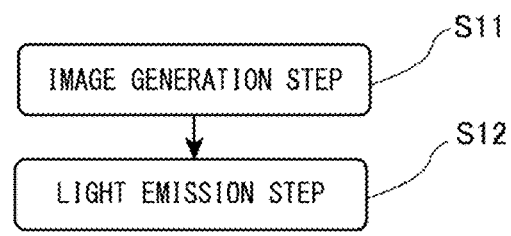
FIG. 6 is a flowchart illustrating an operation of the vehicle headlight.

Next, an operation of the vehicle headlight 1 of the present embodiment will be described. In the present embodiment, operations of the pair of vehicle headlights 1 are the same and synchronized with each other. Therefore, hereinafter, the operation of one vehicle headlight 1 will be described, and a description of the operation of the other vehicle headlight 1 will be omitted. FIG. 6 is a flowchart illustrating the operation of the vehicle headlight 1. As illustrated in FIG. 6, the operation of the vehicle headlight 1 of the present embodiment includes an image generation step S11 and a light emission step S12.

(Image Generation Step S11)

The image generation step is a step in which the image generation unit 20 generates an image of light emitted from the light source unit 12. In the present embodiment, the image generation unit 20 selects at least one image to be arranged in the layer based on at least one of signals input from the light switch 110, the detection device 120, the steering sensor 130, and the vehicle speed sensor 140 via the ECU 101. The selected image includes at least an image arranged in the layer of the low beam layer group 21. Then, the image generation unit 20 generates an image representing at least one of at least a part of the low beam light distribution pattern or at least a part of the high beam light distribution pattern based on the selected image, and outputs information of the image to the control unit CO. The image generation unit 20 repeats generation of such an image at predetermined time intervals. In a case where no signal is input from the light switch 110, the image generation unit 20 does not generate the image. Details of this step will be described below.

(Light Emission Step S12)

The light emission step is a step of emitting light based on the image generated by the image generation unit 20 from the light source unit 12. In this step, the control unit CO controls the power supply circuit 50 based on information of the image to supply power to each light emitting element 13 from a power supply (not illustrated), so that the light source unit 12 emits light based on the image generated by the image generation unit 20. As the power is supplied, the light source unit 12 emits light based on the image generated by the image generation unit 20, and light having a light distribution pattern corresponding to the image is emitted from the vehicle headlight 1. The light emitting element 13 corresponding to a pixel having a larger grayscale value is supplied with more power, and in the present embodiment, in a case where the grayscale value exceeds a threshold, power corresponding to the threshold is supplied to the light emitting element 13. As described above, the image generation unit 20 repeats image generation at predetermined time intervals. Therefore, the light distribution pattern of the light emitted from the vehicle headlight 1 changes as the image generated by the image generation unit 20 changes. In this way, the vehicle headlight 1 controls distribution of emitted light.

Next, the image generation step S11 of the present embodiment will be described in detail.

First Example of Image Generation Step S11

In this example, an image representing at least a part of the low beam light distribution pattern is generated based on a signal from the steering sensor 130, and the signal from the steering sensor 130 and a signal indicating the low beam emission from the light switch 110 are input to the image generation unit 20.

In this example, the memory ME stores information indicating a layer in which the reference low beam image 31a is arranged as information indicating a reference layer. The image generation unit 20 selects a specific low beam image related to the minimum steering angle larger than a steering angle indicated by the signal from the steering sensor 130 among steering angles s associated with the plurality of low beam images. Next, the image generation unit 20 compares the reference layer stored in the memory ME with a layer in which the selected specific low beam image is arranged. In a case where the reference layer and the layer in which the selected specific low beam image is arranged are the same, the image generation unit 20 generates the specific low beam image. In the present embodiment, the image generation unit 20 generates the specific low beam image by setting an opacity of the layer in which the specific low beam image is arranged to 100% and setting an opacity of all the other layers to 0%, and outputs information of the generated image to the control unit CO. Therefore, light having the low beam light distribution pattern corresponding to the steering angle is emitted from the vehicle headlight 1. In addition, since the image generated by the image generation unit 20 does not change, the low beam light distribution pattern emitted from the vehicle headlight 1 is maintained.

Figure 7:
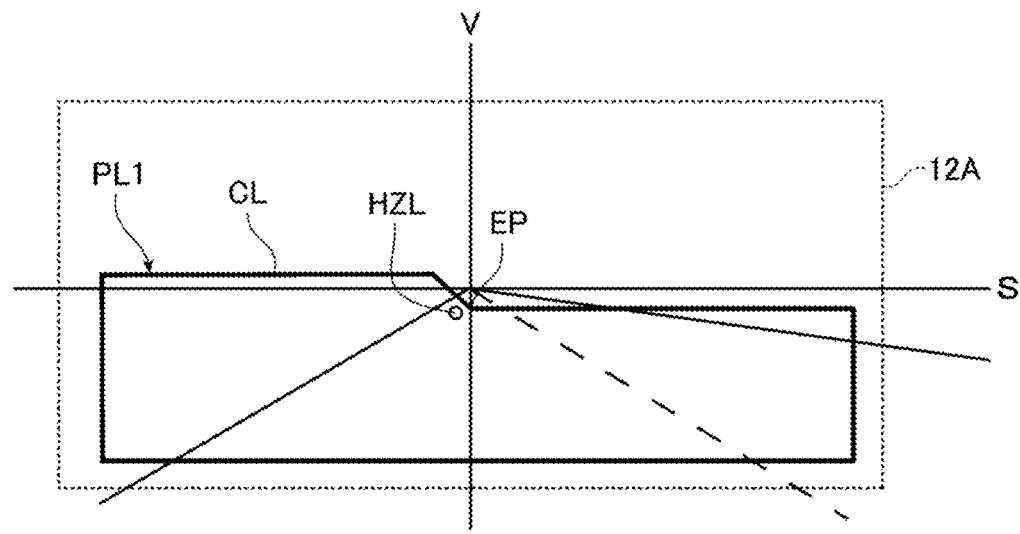
FIG. 7 is a view illustrating an example of a low beam light distribution pattern in the first embodiment.

FIG. 7 is a view illustrating an example of the low beam light distribution pattern in the present embodiment, which is the reference low beam light distribution pattern formed when the image generation unit 20 selects the reference low beam image 31a. In FIG. 7, S indicates a horizontal line, V indicates a vertical line passing through the center of the vehicle 100 in the horizontal direction, and a low beam light distribution pattern PL1 projected on a virtual vertical screen arranged 25 m ahead of the vehicle 100 is indicated by a thick line. In addition, a region 12A that can be irradiated with light emitted from the light source unit 12 is indicated by a dotted line. A cutoff line CL in the low beam light distribution pattern PL1 of the present embodiment has an elbow point EP positioned below the horizontal line S and on or near the vertical line V, so that a step is formed. Further, a hot zone HZL, which is a region having the highest light intensity in the low beam light distribution pattern PL1, is positioned near the elbow point EP. That is, the reference low beam image 31a is an image representing such a low beam light distribution pattern PL1.

On the other hand, in a case where the reference layer is different from the layer in which the selected specific low beam image is arranged, the image generation unit 20 generates the specific low beam image and an image in the middle of change by combining a predetermined low beam image arranged in the reference layer and the specific low beam image. Here, when an image representing a first light distribution pattern which is a light distribution pattern before a change is defined as a first image, and an image representing a second light distribution pattern which is a light distribution pattern after the change is defined as a second image, the predetermined low beam image is the first image, and the specific low beam image is the second image. The image generation unit 20 generates an image by superimposing the specific low beam image as the second image on at least a part of the predetermined low beam image as the first image and fading in the specific low beam image as the second image, and fading out the predetermined low beam image as the first image. In the present embodiment, the image generation unit 20 sequentially generates images by gradually decreasing the opacity of the layer of the predetermined low beam image from 100% to 0% and gradually increasing the opacity of the layer of the specific low beam image from 0% to 100%. At this time, the opacity of the layers other than the layers of the predetermined low beam image and the specific low beam image is 0%. In addition, the opacity is changed in such a way that the total value of the opacity of the layer of the predetermined low beam image and the opacity of the layer of the specific low beam image is 100. The total value does not have to be 100, and there may be one image in the middle of change generated by the image generation unit 20. In addition, a change period is, for example, 1.0 s, and a time interval at which a plurality of images are generated is, for example, 0.01 s, but the change period and the time interval are not particularly limited.

The image generation unit 20 rewrites the reference layer stored in the memory ME with the layer of the specific low beam image selected based on the signal from the steering sensor 130, and outputs information of a plurality of images generated in this manner to the control unit CO. Therefore, the image formed by the light source unit 12 sequentially changes to become the specific low beam image. Therefore, the light distribution pattern of the light emitted from the vehicle headlight 1 gradually changes from the low beam light distribution pattern to a specific low beam light distribution pattern corresponding to the steering angle.

Figure 8:
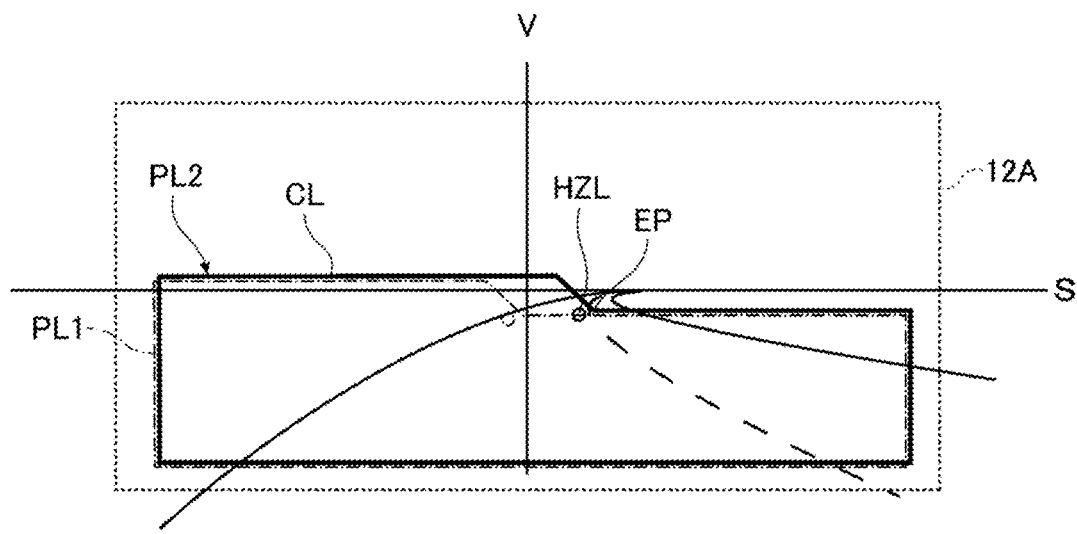
FIG. 8 is a view illustrating another example of the low beam light distribution pattern in the first embodiment similarly to FIG. 7.

FIG. 8 is a view illustrating another example of the low beam light distribution pattern in the present embodiment similarly to FIG. 7, and illustrates an example of the low beam light distribution pattern formed when the image generation unit 20 selects the right curved road low beam image 31b. In FIG. 8, the low beam light distribution pattern PL1 is indicated by a line with alternating long and short dashes. The low beam light distribution pattern PL1 is slightly shifted vertically and horizontally. In a case where the predetermined low beam image is the reference low beam image 31a and the specific low beam image is the right curved road low beam image 31b, the low beam light distribution pattern PL1 illustrated in FIG. 7 changes to a low beam light distribution pattern PL2 illustrated in FIG. 8. At this time, the low beam light distribution pattern PL2 fades in and the low beam light distribution pattern PL1 fades out, and the low beam light distribution pattern emitted from the vehicle headlight 1 becomes the low beam light distribution pattern PL2.

Second Example of Image Generation Step S11

Next, a second example of the image generation step S11 will be described. In this example, an image representing at least a part of the high beam light distribution pattern is generated based on a signal from the vehicle speed sensor 140, and the signal from the vehicle speed sensor 140 and a signal indicating the high beam emission from the light switch 110 are input to the image generation unit 20.

In this example, the memory ME stores information indicating a layer of the reference additional light distribution image 32a as information indicating the reference layer. The image generation unit 20 selects the reference additional light distribution image 32a in a case where a traveling speed indicated by the signal from the vehicle speed sensor 140 is lower than a predetermined speed, and selects the high-speed additional light distribution image 32b in a case where the traveling speed is equal to or higher than the predetermined speed. The predetermined speed is, for example, 80 km/h. Next, the image generation unit 20 compares the reference layer stored in the memory ME with a layer of the selected additional light distribution image. When the reference layer is the same as the layer of the selected additional light distribution image, the image generation unit 20 generates a high beam image in which the selected additional light distribution image is superimposed on a part of the reference low beam image 31a. In the present embodiment, in a case where the reference additional light distribution image 32a is selected, the opacity of the layer of the reference low beam image 31a and a layer of the reference additional light distribution image 32a is set to 100%, and the opacity of all the other layers is set to 0%, so that a normal high beam image is generated. Furthermore, in a case where the high-speed additional light distribution image 32b is selected, the opacity of the layer of the reference low beam image 31a is set to 100%, an opacity of a layer of the high-speed additional light distribution image 32b is set to 100%, and the opacity of all the other layers is set to 0%, so that a high-speed high beam image is generated. Then, the image generation unit 20 outputs the generated normal high beam image or high-speed high beam image to the control unit CO. Therefore, in a case where the traveling speed is lower than the predetermined speed, light having a normal high beam light distribution pattern is emitted from the vehicle headlight 1, and in a case where the traveling speed is equal to or higher than the predetermined speed, light having a high-speed high beam light distribution pattern PH2 is emitted from the vehicle headlight 1.

Figure 9:
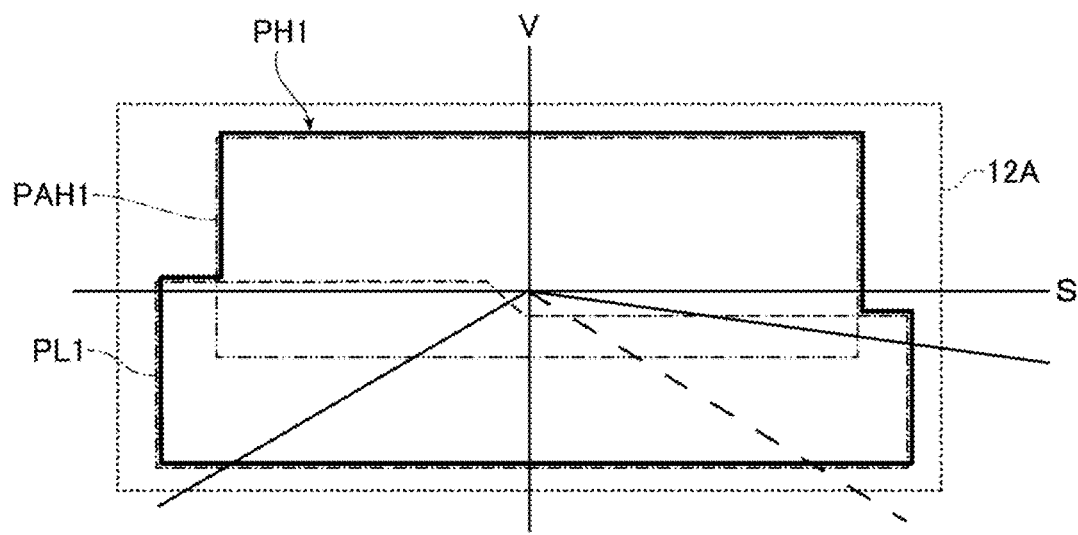
FIG. 9 is a view illustrating an example of a high beam light distribution pattern in the first embodiment similarly to FIG. 7.
Figure 10:
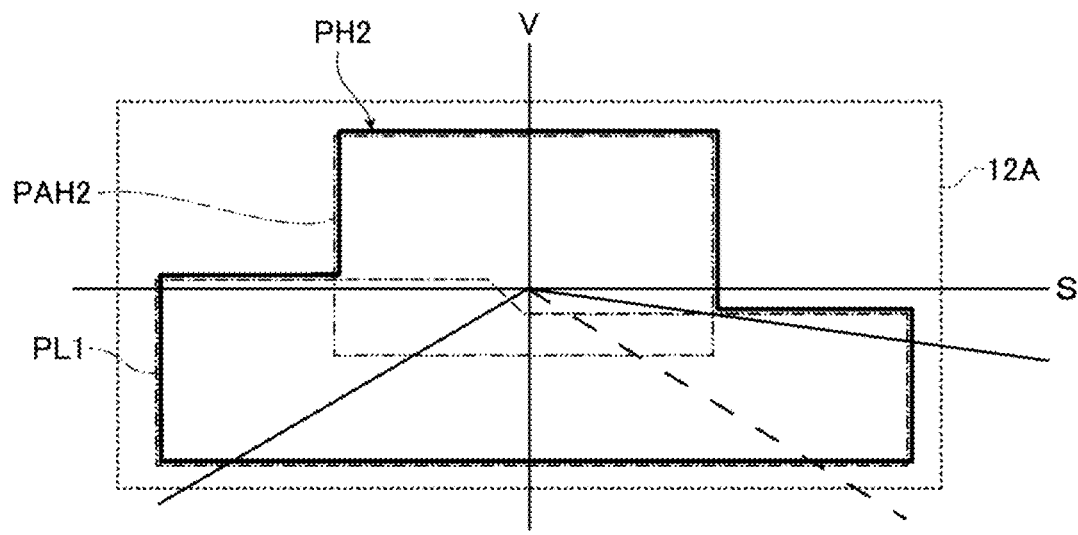
FIG. 10 is a view illustrating another example of the high beam light distribution pattern in the first embodiment similarly to FIG. 9.

FIG. 9 is a view illustrating an example of the high beam light distribution pattern in the present embodiment similarly to FIG. 7, and illustrates the normal high beam light distribution pattern. FIG. 10 is a view illustrating another example of the high beam light distribution pattern in the present embodiment similarly to FIG. 9, and illustrates the high-speed high beam light distribution pattern.

As described above, the normal high beam light distribution pattern PH1 illustrated in FIG. 9 is formed by light based on the normal high beam image in which the reference additional light distribution image 32a is superimposed on a part of the reference low beam image 31a. Therefore, it can be understood that the normal high beam light distribution pattern PH1 is formed by superimposing the additional light distribution pattern PAH1 on the low beam light distribution pattern PL1. In FIG. 9, the low beam light distribution pattern PL1 is indicated by a line with alternating long and short dashes, and the additional light distribution pattern PAH1 is indicated by a line with alternating long and two short dashes. In addition, the high-speed high beam light distribution pattern PH2 illustrated in FIG. 10 is formed by light based on the high-speed high beam image in which the high-speed additional light distribution image 32b is superimposed on a part of the reference low beam image 31a as described above. Therefore, it can be understood that the high-speed high beam light distribution pattern PH2 is formed by superimposing another additional light distribution pattern PAH2 obtained by decreasing a width of the additional light distribution pattern PAH1 in the horizontal direction on the low beam light distribution pattern PL1. In FIG. 10, the low beam light distribution pattern PL1 is indicated by a line with alternating long and short dashes, and another additional light distribution pattern PAH2 is indicated by a line with alternating long and two short dashes. There is a case of decreasing the width of the additional light distribution pattern to be added to the low beam light distribution pattern in the horizontal direction at the time of high-speed traveling in order to improve the visibility. As described above, in a case where the traveling speed is equal to or higher than the predetermined speed, light having the high-speed high beam light distribution pattern PH2 is emitted from the vehicle headlight 1, so that the width of the additional light distribution pattern added to the low beam light distribution pattern in the horizontal direction is decreased. Therefore, with the vehicle headlight 1 of the present embodiment, it is possible to improve the visibility for the driver during high-speed traveling.

Figure 11:
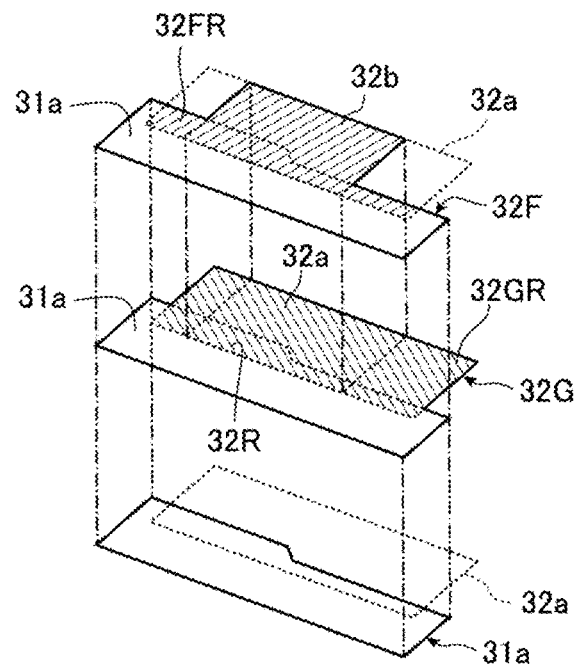
FIG. 11 is a view for describing superimposition of a reference low beam image and a reference additional light distribution image.

On the other hand, in a case where the reference layer is different from the layer of the selected additional light distribution image, the image generation unit 20 generates an image in which the selected additional light distribution image is superimposed on a part of the reference low beam image 31a and an image in the middle of change by combining the normal high beam image and the high-speed high beam image. Hereinafter, a case where the selected additional light distribution image is the high-speed additional light distribution image 32b will be described as an example. When an image representing a first light distribution pattern which is a light distribution pattern before a change is defined as a first image, and an image representing a second light distribution pattern which is a light distribution pattern after the change is defined as a second image, the normal high beam image is the first image, and the high-speed high beam image is the second image. The image generation unit 20 generates an image by superimposing the high-speed high beam image as the second image on at least a part of the normal high beam image as the first image and fading in the high-speed high beam image as the second image, and fading out the normal high beam image as the first image. In the present embodiment, the normal high beam image as the first image is generated by superimposing the reference additional light distribution image 32a on a part of the reference low beam image 31a, and the high-speed high beam image as the second image is generated by superimposing the high-speed additional light distribution image 32b on a part of the reference low beam image 31a. Therefore, as illustrated in FIG. 11, in a normal high beam image 32G and a high-speed high beam image 32F, portions 32GR and 32FR overlapping at least one of the reference additional light distribution image 32a and the high-speed additional light distribution image 32b are different, and the other parts are the same. In FIG. 11, the portions 32GR and 32FR are hatched with oblique lines. Therefore, in the present embodiment, in a state where the layer of the reference low beam image 31a and the layer of the reference additional light distribution image 32a have the opacity of 100% and the opacity of all the other layers is 0%, the image generation unit 20 sequentially generates images by gradually decreasing the opacity of the reference additional light distribution image 32a to 0% and gradually increasing the opacity of the layer of the high-speed additional light distribution image 32b from 0% to 100%. That is, the image generation unit 20 generates an image by fading in only a portion different from the normal high beam image 32G as the first image in the high-speed high beam image as the second image on the normal high beam image 32G and fading out only a portion different from the high-speed high beam image 32F in the normal high beam image 32G. Therefore, an operation load of the image generation unit 20 can be reduced as compared with a case of fade-in and fade-out using the entire normal high beam image 32G and the high-speed high beam image 32F. The opacity is changed in such a way that the total value of the opacity of the layer of the reference additional light distribution image 32a and the opacity of the layer of the high-speed additional light distribution image 32b is 100, but the total value does not have to be 100, and there may be one image in the middle of change generated by the image generation unit 20. Furthermore, a change period and a time interval at which images are generated in this case are the same as those in the first example, and are not particularly limited. In a case where the selected additional light distribution image is the reference additional light distribution image 32a, the reference additional light distribution image 32a and the high-speed additional light distribution image 32b are merely switched in the above description, and thus a description thereof will be omitted.

The image generation unit 20 rewrites the reference layer stored in the memory ME with the layer of the additional light distribution image selected based on the signal from the vehicle speed sensor 140, and outputs information of a plurality of images generated in this manner to the control unit CO. Therefore, the image formed by the light source unit 12 sequentially changes from the normal high beam image 32G to the high-speed high beam image 32F or vice versa. Therefore, the light distribution pattern of the light emitted from the vehicle headlight 1 gradually changes from the normal high beam light distribution pattern PH1 to the high-speed high beam light distribution pattern PH2, or vice versa.

Third Example of Image Generation Step S11

Next, a third example of the image generation step S11 will be described. In this example, an image representing at least a part of the low beam light distribution pattern or at least a part of the high beam light distribution pattern is generated based on a signal from the light switch 110.

In this example, a reference value indicating a light emission state is stored in the memory ME, and 0 indicating the low beam emission or "1" indicating the high beam emission is stored as an initial value. In a case where the signal input from the light switch 110 indicates the low beam emission and the reference value stored in the memory ME is 0, the image generation unit 20 generates the reference low beam image 31a. In the present embodiment, the image generation unit 20 generates the reference low beam image 31a by setting the opacity of the layer of the reference low beam image 31a to 100% and setting the opacity of all the other layers to 0%. Further, in a case where the signal input from the light switch 110 indicates the high beam emission and the reference value stored in the memory ME is "1", the image generation unit 20 generates the normal high beam image 32G in which the reference additional light distribution image 32a is superimposed on a part of the reference low beam image 31a. In the present embodiment, the image generation unit 20 generates the high beam image by setting the opacity of the layer of the reference low beam image 31a and the layer of the reference additional light distribution image 32a to 100% and setting the opacity of all the other layers to 0%. Then, the image generation unit 20 outputs the generated reference low beam image 31a or normal high beam image 32G to the control unit CO. Therefore, in a case where the low beam emission is selected by the light switch 110, light having the low beam light distribution pattern PL1 is emitted from the vehicle headlight 1, and in a case where the high beam emission is selected by the light switch 110, light having the normal high beam light distribution pattern PH1 is emitted from the vehicle headlight 1.

On the other hand, in a case where the signal input from the light switch 110 indicates the low beam emission and the reference value stored in the memory ME is "1", the reference low beam image 31a, the reference low beam image 31a, and the normal high beam image 32G are combined to generate an image in the middle of change, and the reference value is rewritten to 0. In a case where the signal input from the light switch 110 indicates the high beam emission and the reference value stored in the memory ME is 0, the reference low beam image 31a and the normal high beam image 32G are combined to generate an image in the middle of change together with the normal high beam image 32G, and the reference value is rewritten to "1".

First, a case where the signal input from the light switch 110 indicates the high beam emission and the reference value stored in the memory ME is 0 will be described. When an image representing a first light distribution pattern which is a light distribution pattern before a change is a first image, and an image representing a second light distribution pattern which is a light distribution pattern after the change is a second image, the reference low beam image 31a is the first image, and the normal high beam image 32G is the second image. The image generation unit 20 generates an image in the middle of change by superimposing the normal high beam image 32G as the second image on at least a part of the reference low beam image 31a as the first image and fading in the normal high beam image 32G as the second image, and fading out the reference low beam image 31a as the first image to. In the present embodiment, the normal high beam image 32G as the second image is generated by superimposing the reference additional light distribution image 32a on a part of the reference low beam image 31a. Therefore, in the reference low beam image 31a and the normal high beam image 32G, portions overlapping the reference additional light distribution image 32a are different from each other, and the other portions are the same. Therefore, in the present embodiment, the image generation unit 20 sequentially generates images by gradually increasing the opacity of the layer of the reference additional light distribution image 32a to 100% in a state where the opacity of the layer of the reference low beam image 31a is 100% and the opacity of all the other layers is 0%. That is, the image generation unit 20 generates an image by fading in only a portion different from the reference low beam image 31a as the first image in the normal high beam image 32G as the second image on the reference low beam image 31a and fading out only a portion different from the normal high beam image 32G in the reference low beam image 31a. Therefore, an operation load of the image generation unit 20 can be reduced as compared with a case of fade-in and fade-out using the reference low beam image 31a and the normal high beam image 32G. There may be one image in the middle of change generated by the image generation unit 20. Furthermore, a change period and a time interval at which images are generated in this case are the same as those in the first example, and are not particularly limited.

In a case where the signal input from the light switch 110 indicates the low beam emission and the reference value stored in the memory ME is "1", the reference low beam image 31a is the second image and the normal high beam image 32G is the first image. The image generation unit 20 generates an image by superimposing the reference low beam image 31a as the second image on at least a part of the normal high beam image 32G as the first image and fading in the reference low beam image 31a as the second image, and fading out the normal high beam image 32G as the first image. In the present embodiment, the image generation unit 20 sequentially generates images by gradually decreasing the opacity of the layer of the reference additional light distribution image 32a to 0% in a state where each layer has an opacity for generating the normal high beam image 32G as the first image.

The image generation unit 20 outputs information of a plurality of images generated in this manner to the control unit CO. Therefore, the image formed by the light source unit 12 sequentially changes, and changes from the reference low beam image 31a to the normal high beam image 32G or vice versa. Therefore, the light distribution pattern of the light emitted from the vehicle headlight 1 gradually changes from the low beam light distribution pattern PL1 to the normal high beam light distribution pattern PH1 or vice versa.

Fourth Example of Image Generation Step S11

Next, a fourth example of the image generation step S11 will be described. In this example, an image representing at least a part of the high beam light distribution pattern is generated based on information of a predetermined target object input from the detection device 120, and the information of the predetermined target object from the detection device 120 and a signal indicating high beam emission from the light switch 110 are input to the image generation unit 20.

In this example, the image generation unit 20 selects at least one additional image from a plurality of first additional images and a plurality of second additional images based on the information of the predetermined target object input from the detection device 120. Further, information indicating a layer of the selected additional image is stored in the memory ME as information indicating the reference layer. Next, the image generation unit 20 generates a predetermined high beam image by superimposing the selected additional image on a part of the reference additional light distribution image 32a or a part of the reference low beam image 31a and further superimposing the reference low beam image 31a on a part of the reference additional light distribution image 32a. That is, the image generation unit 20 generates the predetermined high beam image by superimposing the selected additional image on the normal high beam image 32G. As described above, the first additional images include the slightly darkened image 33a, the highly darkened image 33b, and the brightened image 33c, and the second additional images include the darkened image 34a. Therefore, a brightness of a region overlapping the selected additional image in the reference additional light distribution image 32a changes from that before the additional image is superimposed, and a brightness of a region overlapping the additional image in the reference low beam image 31a changes from that before the additional image is superimposed. Therefore, the predetermined high beam image is an image representing a predetermined high beam light distribution pattern obtained by changing the amount of light of a partial region in the normal high beam light distribution pattern PH1. The image generation unit 20 selects at least one additional image from the plurality of first additional images and the plurality of second additional images in such a way as to generate an image representing the predetermined high beam light distribution pattern obtained by changing the amount of light of a predetermined region overlapping the predetermined target object in the normal high beam light distribution pattern PH1. In the present embodiment, the image generation unit 20 selects the slightly darkened image 33a as the first additional image and the darkened image 34a as the second additional image in such a way that the amount of light of a first predetermined region overlapping a retroreflective object as the predetermined target object decreases. In addition, the image generation unit 20 selects the brightened image 33c as the first additional image in such a way that the amount of light of a second predetermined region overlapping a human as the predetermined target object increases. In addition, the image generation unit 20 selects the highly darkened image 33b as the first additional image in such a way that the amount of light of a third predetermined region overlapping another vehicle as the predetermined target object decreases.

In the present embodiment, the image generation unit 20 generates the predetermined high beam image by setting the opacity of the layer of the reference low beam image 31a, the layer of the reference additional light distribution image 32a, and a layer of the selected additional image to 100% and setting the opacity of all the other layers to 0%. Then, the image generation unit 20 outputs the generated predetermined high beam image to the control unit CO. Therefore, light having the predetermined high beam light distribution pattern is emitted from the vehicle headlight 1.

Figure 12:
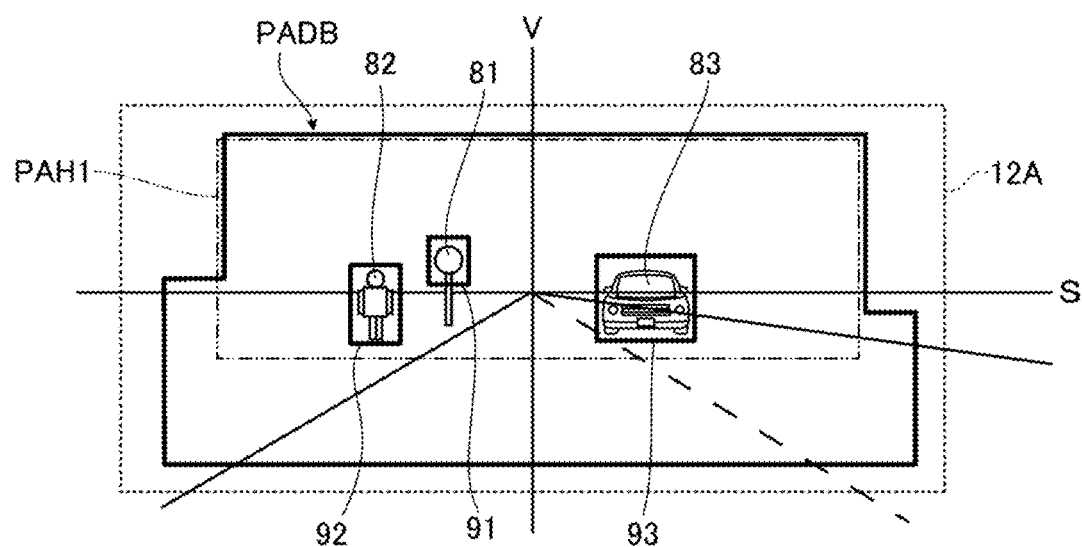
FIG. 12 is a view illustrating still another example of the high beam light distribution pattern in the first embodiment similarly to FIG. 9.

FIG. 12 is a view illustrating still another example of the high beam light distribution pattern in the present embodiment similarly to FIG. 9, and is a view illustrating the predetermined high beam light distribution pattern when the detection device 120 detects a retroreflective object 81, a human 82, and another vehicle 83 as the predetermined target objects. In FIG. 12, the retroreflective object 81 is a road sign, and the another vehicle 83 is an oncoming vehicle. In a predetermined high beam light distribution pattern PADB, the amount of light of a first predetermined region 91 overlapping the retroreflective object 81 is smaller than the amount of light of the first predetermined region 91 in the normal high beam light distribution pattern PH1. Therefore, with the vehicle headlight 1 of the present embodiment, it is possible to decrease the amount of reflected light reflected by the retroreflective object 81 toward the vehicle 100 that is the host vehicle, to suppress glare to the driver due to the reflected light, and to facilitate driving. In the example illustrated in FIG. 12, the first predetermined region 91 overlaps the entire retroreflective object 81, but it is sufficient if the first predetermined region 91 overlaps at least a part of the retroreflective object 81 from the viewpoint of facilitating driving. In the predetermined high beam light distribution pattern PADB, the amount of light of a second predetermined region 92 overlapping the human 82 is larger than the amount of light of the second predetermined region 92 in the normal high beam light distribution pattern PH1. Therefore, with the vehicle headlight 1 of the present embodiment, the amount of light emitted to the human 82 can be increased to facilitate visual recognition of the human 82 and driving. In the example illustrated in FIG. 12, the second predetermined region 92 overlaps the entire human 82, but it is sufficient if the second predetermined region 92 overlaps at least a part of the human 82 from the viewpoint of facilitating driving. In the predetermined high beam light distribution pattern PADB, the amount of light of a third predetermined region 93 overlapping the another vehicle 83 is smaller than the amount of light of the third predetermined region 93 in the normal high beam light distribution pattern PH1 and smaller than the amount of light of the first predetermined region 91 in the predetermined high beam light distribution pattern PADB. Therefore, with the vehicle headlight 1 of the present embodiment, it is possible to further suppress glare to a driver of the another vehicle 83 and to further suppress deterioration in visibility of the retroreflective object 81 as compared with a case where the amount of light of the third predetermined region 93 in the predetermined high beam light distribution pattern PADB is the same as the amount of light of the first predetermined region 91 in the predetermined high beam light distribution pattern PADB. In the example illustrated in FIG. 12, the third predetermined region 93 overlaps the entire another vehicle 83, but it is sufficient if the third predetermined region 93 overlaps at least a part of a visual recognition portion for the driver of the another vehicle 83 to visually recognize the outside of the vehicle from the viewpoint of suppressing glare to the driver of the another vehicle 83. The visual recognition portion is, for example, a front window in a case where the another vehicle 83 is an oncoming vehicle, and is, for example, a side mirror, a rear window, an imaging device that images an area behind the vehicle, or the like in a case where the another vehicle 83 is a preceding vehicle.

Here, in a case where at least one of the reference layers stored in the memory ME is different from at least one of the layers of the selected additional images due to a change in information of the predetermined target object input from the detection device 120, the image generation unit 20 generates an image as follows. The image generation unit 20 generates another predetermined high beam image based on the selected additional image as a second image to be a second light distribution pattern which is a light distribution pattern after the change and generates an image in the middle of change. At least one of the selected additional images is different from an additional image selected when generating an image representing the predetermined high beam light distribution pattern as a first light distribution pattern which is a light distribution pattern before the change. Therefore, at least a part of the predetermined region in the predetermined high beam light distribution pattern as the first light distribution pattern is different from at least a part of a predetermined region in the another predetermined high beam light distribution pattern as the second light distribution pattern. The image generation unit 20 generates an image by superimposing the another predetermined high beam image as the second image on at least a part of the predetermined high beam image as a first image and fading in the another predetermined high beam image as the second image and fading out the predetermined high beam image as the first image. In the predetermined high beam image and the another predetermined high beam image, portions different from each other are at least a part of a portion where the selected additional image is positioned, and the other portions are the same. Therefore, in the present embodiment, in a state where each layer has an opacity for generating the predetermined high beam image, the image generation unit 20 sequentially generates images by gradually increasing the opacity of the additional image added when the another predetermined high beam image is generated to 100% and gradually decreasing the opacity of the additional image not selected when the another predetermined high beam image is generated to 0%. That is, the image generation unit 20 generates an image by fading in only a portion different from the predetermined high beam image as the first image in the another predetermined high beam image as the second image on the predetermined high beam image and fading out only a portion different from the another predetermined high beam image in the predetermined high beam image. Therefore, an operation load of the image generation unit 20 can be reduced as compared with a case of fade-in and fade-out using the predetermined high beam image and the another predetermined high beam image. The opacity is changed in such a way that the total value of the gradually increased opacity and the gradually decreased opacity is 100, but the total value does not have to be 100, and there may be one image in the middle of change generated by the image generation unit 20. Furthermore, a change period and a time interval at which images are generated in this case are the same as those in the first example, and are not particularly limited.

The image generation unit 20 rewrites the reference layer stored in the memory ME with the layer of the additional image selected when the another predetermined high beam image is generated, and outputs information of a plurality of images generated in this manner to the control unit CO. Therefore, the image formed by the light source unit 12 sequentially changes from the predetermined high beam image to the another predetermined high beam image. Therefore, the light distribution pattern of the light emitted from the vehicle headlight 1 gradually changes from the predetermined high beam light distribution pattern to the another predetermined high beam light distribution pattern.

In a case where the detection device 120 does not detect the predetermined target object, that is, in a case where the information from the detection device 120 is not input, the image generation unit 20 generates the normal high beam image 32G without selecting the additional image. The light distribution pattern emitted from the vehicle headlight 1 changes from the normal high beam light distribution pattern to the predetermined high beam light distribution pattern or vice versa.

In a case where the change of the light distribution pattern of the emitted light is steep, the driver may feel uncomfortable for the change. In order to suppress such an uncomfortable feeling, for example, it is conceivable to gradually change the light distribution pattern and increase the number of stages of change to make the change of the light distribution pattern look smooth. In this case, in the vehicle headlight of Patent Literature 1 described above, it is necessary to store information regarding the amount of light emitted from each micro LED for each light distribution pattern in the middle of the change in the memory. That is, the number of images for forming the light distribution pattern increases, and the amount of information stored in the memory increases.

Therefore, in the present embodiment as the first aspect, the predetermined low beam image as the first image and the specific low beam image as the second image are stored in the memory ME. In the first example of the image generation step S11, the image generation unit 20 generates an image by superimposing the specific low beam image as the second image on at least a part of the predetermined low beam image as the first image and fading in the specific low beam image as the second image, and fading out the predetermined low beam image as the first image. A predetermined low beam light distribution pattern as a first light distribution pattern formed by the first image and a specific low beam light distribution pattern as a second light distribution pattern formed by the second image are different from each other. At least a part of the specific low beam light distribution pattern overlaps the predetermined low beam light distribution pattern.

In the present embodiment as the first aspect, the memory ME stores the normal high beam image 32G as the first image and the high-speed high beam image 32F as the second image. In the second example of the image generation step S11, the image generation unit 20 generates an image by superimposing the high-speed high beam image 32F as the second image on at least a part of the normal high beam image 32G as the first image and fading in the high-speed high beam image 32F as the second image, and fading out the normal high beam image 32G as the first image, and the light source unit 12 emits light based on the generated image. The normal high beam light distribution pattern PH1 as a first light distribution pattern formed by the first image and the high-speed high beam light distribution pattern PH2 as a second light distribution pattern formed by the second image are different from each other. At least a part of the high-speed high beam light distribution pattern PH2 overlaps the normal high beam light distribution pattern PH1.

In the present embodiment as the first aspect, the memory ME stores the reference low beam image 31a as the first image and the normal high beam image 32G as the second image. In the third example of the image generation step S11, the image generation unit 20 generates an image by superimposing the normal high beam image 32G as the second image on at least a part of the reference low beam image 31a as the first image and fading in the normal high beam image 32G as the second image, and fading out the reference low beam image 31a as the first image, and the light source unit 12 emits light based on the generated image. In addition, the image generation unit 20 generates an image by superimposing the reference low beam image 31a as the second image on at least a part of the normal high beam image 32G as the first image and fading in the reference low beam image 31a as the second image, and fading out the normal high beam image 32G as the first image, and the light source unit 12 emits light based on the generated image. The low beam light distribution pattern PL1 formed by the reference low beam image 31a as the first image or the second image and the normal high beam light distribution pattern PH1 formed by the normal high beam image 32G as the first image or the second image are different from each other. At least a part of the normal high beam light distribution pattern PH1 overlaps the low beam light distribution pattern PL1.

In the present embodiment as the first aspect, the memory ME stores the predetermined high beam image as the first image and the another predetermined high beam image as the second image. In the fourth example of the image generation step S11, the image generation unit 20 generates an image by superimposing the another predetermined high beam image as the second image on at least a part of the predetermined high beam image as the first image and fading in the another predetermined high beam image as the second image, and fading out the predetermined high beam image as the first image, and the light source unit 12 emits light based on the generated image. A predetermined high beam light distribution pattern as a first light distribution pattern formed by the first image and another predetermined high beam light distribution pattern as a second light distribution pattern formed by the second image are different from each other. In addition, at least a part of the another predetermined high beam light distribution pattern overlaps the predetermined high beam light distribution pattern.

That is, in the vehicle headlight 1 of the present embodiment as the first aspect, the memory ME stores the first image for forming the first light distribution pattern by the light emitted from the light source unit 12, and the second image for forming the second light distribution pattern by the light emitted from the light source unit 12, the second light distribution pattern being different from the first light distribution pattern and at least partially overlapping the first light distribution pattern. The image generation unit 20 generates an image by superimposing the second image on at least a part of the first image and fading in the second image, and fading out the first image, and the light source unit 12 emits light based on the generated image. Therefore, with the vehicle headlight 1 of the present embodiment as the first aspect, it is possible to suppress a steep change from the first light distribution pattern to the second light distribution pattern, and it is possible to suppress the driver from feeling uncomfortable for the change in light distribution pattern. In addition, in the vehicle headlight 1 of the present embodiment as the first aspect, an image in the middle of change from the first light distribution pattern to the second light distribution pattern is generated by the image generation unit 20 based on the first image and the second image stored in the memory ME. Therefore, an increase in amount of information stored in the memory ME can be suppressed as compared with a case where an image in the middle of change from the first light distribution pattern to the second light distribution pattern is stored in the memory ME.

In addition, according to the first example of the image generation step S11 in the present embodiment as the first aspect, it is possible to suppress a steep change in low beam light distribution pattern, and it is possible to suppress the driver from feeling uncomfortable for the change in low beam light distribution pattern. In addition, in the vehicle headlight 1 of the present embodiment as the first aspect, an image in the middle of change of the low beam light distribution pattern is generated by the image generation unit 20 based on the predetermined low beam image and the specific low beam image stored in the memory ME. Therefore, with the vehicle headlight 1 of the present embodiment as the first aspect, it is possible to suppress an increase in amount of information stored in the memory ME as compared with a case where an image in the middle of change of the low beam light distribution pattern is stored in the memory ME.

In addition, in the vehicle headlight 1 of the present embodiment as the first aspect, the predetermined low beam light distribution pattern and the specific low beam light distribution pattern have the elbow point EP, and the elbow point of the predetermined low beam light distribution pattern and the elbow point of the specific low beam light distribution pattern are misaligned in the horizontal direction. Therefore, in the vehicle headlight 1 of the present embodiment as the first aspect, the elbow point EP in the low beam light distribution pattern can be moved in the horizontal direction as illustrated in FIG. 8. Therefore, with the vehicle headlight 1 of the present embodiment as the first aspect, the visibility can be improved by changing the low beam light distribution pattern emitted according to a change in traveling direction of the vehicle 100.

From the viewpoint of changing the low beam light distribution pattern according to the steering angle, the plurality of additional light distribution images, the plurality of first additional images, and the plurality of second additional images do not have to be stored in the memory ME. Further, signals output from the detection device 120 and the vehicle speed sensor 140 do not have to be input to the image generation unit 20.

According to the second example of the image generation step S11 in the present embodiment as the first aspect, it is possible to further suppress an increase in amount of information stored in the memory ME as compared with a case of storing an image that changes from the normal high beam image 32G to the high-speed high beam image 32F or vice versa in the memory ME. In addition, it is possible to suppress a steep change in high beam light distribution pattern, and it is possible to suppress the driver from feeling uncomfortable for the change in high beam light distribution pattern.

In the second example in the present embodiment as the first aspect, the normal high beam image 32G is stored in the memory ME while being separated into the reference low beam image 31*a* as a first predetermined image and the reference additional light distribution image 32*a* as a first specific image superimposed on a part of the reference low beam image 31*a* to form the normal high beam image 32G. In addition, the high-speed high beam image 32F is stored in the memory ME while being separated into the reference low beam image 31*a* as a second predetermined image and the high-speed additional light distribution image 32*b* as a second specific image superimposed on a part of the reference low beam image 31*a* to form the high-speed high beam image 32F. However, in the second example in the present embodiment as the first aspect, the normal high beam image 32G and the high-speed high beam image 32F may be stored in the memory ME. In this case, for example, the normal high beam image 32G and the high-speed high beam image 32F are arranged in the layers of the additional light distribution layer group 22, and the image generation unit 20 selects the normal high beam image 32G or the high-speed high beam image 32F according to a signal from the vehicle speed sensor 140.

From the viewpoint of changing the high beam light distribution pattern according to the traveling speed, the plurality of first additional images and the plurality of second additional images do not have to be stored in the memory ME. Further, signals output from the detection device 120 and the steering sensor 130 do not have to be input to the image generation unit 20.

In addition, according to the third example of the image generation step S11 in the present embodiment as the first aspect, it is possible to further suppress an increase in amount of information stored in the memory ME as compared with a case of storing an image that changes from the reference low beam image 31*a* to the normal high beam image 32G or vice versa in the memory ME. Further, in switching between the low beam light distribution pattern PL1 and the normal high beam light distribution pattern PH1, it is possible to suppress the driver from feeling uncomfortable for the change in light distribution pattern.

In the third example, the normal high beam image 32G is stored in the memory ME while being separated into the reference low beam image 31*a* as the first predetermined image and the reference additional light distribution image 32*a* as the first specific image superimposed on a part of the reference low beam image 31*a* to form the normal high beam image 32G. However, in the third example, the normal high beam image 32G may be stored in the memory ME. In this case, for example, the normal high beam image 32G may be arranged in the layer of the additional light distribution layer group 22, and the image generation unit 20 may select the normal high beam image 32G or the reference low beam image 31*a* according to a signal input from the light switch 110.

From the viewpoint of switching the light distribution pattern of the emitted light between the low beam light distribution pattern and the high beam light distribution pattern, the plurality of first additional images and the plurality of second additional images do not have to be stored in the memory ME. Further, signals output from the detection device 120, the steering sensor 130, and the vehicle speed sensor 140 do not have to be input to the image generation unit 20.

In addition, according to the fourth example of the image generation step S11 in the present embodiment as the first aspect, an increase in amount of information stored in the memory ME can be suppressed as compared with a case of storing an image that changes from the predetermined high beam image to the another predetermined high beam image in the memory ME. In addition, with the vehicle headlight 1 according to the present embodiment as the first aspect, it is possible to suppress a steep change in high beam light distribution pattern and suppress the driver from feeling uncomfortable for the change in high beam light distribution pattern.

In addition, in the vehicle headlight 1 of the present embodiment as the first aspect, the predetermined high beam light distribution pattern and the another predetermined high beam light distribution pattern each include the predetermined region in the predetermined light distribution pattern obtained by changing the amount of light of the predetermined region overlapping the predetermined target object positioned in front of the vehicle 100 detected by the detection device 120 in the normal high beam light distribution pattern PH1. At least a part of the predetermined region in the predetermined high beam light distribution pattern and at least a part of the predetermined region in the another predetermined high beam light distribution pattern are different from each other. For example, when a relative position between the target object and the host vehicle changes, the predetermined region in which the amount of light is changed moves, and the light distribution pattern to be emitted changes. With the vehicle headlight 1 of the present embodiment as the first aspect, it is possible to suppress feeling uncomfortable for such a change in light distribution pattern.

Furthermore, in the present embodiment as the first aspect, the image generation unit 20 selects at least one additional image from the plurality of first additional images and the plurality of second additional images based on the information from the detection device 120. Then, the image generation unit 20 superimposes the selected additional image on a part of the normal high beam image 32G to generate an image representing the predetermined light distribution pattern obtained by changing the amount of light emitted from the light source unit 12 in the predetermined region overlapping the predetermined target object in the normal high beam light distribution pattern. Therefore, the number of generatable images representing the predetermined light distribution pattern is the number of combinations of images in an image group including the plurality of first additional images and the plurality of second additional images. However, the information stored in the memory ME is the images of the image group and the normal high beam image 32G. Therefore, with the vehicle headlight 1 of the present embodiment, it is possible to further suppress an increase in amount of information stored in the memory ME as compared with a case of storing all the generatable images representing the predetermined light distribution pattern in the memory ME. Each of the images representing the predetermined light distribution pattern may be stored in the memory ME. In this case, for example, the images may be individually arranged in the layers, and one image may be selected from the images based on information of the predetermined target object input from the detection device 120 to generate the image.

In addition, in the vehicle headlight 1 of the present embodiment as the first aspect, the normal high beam image 32G is stored in the memory ME while being separated into the reference low beam image 31a as the first predetermined image and the reference additional light distribution image 32a as the first specific image superimposed on a part of the reference low beam image 31a to form the normal high beam image 32G. However, in the fourth example, the normal high beam image 32G may be stored in the memory ME. In this case, for example, the normal high beam image 32G may be arranged in the layer of the additional light distribution layer group 22, and the image generation unit 20 may generate an image by superimposing the selected additional image on the normal high beam image 32G. In addition, the high-speed high beam image 32F may be used instead of the normal high beam image 32G.

From the viewpoint of changing the high beam light distribution pattern according to the predetermined target object detected by the detection device 120, signals output from the steering sensor 130 and the vehicle speed sensor 140 do not have to be input to the image generation unit 20.

Second Embodiment

Next, a second embodiment as the first aspect of the present invention will be described in detail. The same or equivalent constituent elements as those of the first embodiment are denoted by the same reference numerals and an overlapping description will be omitted unless otherwise specified. A lamp portion of the present embodiment is mainly different from the lamp portion 5 of the first embodiment in that the lamp portion includes a lamp unit 10 and another lamp unit. In the present embodiment, the lamp unit 10 and the another lamp unit are housed in a housing space in a casing 16 side by side in the horizontal direction.

Figure 13:
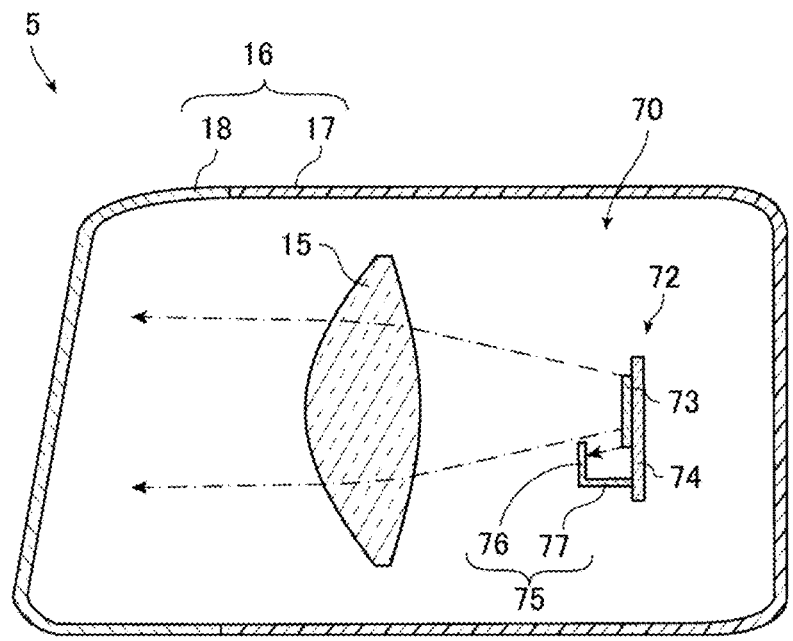
FIG. 13 is a view illustrating another lamp unit in a second embodiment as the first aspect of the present invention similarly to FIG. 2.

FIG. 13 is a view illustrating another lamp unit 70 in the present embodiment similarly to FIG. 2. As illustrated in FIG. 13, the another lamp unit 70 is mainly different from the lamp unit 10 of the first embodiment in including a light source unit 72 instead of the light source unit 12.

The light source unit 72 of the present embodiment includes a light emitting element 73 that emits light, a circuit board 74 on which the light emitting element 73 is mounted, and a shade 75. In the present embodiment, the light emitting element 73 is a substantially rectangular LED of which an emission surface that emits light is long in the horizontal direction. The number of light emitting elements 73, the type of the light emitting element 73, and the like are not particularly limited. The shade 75 includes a plate-shaped light shielding portion 76 that is disposed in front of the light emitting element 73 and blocks a part of light emitted from the light emitting element 73, and a fixed portion 77 that extends rearward from a lower end portion of the light shielding portion 76 and is fixed to the circuit board 74.

A part of the light emitted from the light emitting element 73 of the light source unit 72 is blocked by the light shielding portion 76, another part of the light emitted from the light emitting element 73 passes through a projection lens 15, and light having a light distribution pattern corresponding to a shape of an upper end portion of the light shielding portion 76 is emitted from the another lamp unit 70. In the present embodiment, a rear focal point of the projection lens 15 of the another lamp unit 70 is positioned at or near the upper end portion of the light shielding portion 76. Therefore, the light distribution pattern of the light emitted from the another lamp unit 70 is a light distribution pattern obtained by vertically and horizontally inverting a light distribution pattern formed by the light shielding portion 76.

In the present embodiment, the another lamp unit 70 emits light that forms a part of a low beam light distribution pattern, and the lamp unit 10 emits light that forms another part of the low beam light distribution pattern or light that forms a part of a high beam light distribution pattern.

Figure 14:
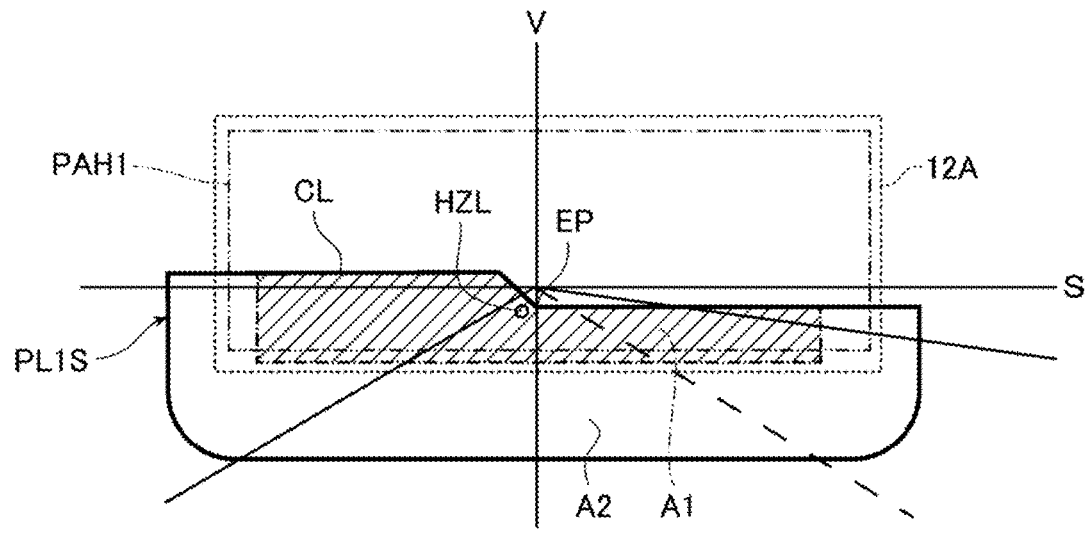
FIG. 14 is a view illustrating an example of a low beam light distribution pattern in the second embodiment similarly to FIG. 7.

FIG. 14 is a view illustrating an example of the low beam light distribution pattern in the present embodiment similarly to FIG. 7. A cutoff line CL of a low beam light distribution pattern PL1S of the present embodiment has an elbow point EP similarly to the cutoff line CL of the low beam light distribution pattern PL1 illustrated in FIG. 7. In the present embodiment, a first region A1, which is a part of the low beam light distribution pattern PL1S, is formed by light emitted from the lamp unit 10. The first region A1 is hatched with oblique lines. The first region A1 includes a part of the cutoff line CL, the elbow point EP, and a hot zone HZL. In addition, a second region A2, which is another part of the low beam light distribution pattern PL1S, is formed by the light emitted from the another lamp unit 70, and the second region A2 includes all the regions other than the first region A1 in the low beam light distribution pattern PL1S. That is, the shape of the upper end portion of the light shielding portion 76 is adjusted in such a way that the light distribution pattern of the light emitted from the another lamp unit 70 becomes the second region A2 in the low beam light distribution pattern PL1S. In the present embodiment, a reference low beam image 31a is an image representing a light distribution pattern forming the first region A1 in the low beam light distribution pattern PL1S, and an image generation unit 20 generates the image.

Further, in the present embodiment, right curved road low beam images 31b are associated with different right steering angles, and are images each representing a light distribution pattern obtained by moving the elbow point EP and the hot zone HZL rightward by a predetermined distance corresponding to the steering angle in the light distribution pattern formed by the reference low beam image 31a. In addition, left curved road low beam images 31c are associated with different left steering angles, and are images each representing a light distribution pattern obtained by moving the elbow point EP and the hot zone HZL leftward by a predetermined distance corresponding to the steering angle in the light distribution pattern formed by the reference low beam image 31a.

With the vehicle headlight 1 of the present embodiment as the first aspect, similarly to the vehicle headlight 1 of the first embodiment as the first aspect, the visibility can be improved by changing the low beam light distribution pattern emitted according to a change in traveling direction of a vehicle 100. In addition, with the vehicle headlight 1 of the present embodiment as the first aspect, similarly to the vehicle headlight 1 of the first embodiment as the first aspect, it is possible to suppress a steep change in low beam light distribution pattern, and it is possible to suppress an increase in amount of information stored in a memory ME as compared with a case of storing an image in the middle of change of the low beam light distribution pattern in the memory ME.

In addition, as illustrated in FIG. 14, an additional light distribution pattern PAH1 formed by a reference additional light distribution image 32*a* is positioned in a region 12A that can be irradiated with light emitted from the light source unit 12. Therefore, the vehicle headlight 1 of the present embodiment as the first aspect can change the low beam light distribution pattern to the high beam light distribution pattern or vice versa, change the high beam light distribution pattern according to the traveling speed, or change the high beam light distribution pattern according to a predetermined target object detected by a detection device 120, similarly to the vehicle headlight 1 of the first embodiment as the first aspect. In addition, similarly to the vehicle headlight 1 of the first embodiment, the vehicle headlight 1 of the present embodiment as the first aspect can suppress an increase in amount of information stored in the memory ME and suppress such a steep change in light distribution pattern.

Although the first aspect of the present invention has been described by taking the first and second embodiments as an example, the first aspect of the present invention is not limited thereto.

For example, in the first embodiment, the memory ME in which images representing the low beam light distribution pattern in which the elbow point and the hot zone are shifted in the horizontal direction are stored as the plurality of low beam images has been described as an example. However, from the viewpoint of improving visibility at a curved road or the like in the first aspect, images representing the low beam light distribution pattern in which only the elbow point is shifted in the horizontal direction may be stored in the memory ME. In addition, as the first aspect, an image representing a light distribution pattern obtained by moving the entire predetermined low beam light distribution pattern in the horizontal direction may be stored in the memory ME, and an image representing a light distribution pattern obtained by moving the entire predetermined high beam light distribution pattern in the horizontal direction may be stored in the memory ME. In addition, as the first aspect, an image representing a light distribution pattern obtained by moving the entire predetermined low beam light distribution pattern in the vertical direction may be stored in the memory ME, and an image representing a light distribution pattern obtained by k moving the entire predetermined high beam light distribution pattern in the vertical direction may be stored in the memory ME. In this case, a signal indicating an inclination angle detected by an inclination angle sensor that detects the inclination angle of the vehicle 100 in a pitch direction is input to the image generation unit 20 via the ECU 101, and the image generation unit 20 selects an image based on the signal and generates the image, and outputs information of the image to the control unit CO. With such a configuration, even in a case where the vehicle 100 is inclined in the pitch direction, the low beam or the high beam can be emitted in an appropriate direction, and deterioration in visibility can be suppressed.

In the first embodiment, the plurality of low beam images representing the low beam light distribution pattern having the elbow point has been described as an example. However, as the first aspect, the plurality of low beam images may include an image representing a low beam light distribution pattern having no elbow point.

In the first and second embodiments, the memory ME in which the reference additional light distribution image 32*a* and the high-speed additional light distribution image 32*b* are stored as the additional light distribution images has been described as an example. However, as the first aspect, the additional light distribution image is not limited thereto. For example, still another additional light distribution image may be stored in the memory ME. In this case, the image generation unit 20 may further generate the still another additional light distribution image by superimposing another additional light distribution image on the reference additional light distribution image 32*a*. In addition, the another additional light distribution image may be an image representing an additional light distribution pattern obtained by increasing the width of the additional light distribution pattern PAH1 represented by the reference additional light distribution image 32*a* in the horizontal direction. With such a configuration, the image generation unit 20 generates a high beam image in which the another additional light distribution image and the reference low beam image are superimposed, so that the width of the additional light distribution pattern in the horizontal direction can be increased, and for example, visibility at the time of traveling in an urban area or the like can be improved. In addition, the still another additional light distribution image whose width in the horizontal direction is smaller than the width of the another additional light distribution image for an urban area or the like in the horizontal direction and is larger than the width of the reference additional light distribution image 32*a* in the horizontal direction may be stored in the memory ME. In this case, the image generation unit 20 generates a high beam image in which the another additional light distribution image and the reference low beam image 31*a* are superimposed, so that, for example, the width of the additional light distribution pattern in the horizontal direction can be set to a width suitable for traveling on a mountain road or the like.

Furthermore, in the first and second embodiments, the image generation unit 20 that generates an image using each layer whose opacity is adjustable has been described as an example. However, as the first aspect, an image generation method of the image generation unit 20 is not particularly limited, and an image may be generated by a method not using the layer. In this case, for example, pixels included in an image excluding the darkened images 33*a*, 33*b*, and 34*a* for reducing the brightness by superimposition are set as pixels for which the same grayscale value is set and the opacity is adjusted to express the grayscale level. Furthermore, pixels included in the darkened images 33*a*, 33*b*, and 34*a* are set as pixels for which the grayscale value is set to 0 and the opacity is adjusted to express the grayscale level. In a case where images other than the darkened images 33*a*, 33*b*, and 34*a* are superimposed, the opacity of the pixels in the overlapping region is calculated by weighted addition of the opacities of the pixels of the respective images. In a case where the darkened images 33*a*, 33*b*, and 34*a* and the images other than the darkened images 33*a*, 33*b*, and 34*a* are superimposed, the opacity of the pixels in the overlapping region is calculated by weighted averaging of the opacities of the pixels of the respective images. In a case where an image is generated using a method in which data such as the opacity of the pixels included in the image can be individually changed as described above, the image generation unit 20 may perform interlace processing in a case where a plurality of images are generated by superimposing the second image on at least a part of the first image and fading in the second image, and fading out the first image. With such a configuration, an operation load of the image generation unit can be reduced.

Furthermore, in a case where the darkened images are superimposed, for example, the opacity of the pixels in the overlapping region may be calculated by weighted averaging of the opacities of the pixels of the respective darkened images. Alternatively, in a case where the darkened images are superimposed, the pixels in the overlapping region may be the pixels in the overlapping region in any one of the superimposed darkened images. In the latter case, it is possible to suppress formation of a region darker than intended in the additional light distribution pattern PAH1.

Furthermore, in the first and second embodiments, the light source unit 12 including the plurality of light emitting elements 13 capable of individually changing the amount of light to be emitted has been described as an example. However, as the first aspect, it is sufficient if the light source unit 12 includes a plurality of light emitting units capable of individually changing the amount of light to be emitted, and emits light based on an image generated by the image generation unit 20. For example, the light source unit 12 may include a digital mirror device (DMD) including a plurality of reflective elements arranged in a matrix and a light irradiation unit that irradiates the DMD with light. The DMD can adjust the amount of light to be emitted in a predetermined direction from a reflective surface of each reflective element, and can change the light emitted in the predetermined direction from each reflective element into light based on an image generated by the image generation unit 20. Therefore, it can be understood that the reflective surface of each reflective element corresponds to the light emitting unit.

In the first and second embodiments, the vehicle 100 including the pair of vehicle headlights 1 each including the control unit CO, the image generation unit 20, and the memory ME has been described as an example. However, as the first aspect, at least one of the control unit CO, the image generation unit 20, or the memory ME may be shared by the pair of vehicle headlights 1. Furthermore, signals output from the detection device 120, the sensor, and the like included in the vehicle 100 may be input to the image generation unit 20 without passing through the ECU 101 of the vehicle 100. In addition, a vehicle including the vehicle headlight 1, the number of vehicle headlights 1 included in a vehicle, and the like are not particularly limited. For example, in a case where the vehicle is a two-wheeled vehicle, the number of vehicle headlights 1 may be one.

In the second embodiment, the another lamp unit 70 including the light source unit 72 that includes the light emitting element 73, the circuit board 74, and the shade 75, and the projection lens 15 has been described as an example. However, as the first aspect, it is sufficient if the low beam light distribution pattern or high beam light distribution pattern can be formed by light emitted from the another lamp unit 70 and light emitted from the lamp unit 10, and a configuration of the another lamp unit 70 is not particularly limited. In addition, a light distribution pattern formed by light emitted from the lamp unit 10 and a light distribution pattern formed by light emitted from the another lamp unit 70 may overlap each other.

Figure 15:
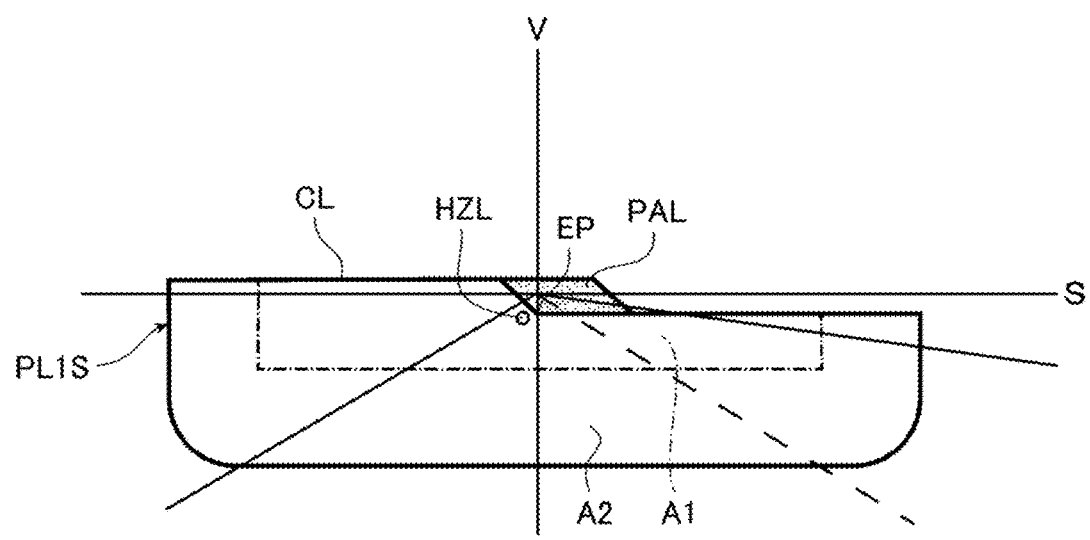
FIG. 15 is a view illustrating an example of a low beam light distribution pattern in a reference example similarly to FIG. 7.

From the viewpoint of changing the light distribution pattern of emitted light, for example, the vehicle headlight 1 may be a reference example described below. In the reference example, the memory ME stores the first image for forming the first light distribution pattern by the light emitted from the light source unit 12, and the second image for forming the second light distribution pattern by the light emitted from the light source unit 12, the second light distribution pattern being in contact with at least a part of an outer edge of the first light distribution pattern without overlapping the first light distribution pattern. The image generation unit 20 generates an image by fading in the second image on the first image or fading out the second image from an image obtained by adding the second image to the first image. With such a configuration, it is possible to suppress feeling uncomfortable for a change in light distribution pattern when the light distribution pattern of emitted light is switched between the first light distribution pattern and a light distribution pattern in which the second light distribution pattern is added to the first light distribution pattern. Examples of such a first light distribution pattern include the first region A1 that is a part of the low beam light distribution pattern PL1S in the second embodiment, and the first image in this case is the reference low beam image 31a. As illustrated in FIG. 15, examples of the second light distribution pattern include a light distribution pattern PAL that is in contact with all portions extending obliquely upward from the elbow point EP in the cutoff line CL of the low beam light distribution pattern PL1S and is in contact with a predetermined section from the elbow point EP at a portion extending horizontally from the elbow point EP. In FIG. 15, the light distribution pattern PAL is hatched with a plurality of dots. An edge of the light distribution pattern PAL on a side opposite to the elbow point EP is inclined to the left side upward, so that a lower end of the edge can become a new elbow point, and the elbow point in the low beam light distribution pattern can be moved in the horizontal direction.

Third Embodiment

Next, a third embodiment as a second aspect of the present invention will be described. The same or equivalent constituent elements as those of the first embodiment are denoted by the same reference numerals and an overlapping description will be omitted unless otherwise specified.

A vehicle 100 in the present embodiment is mainly different from the vehicle 100 in the first embodiment in that a signal from a vehicle speed sensor 140 is not input to an image generation unit 20. Therefore, the present embodiment will be described with reference to FIG. 1.

In the present embodiment, signals from a light switch 110, a detection device 120, and a steering sensor 130 are input to the image generation unit 20. Similarly to the first embodiment, the image generation unit 20 of the present embodiment generates an image by combining a plurality of images stored in a memory ME according to the signals using a layer function, and outputs information of the image to a control unit CO. However, the image generated by the image generation unit 20 is different from the image generated by the image generation unit 20 of the first embodiment.

Figure 16:
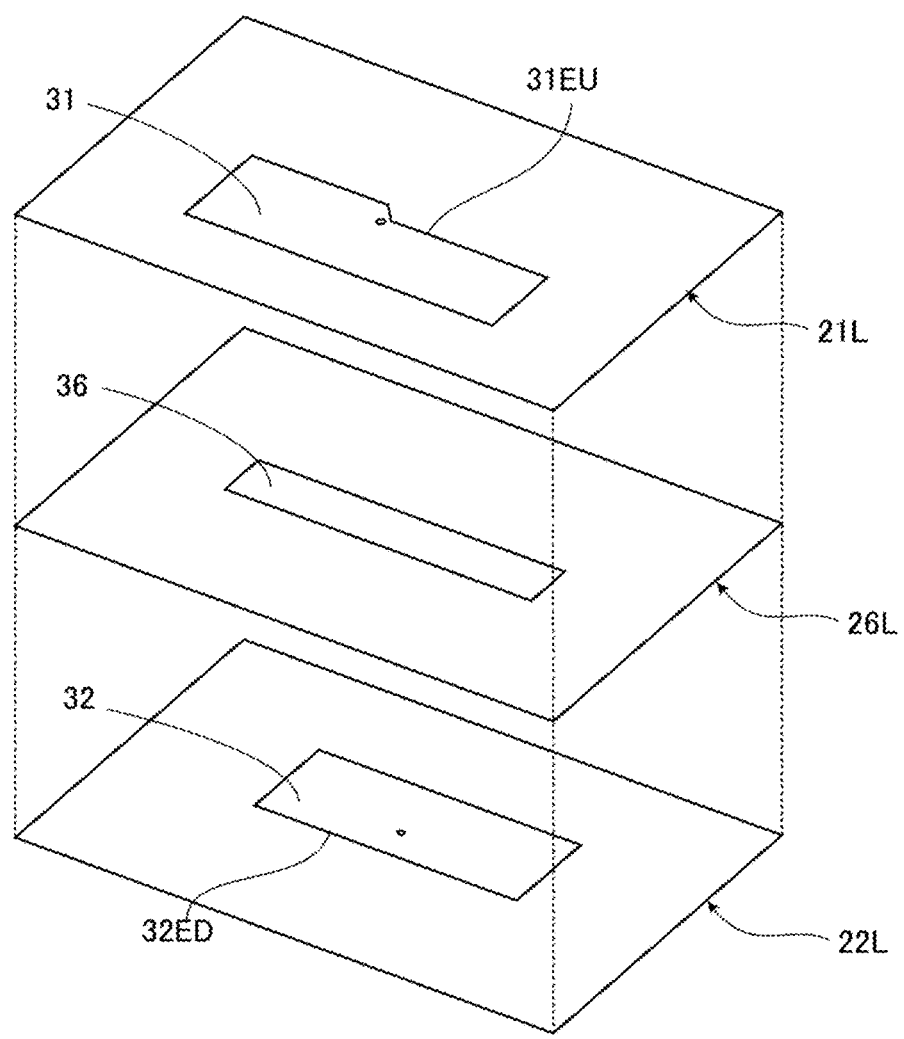
FIG. 16 is a view for describing a concept of a layer in an image generation unit of a third embodiment as a second aspect of the present invention.

FIG. 16 is a view for describing a concept of a layer in the image generation unit 20 of the present embodiment. As illustrated in FIG. 16, the image generation unit 20 of the present embodiment includes a low beam layer 21L, an additional light distribution layer 22L, and a supplementary image layer 26L. Priorities are set for the layers 21L, 22L, and 26L, and in FIG. 16, a layer with a lower priority is illustrated in the lower side. The priority indicates the order of superimposition, and a layer having a higher priority is superimposed on a layer having a lower priority. In the present embodiment, the priorities of the low beam layer 21L, the supplementary image layer 26L, and the additional light distribution layer 22L are lower in the order of the low beam layer 21L, the supplementary image layer 26L, and the additional light distribution layer 22L. However, the priorities of the layers 21L, 22L, and 26L are not particularly limited, and may be changeable. Further, a variable opacity is set for each layer. In a case where the opacity is 100%, an image arranged in the corresponding layer is completely opaque. As the opacity decreases, the transparency of the image arranged in the corresponding layer increases. In a case where the opacity is 0%, the image arranged in the corresponding layer is completely transparent, and the image does not exist.

The memory ME of the present embodiment stores a low beam image 31 for forming a low beam light distribution pattern by light emitted from a light source unit 12. The image generation unit 20 reads the low beam image 31 from the memory ME and arranges the low beam image 31 in the low beam layer 21L. A position at which the low beam image 31 is arranged can be changed. The low beam image 31 of the present embodiment is an image representing the low beam light distribution pattern having an elbow point. In the present embodiment, an upper right pixel in the image illustrated in FIG. 16 corresponds to a lower right light emitting element 13 illustrated in FIG. 3, and a lower left pixel in the image illustrated in FIG. 16 corresponds to an upper left light emitting element 13 illustrated in FIG. 3. That is, the correspondence relationship is vertically inverted. Therefore, the light distribution pattern of the light emitted to the front of the vehicle 100 is a light distribution pattern corresponding to the image illustrated in FIG. 16. Furthermore, pixels of images in the following drawings correspond to the light emitting elements 13, similarly to the image illustrated in FIG. 16.

In the present embodiment, a plurality of positions of the low beam image 31 in the low beam layer 21L are set in advance according to a steering angle of the vehicle 100 and an upward gradient in front of the vehicle 100. A plurality of tables in which the positions and the steering angles are associated with each other are provided according to the upward gradient, and the tables are stored in the memory ME. A position associated with a steering angle of 0 and an upward gradient of 0 is a reference position, and the reference position is stored in the memory ME as a reference position of the low beam image 31.

The memory ME of the present embodiment stores an additional light distribution image 32. The additional light distribution image 32 is an image for forming an additional light distribution pattern by light emitted from the light source unit 12, and the additional light distribution pattern is a light distribution pattern added to the low beam light distribution pattern to form a high beam light distribution pattern. The image generation unit 20 reads the additional light distribution image 32 from the memory ME and arranges the additional light distribution image 32 in the additional light distribution layer 22L. A position at which the additional light distribution image 32 is arranged can be changed.

In the present embodiment, similarly to the low beam image 31, a plurality of positions of the additional light distribution image 32 in the additional light distribution layer 22L are set in advance according to the steering angle and the upward gradient, and a plurality of tables in which the positions are associated with the steering angle and the upward gradient are stored in the memory ME. A position associated with a steering angle of 0 and an upward gradient of 0 is a reference position, and the reference position is stored in the memory ME as a reference position of the additional light distribution image 32.

The memory ME of the present embodiment stores a supplementary image 36. The supplementary image 36 is an image overlapping a part including an edge 31EU representing a cutoff line of the low beam light distribution pattern in the low beam image 31 and a part including an edge 32ED representing a lower edge of the additional light distribution pattern in the additional light distribution image 32. The supplementary image 36 of the present embodiment is an image having a substantially rectangular shape elongated in the horizontal direction and a uniform brightness as a whole, and is slightly brighter than the edge 32ED of the additional light distribution image 32. However, the brightness of the supplementary image 36 is not particularly limited. Furthermore, a width of the supplementary image 36 in the horizontal direction is substantially the same as a width of the low beam image 31 in the horizontal direction. The image generation unit 20 reads the supplementary image 36 from the memory ME and arranges the supplementary image 36 in the supplementary image layer 26L. A position at which the supplementary image 36 is arranged can be changed.

The detection device 120 of the present embodiment detects an object in front of the vehicle 100. With the detection, the detection device 120 can detect a gradient of a road surface. Examples of a configuration of the detection device 120 include a configuration including a light detection and ranging (LiDAR), and a configuration including a camera together with the LiDAR. In the present embodiment, the detection device 120 detects the gradient of the road surface at a measurement point ahead of the vehicle 100 by a certain distance, and outputs a signal indicating the gradient of the road surface to the image generation unit 20 via an ECU 101. Examples of the measurement point include a point 100 m ahead of the vehicle 100. The gradient of the road surface is a relative gradient with respect to the road surface on which the vehicle 100 is positioned. In the present embodiment, an upward gradient in which the road surface at the measurement point is inclined upward with respect to the road surface on which the vehicle 100 is positioned is detected. The configuration of the detection device 120 is not particularly limited.

Similarly to the first embodiment, the steering sensor 130 of the present embodiment detects a right steering angle and a left steering angle while identifying the right steering angle and the left steering angle as different steering angles, and outputs a signal indicating the detected steering angles to the image generation unit 20 via the ECU 101. In the present embodiment, the left steering angle is set to a negative value, and the right steering angle is set to a positive value.

Next, an operation of the vehicle headlight 1 of the present embodiment will be described. In the present embodiment, an image generation step S11 is different from the image generation step S11 of the first embodiment. Therefore, the image generation step S11 of the present embodiment will be described below.

In the image generation step S11 of the present embodiment, in a case where a signal indicating high beam emission is input from the light switch 110 via the ECU 101, the image generation unit 20 generates an image representing at least a part of the high beam light distribution pattern by adjusting the positions of the low beam image 31 and the additional light distribution image 32 arranged in the layers based on signals from the detection device 120 and the steering sensor 130. Then, the image generation unit 20 outputs information of the generated image to the control unit CO. The image generation unit 20 repeats generation of such an image at predetermined time intervals. In a case where no signal is input from the light switch 110, the image generation unit 20 does not generate the image.

Figure 17:
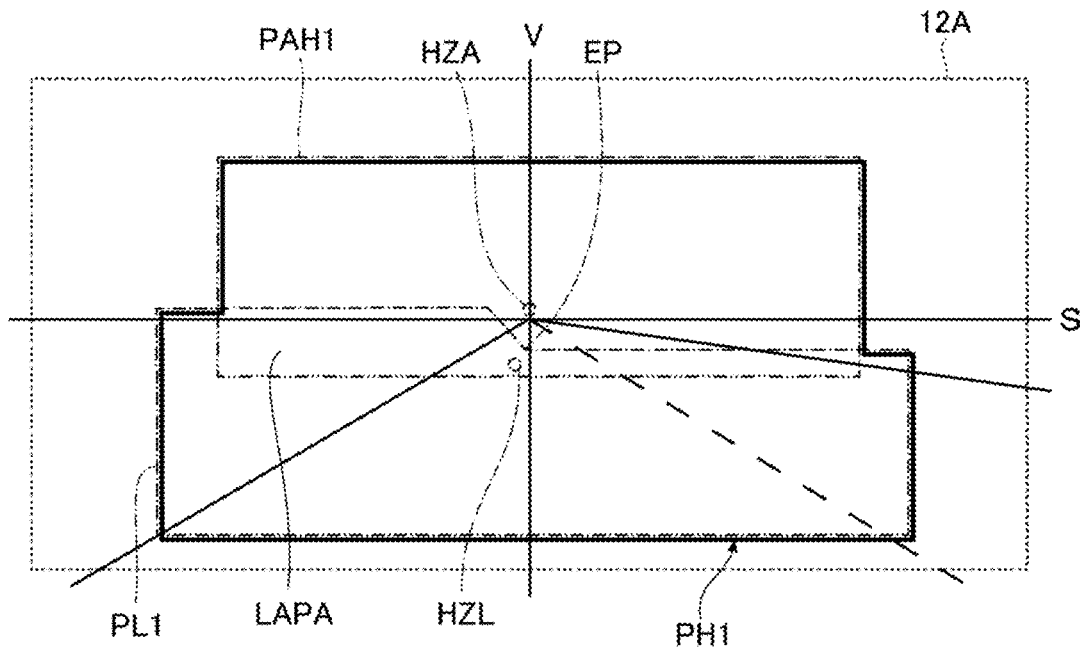
FIG. 17 is a view illustrating an example of a high beam light distribution pattern in the third embodiment similarly to FIG. 9.

FIG. 17 is a view illustrating an example of the high beam light distribution pattern in the present embodiment similarly to FIG. 9, and illustrates an example of the high beam light distribution pattern formed when each of the low beam image 31 and the additional light distribution image 32 is arranged at the reference position. A light distribution pattern of a region LAPA where a low beam light distribution pattern PL1 and an additional light distribution pattern PAH1 overlap each other in a high beam light distribution pattern PH1 is the light distribution pattern of the region LAPA in the low beam light distribution pattern PL1. A hot zone HZL in the low beam light distribution pattern PL1 is positioned in the region LAPA, and a hot zone HZA of the additional light distribution pattern PAH1 is positioned above the region LAPA.

In the present embodiment, the image generation unit 20 refers to the table stored in the memory ME based on a signal indicating the upward gradient from the detection device 120 and a signal indicating the steering angle from the steering sensor 130. In addition, the image generation unit 20 superimposes the low beam image 31 and the additional light distribution image 32 by setting an opacity of the low beam layer 21L and the additional light distribution layer 22L to 100% and setting an opacity of the supplementary image layer 26L to 0%. Then, the image generation unit 20 moves the low beam image 31 and the additional light distribution image 32 according to the upward gradient and the steering angle in a state where the low beam image 31 and the additional light distribution image 32 are superimposed.

Figure 18:
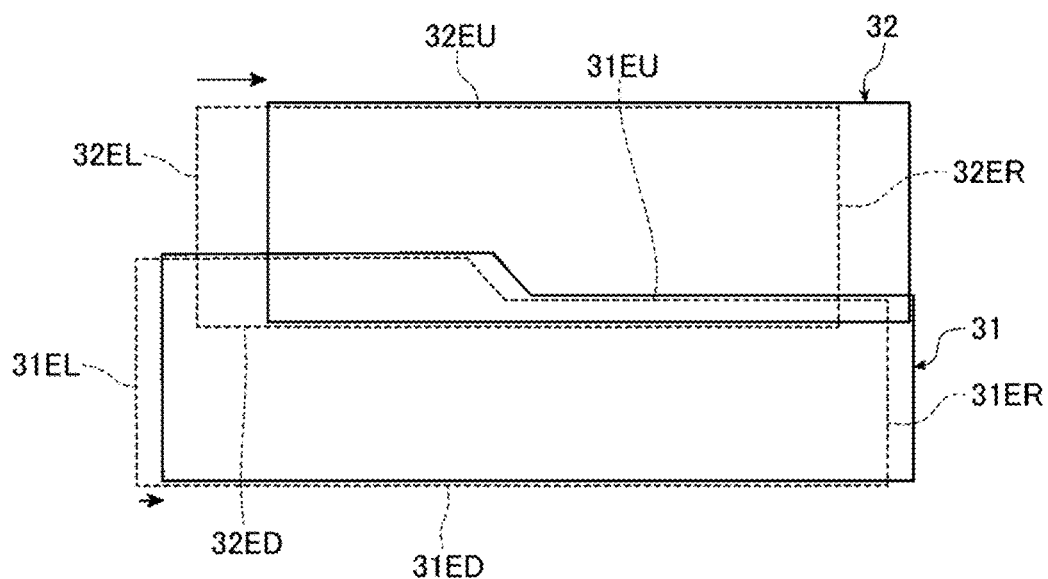
FIG. 18 is a view illustrating an example of movement of a low beam image and an additional light distribution image.

First, the movement according to the steering angle will be described. FIG. 18 is a view illustrating an example of the movement of the low beam image 31 and the additional light distribution image 32. The image before the movement is indicated by a broken line, and the image after the movement is indicated by a solid line. As described above, the left steering angle is set to a negative value, and the right steering angle is set to a positive value. In a case where the steering angle increases, the image generation unit 20 moves the low beam image 31 and the additional light distribution image 32 by a distance corresponding to an increase amount in a predetermined direction as illustrated in FIG. 18. The predetermined direction is a right direction in FIG. 18, is a direction in which a right edge of the low beam light distribution pattern PL1 in the low beam image 31 moves to an edge 31ER side, and is a direction in which a right edge of the additional light distribution pattern PAH1 of the additional light distribution image 32 moves to an edge 32ER side. On the other hand, in a case where the steering angle decreases, the image generation unit 20 moves the low beam image 31 and the additional light distribution image 32 in another predetermined direction by a distance corresponding to a decrease amount. The another predetermined direction is a left direction in FIG. 18, is a direction in which a left edge of the low beam light distribution pattern PL1 in the low beam image 31 moves to an edge 31EL side, and is a direction in which a left edge of the additional light distribution pattern PAH1 of the additional light distribution image 32 moves to an edge 32EL side. That is, the table stored in the memory ME is a table for such movement of the low beam image 31 and the additional light distribution image 32. Furthermore, in the present embodiment, a movement distance of the low beam image 31 in the horizontal direction is smaller than a movement distance of the additional light distribution image 32 in the horizontal direction, and may be equal to or larger than the movement distance of the additional light distribution image 32.

The image generation unit 20 of the present embodiment generates a plurality of images while moving the low beam image 31 and the additional light distribution image 32 in the predetermined direction in a state where the low beam image 31 and the additional light distribution image 32 are superimposed in this manner. The images include an image in the middle of movement of the low beam image 31 and the additional light distribution image 32, and an image in which the low beam image 31 and the additional light distribution image 32 are arranged at positions corresponding to the upward gradient and the steering angle after the movement is completed, and the number of images in the middle of movement may be one. In addition, a movement period is, for example, 1.0 s, and a time interval at which the plurality of images are generated is, for example, 0.01 s, but the movement period and the time interval are not particularly limited.

Figure 19:
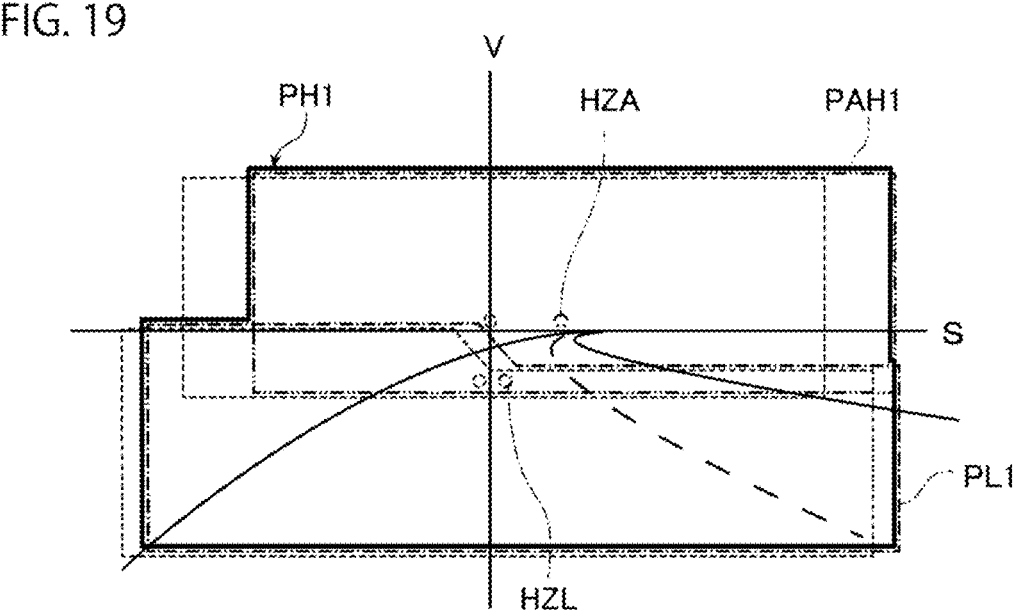
FIG. 19 is a view illustrating an example of a high beam light distribution pattern corresponding to a steering angle similarly to FIG. 17.

The image generation unit 20 outputs information of the generated images to the control unit CO. Therefore, the image formed by the light source unit 12 sequentially changes, and for example, the light distribution pattern of the emitted light gradually changes from the high beam light distribution pattern illustrated in FIG. 17 to the high beam light distribution pattern illustrated in FIG. 19. FIG. 19 is a view illustrating an example of the high beam light distribution pattern according to the steering angle similarly to FIG. 17, and is a view illustrating an example of the high beam light distribution pattern in a case where the steering angle increases from 0. In FIG. 19, the low beam light distribution pattern PL1 and the additional light distribution pattern PAH1 in the high beam light distribution pattern PH1 before the change are indicated by dotted lines, and the light distribution patterns PL1 and PAH1 before the change are slightly shifted vertically and horizontally. In the present embodiment, each of the light distribution patterns PL1 and PAH1 gradually moves in the right direction, so that the high beam light distribution pattern illustrated in FIG. 17 becomes the high beam light distribution pattern illustrated in FIG. 19. The light forming the low beam light distribution pattern PL1 irradiates a side closer to the vehicle than the light forming the additional light distribution pattern PAH1. A shift amount of a curved road with respect to the vehicle 100 in the horizontal direction tends to increase with increasing distance from the vehicle 100. In the present embodiment, since the movement distance of the low beam image 31 is smaller than the movement distance of the additional light distribution image 32, a movement distance of the low beam light distribution pattern PL1 is smaller than a movement distance of the additional light distribution pattern PAH1. Therefore, the vehicle headlight 1 of the present embodiment can suppress deterioration in visibility of a side close to the vehicle 100 as compared with a case where the movement distances of the low beam light distribution pattern PL1 and the additional light distribution pattern PAH1 in the horizontal direction are the same while improving the visibility of a far side of a curved road. In a case where the steering angle decreases, the light distribution patterns PL1 and PAH1 in the high beam light distribution pattern PH1 gradually move in the left direction and form the high beam light distribution pattern PH1 according to the steering angle.

Figure 20:
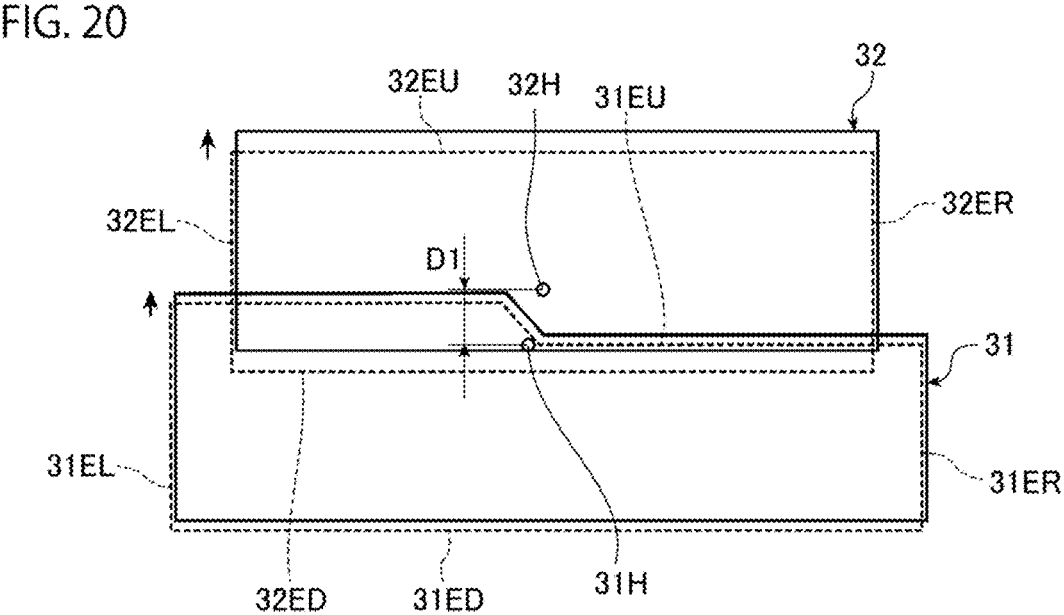
FIG. 20 is a view illustrating another example of the movement of the low beam image and the additional light distribution image similarly to FIG. 18.

Next, a case where the low beam image 31 and the additional light distribution image 32 move according to the upward gradient will be described. FIG. 20 is a view illustrating another example of the movement of the low beam image 31 and the additional light distribution image 32 similarly to FIG. 18. In a case where the upward gradient increases, the image generation unit 20 moves the low beam image 31 and the additional light distribution image 32 by a distance corresponding to an increase amount in a predetermined direction as illustrated in FIG. 20. The predetermined direction is an upward direction in FIG. 20, is a direction in which a cutoff line CL of the low beam light distribution pattern PL1 in the low beam image 31 moves to an edge 31EU side, and is a direction in which an upper edge of the additional light distribution pattern PAH1 of the additional light distribution image 32 moves to an edge 32EU side. On the other hand, in a case where the upward gradient decreases, the image generation unit 20 moves the low beam image 31 and the additional light distribution image 32 in another predetermined direction by a distance corresponding to the increase amount. The another predetermined direction is a downward direction in FIG. 20, is a direction in which a lower edge of the low beam light distribution pattern PL1 in the low beam image 31 moves to an edge 31ED side, and is a direction in which a lower edge of the additional light distribution pattern PAH1 of the additional light distribution image 32 moves to an edge 32ED side. That is, the table stored in the memory ME is a table for such movement of the low beam image 31 and the additional light distribution image 32. In addition, the predetermined directions in which the low beam image 31 and the additional light distribution image 32 move when the upward gradient changes include a vertical direction component. In the present embodiment, such a movement distance of the low beam image 31 in the vertical direction is smaller than a movement distance of the additional light distribution image 32 in the vertical direction, and may be equal to or larger than the movement distance of the additional light distribution image 32 in the vertical direction.

As in a case of the steering angle, the image generation unit 20 of the present embodiment generates a plurality of images while moving the low beam image 31 and the additional light distribution image 32 in the predetermined directions in a state where the low beam image 31 and the additional light distribution image 32 are superimposed in this manner, and outputs information of the generated images to the control unit CO. Therefore, the image formed by the light source unit 12 sequentially changes, and for example, the light distribution pattern of the emitted light gradually changes from the high beam light distribution pattern illustrated in FIG. 17 to the high beam light distribution pattern illustrated in FIG. 21.

Figure 21:
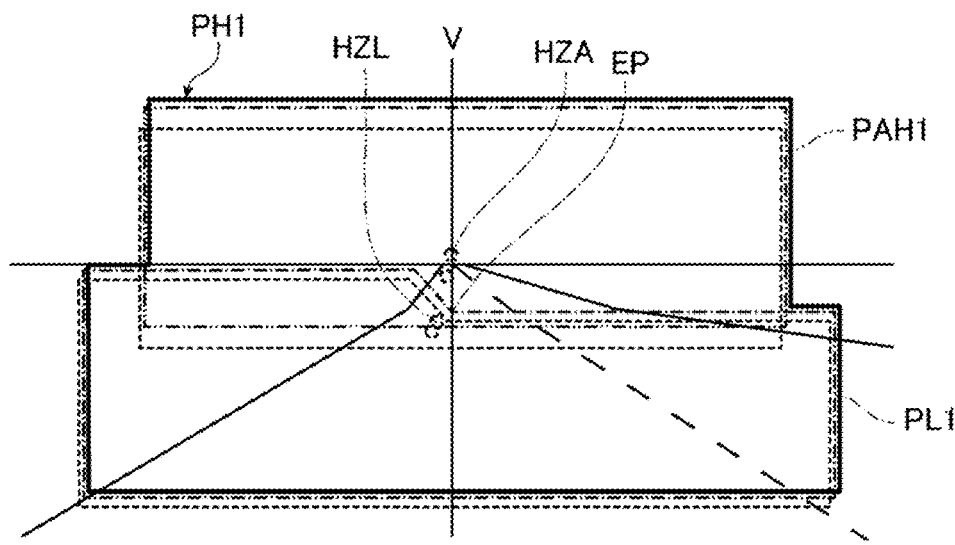
FIG. 21 is a view illustrating an example of the high beam light distribution pattern corresponding to an upward gradient similarly to FIG. 19.

FIG. 21 is a view illustrating an example of the high beam light distribution pattern corresponding to the upward gradient similarly to FIG. 19, and is a view illustrating an example of the high beam light distribution pattern in a case where the upward gradient increases from 0. In FIG. 21, the light distribution patterns PL1 and PAH1 before the change indicated by dotted lines are slightly shifted vertically and horizontally. In the present embodiment, each of the light distribution patterns PL1 and PAH1 gradually moves in the upward direction, so that the high beam light distribution pattern illustrated in FIG. 17 becomes the high beam light distribution pattern illustrated in FIG. 21, for example. Meanwhile, in a case where the vehicle is positioned in front of a specific point where a change from a flat road to an uphill road is made, or the like, the driver tends to raise the line of sight in order to visually recognize a place farther than the specific point. In the present embodiment, since the movement distance of the low beam image 31 in the vertical direction is smaller than the movement distance of the additional light distribution image 32 in the vertical direction, a movement distance of the low beam light distribution pattern PL1 in the vertical direction is smaller than a movement distance of the additional light distribution pattern PAH1 in the vertical direction. Therefore, the vehicle headlight 1 of the present embodiment can suppress deterioration in visibility of a side close to the vehicle 100 as compared with a case where the movement distances of the low beam light distribution pattern PL1 and the additional light distribution pattern PAH1 in the vertical direction are the same while improving the visibility of a far side.

As illustrated in FIG. 20, in a process of moving the low beam image 31 and the additional light distribution image 32, the image generation unit 20 of the present embodiment calculates a distance D1 in the vertical direction between a predetermined portion 31H in the low beam image 31 and a specific portion 32H in the additional light distribution image 32. The distance D1 changes when a vertical direction component is included in the predetermined directions in which the low beam image 31 and the additional light distribution image 32 move. The specific portion 32H is positioned on the edge 31EU side of the low beam image 31 with respect to the predetermined portion 31H. In the present embodiment, the predetermined portion 31H is a portion representing the hot zone HZL which is the brightest region in the low beam light distribution pattern PL1, and the specific portion 32H is a portion representing the hot zone HZA which is the brightest region in the additional light distribution pattern PAH1. However, the predetermined portion 31H and the specific portion 32H are not particularly limited. The image generation unit 20 compares the distance D1 with a predetermined value stored in advance in the memory ME. The predetermined value is set to a value smaller than the minimum distance D1 when the edge 31EU of the low beam image 31 and the edge 32ED of the additional light distribution image 32 intersect. In a case where the distance D1 is equal to or larger than the predetermined value, the image generation unit 20 generates an image in a state where the low beam image 31, the additional light distribution image 32, and the supplementary image 36 are superimposed by setting the opacity of the supplementary image layer 26L to 100%. The supplementary image 36 is an image superimposed on a part including the edge 31EU in the low beam image 31 and a part including the edge 32ED in the additional light distribution image 32. Therefore, even in a case where a gap is formed between the edge 31EU and the edge 32ED, the image generation unit 20 can fill the gap with the supplementary image.

Figure 22:
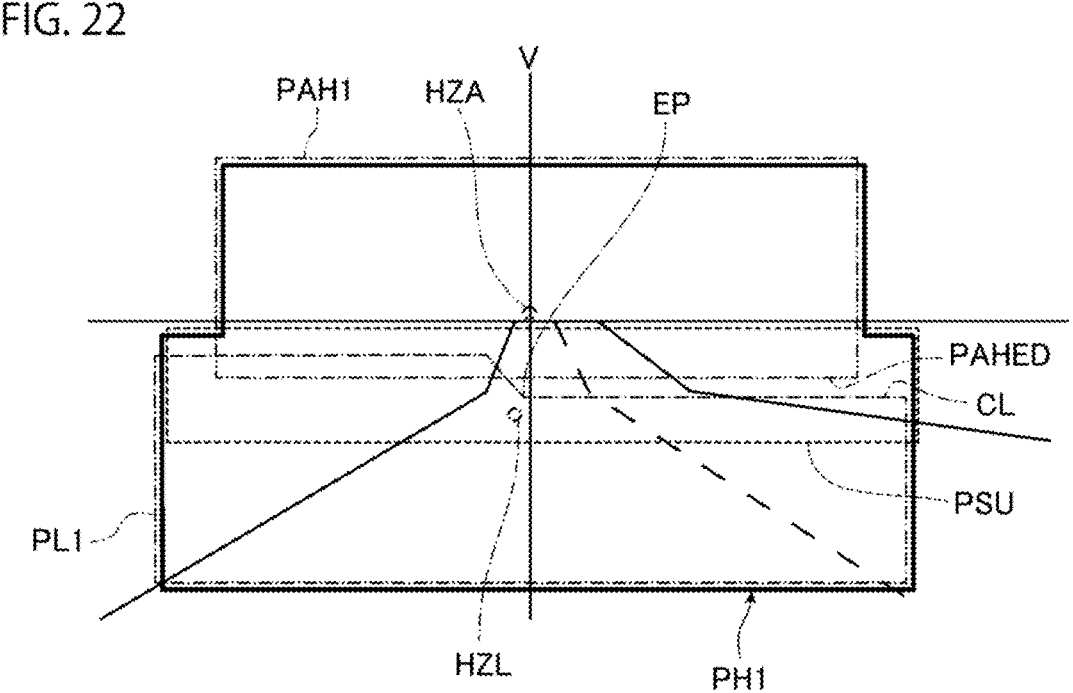
FIG. 22 is a view illustrating another example of the high beam light distribution pattern corresponding to the upward gradient similarly to FIG. 19.

FIG. 22 is a view illustrating another example of the high beam light distribution pattern corresponding to the upward gradient similarly to FIG. 19, and illustrates an example of the high beam light distribution pattern formed in a case where the distance D1 is equal to or larger than the predetermined value. In FIG. 22, a supplementary light distribution pattern PSU formed by the supplementary image 36 is indicated by a broken line, and the supplementary light distribution pattern PSU is slightly shifted vertically and horizontally. In the high beam light distribution pattern PH1 illustrated in FIG. 22, the supplementary light distribution pattern PSU fills a gap between the cutoff line CL of the low beam light distribution pattern and a lower edge PAHED of the additional light distribution pattern PAH1. Therefore, as compared with a case where the supplementary light distribution pattern PSU is not added, it is possible to suppress formation of a dark region in the high beam light distribution pattern PH1.

As described above, in a case of moving the additional light distribution pattern added to the low beam light distribution pattern to form the high beam light distribution pattern according to a traveling state of the vehicle or the like, there is a demand for making the movement of the additional light distribution pattern look smooth. In response to such a demand, for example, it is conceivable to move the additional light distribution pattern in stages and increase the number of stages of the movement. In this case, in the vehicle headlight of Patent Literature 1 described above, it is necessary to store information regarding the amount of light emitted from each micro LED for each light distribution pattern in the middle of movement in the memory, and the amount of information stored in the memory increases.

Therefore, in the vehicle headlight 1 of the present embodiment as the second aspect, the memory ME stores the low beam image 31 for forming the low beam light distribution pattern PL1 by the light emitted from the light source unit 12, and the additional light distribution image 32 for forming the additional light distribution pattern PAH1 by the light emitted from the light source unit 12, the additional light distribution pattern PAH1 being added to the low beam light distribution pattern PL1 to form the high beam light distribution pattern PH1. The image generation unit 20 generates a plurality of images while moving the additional light distribution image 32 in the predetermined direction in a state where the low beam image 31 and the additional light distribution image 32 are superimposed. Therefore, in the vehicle headlight 1 of the present embodiment as the second aspect, the image generation unit 20 generates a plurality of images in a process of moving the additional light distribution image 32 in the predetermined direction, thereby generating an image in the middle of movement of the additional light distribution pattern PAH1. The image in the middle of movement of the additional light distribution pattern PAH1 is generated based on the low beam image 31 and the additional light distribution image 32 stored in the memory ME. Therefore, with the vehicle headlight 1 of the present embodiment as the second aspect, it is possible to further suppress an increase in amount of information stored in the memory ME as compared with a case where the image in the middle of movement of the additional light distribution pattern PAH1 is stored in the memory ME.

Fourth Embodiment

Next, a fourth embodiment as a third aspect of the present invention will be described in detail. The same or equivalent constituent elements as those of the third embodiment are denoted by the same reference numerals and an overlapping description will be omitted unless otherwise specified. In the present embodiment, an image generation step is mainly different from the image generation step S11 of the third embodiment.

Figure 23:
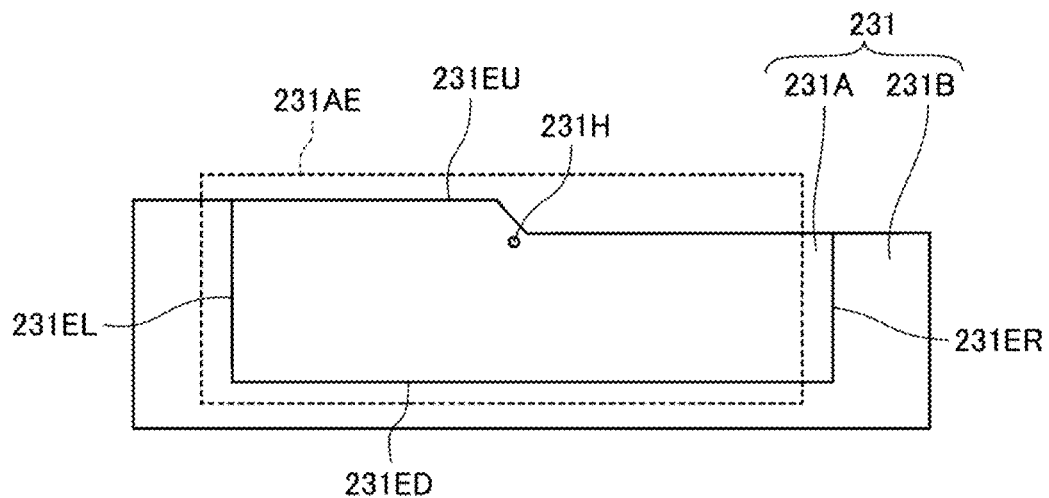
FIG. 23 is a view schematically illustrating an extended low beam image in a fourth embodiment as a third aspect of the present invention.

A memory ME of the present embodiment stores an extended low beam image and an extended additional light distribution image. FIG. 23 is a view schematically illustrating the extended low beam image in the present embodiment. As illustrated in FIG. 23, an extended low beam image 231 includes a reference low beam image 231A for forming a reference low beam light distribution pattern by light emitted from a light source unit 12 and a low beam supplementary image 231B. In the present embodiment, the reference low beam image 231A is the same as the low beam image 31 of the first embodiment, and the reference low beam light distribution pattern is the low beam light distribution pattern PL1 of the first embodiment. A predetermined portion 231H in the reference low beam image 231A is a portion representing a hot zone HZL in a low beam light distribution pattern PL1. The reference low beam image 231A is not particularly limited as long as the reference low beam image 231A is an image representing a low beam light distribution pattern in which a cutoff line has an elbow point.

The low beam supplementary image 231B is an image having a predetermined brightness and connected to at least one of both left and right edges 231EL and 231ER in the reference low beam image 231A or an edge 231ED representing a lower edge of the low beam light distribution pattern PL1 in the reference low beam image 231A. In the present embodiment, the low beam supplementary image 231B is connected to all the sections of the edges 231EL, 231ER, and 231ED of the reference low beam image 231A. In addition, each of upper edges of the low beam supplementary image 231B outside the edges 231EL and 231ER is positioned on an extension line of an edge 231EU of the reference low beam image 231A that represents the cutoff line CL of the low beam light distribution pattern PL1. In addition, the brightness of the low beam supplementary image 231B gradually decreases from a reference low beam image 231A side toward the outside, but is not particularly limited.

The image generation unit 20 of the present embodiment extracts a predetermined image from the extended low beam image 231. The predetermined image is an image including a portion representing a region including an elbow point EP and the hot zone HZL of the low beam light distribution pattern PL1 in the extended low beam image 231. In the present embodiment, a plurality of positions of an extraction range from which the predetermined image is extracted are set in advance according to a steering angle and an upward gradient. A plurality of tables in which the positions of the extraction range, the steering angle, and the upward gradient are associated with each other are stored in the memory ME. A position of the extraction range associated with a steering angle of 0 and an upward gradient of 0 is a reference position, and in this case, the reference low beam image 231A is extracted as the predetermined image. In addition, the predetermined image extracted from the extraction range at a position other than the reference position includes a part of the low beam supplementary image 231B and a part of the reference low beam image 231A. As described above, the predetermined image is an image representing a region including the elbow point EP and the hot zone HZL of the low beam light distribution pattern PL1. Therefore, the extracted predetermined image is an image representing a low beam light distribution pattern obtained by moving the hot zone HZL and the elbow point EP of the low beam light distribution pattern according to the steering angle and the upward gradient. That is, the extraction range and the position thereof are set as described above. The memory ME stores the reference position as a reference extraction position of the extended low beam image 231. In FIG. 23, an extraction range 231AE arranged at a certain position is indicated by a broken line.

Figure 24:
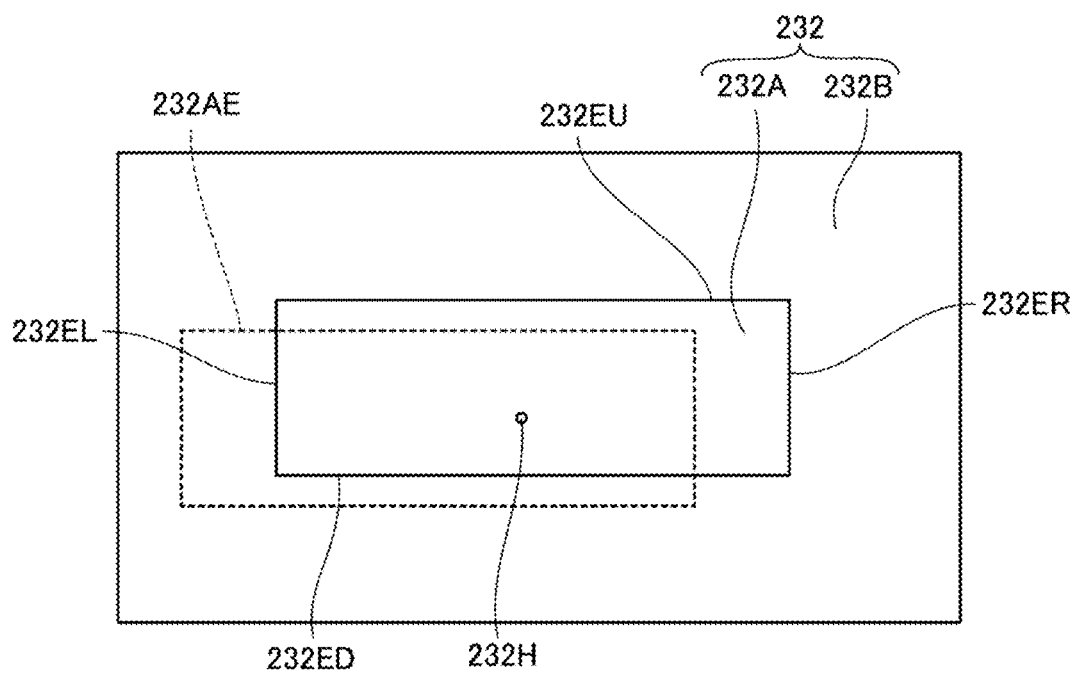
FIG. 24 is a view illustrating an extended additional light distribution image in the fourth embodiment similarly to FIG. 23.

FIG. 24 is a view illustrating the extended additional light distribution image in the present embodiment similarly to FIG. 23. As illustrated in FIG. 24, an extended additional light distribution image 232 includes a reference additional light distribution image 232A for forming a reference additional light distribution pattern by light emitted from the light source unit 12, and an additional light distribution supplementary image 232B. In the present embodiment, the reference additional light distribution image 232A is the same as the additional light distribution image 32 of the third embodiment, and the reference additional light distribution pattern is the additional light distribution pattern PAH1 of the third embodiment. Therefore, a reference high beam light distribution pattern in which the reference additional light distribution pattern is added to the reference low beam light distribution pattern is the high beam light distribution pattern PH1 in a case where the steering angle and the upward gradient are 0 in the third embodiment. A specific portion 232H in the reference additional light distribution image 232A is a portion representing a hot zone HZA in an additional light distribution pattern PAH1. The reference additional light distribution image 232A is not particularly limited as long as the reference additional light distribution image 232A is an image representing a light distribution pattern added to the low beam light distribution pattern represented by the reference low beam image 231A to form a high beam light distribution pattern.

The additional light distribution supplementary image 232B is an image having a specific brightness and connected to at least one of both the left and right edges 232EL and 232ER, an upper edge 232EU, or a lower edge 232ED in the reference additional light distribution image 232A. In the present embodiment, the additional light distribution supplementary image 232B is connected to all the sections of the upper, lower, left, and right edges 232EU, 232ED, 232EL, and 232ER of the reference additional light distribution image 232A. In addition, the brightness of the additional light distribution supplementary image 232B gradually decreases from a reference additional light distribution image 232A side toward the outside.

The image generation unit 20 of the present embodiment extracts a specific image from the extended additional light distribution image 232. The specific image is an image including the specific portion 232H representing the hot zone of the additional light distribution pattern PAH1 in the extended additional light distribution image 232. In the present embodiment, similarly to the predetermined image, a plurality of positions of an extraction range from which the specific image is extracted are set in advance according to the steering angle and the upward gradient. A plurality of tables in which the positions are associated with the steering angle and the upward gradient are stored in the memory ME. A position of the extraction range associated with a steering angle of 0 and an upward gradient of 0 is a reference position, and in this case, the reference additional light distribution image 232A is extracted as the specific image. In addition, the specific image extracted from the extraction range at a position other than the reference position includes a part of the additional light distribution supplementary image 232B and a part of the reference additional light distribution image 232A. As described above, the specific image includes the specific portion 232H representing the hot zone HZA of the additional light distribution pattern PAH1. Therefore, the extracted specific image is an image representing an additional light distribution pattern obtained by moving the hot zone HZA of the additional light distribution pattern PAH1 according to the steering angle and the upward gradient. That is, the extraction range and the position thereof are set as described above. The memory ME stores the above-described reference position as a reference extraction position of the extended additional light distribution image 232. In FIG. 24, an extraction range 232AE arranged at a certain position is indicated by a broken line.

Based on a signal indicating the upward gradient from the detection device 120 and a signal indicating the steering angle from the steering sensor 130, the image generation unit 20 of the present embodiment moves the positions of the extraction ranges 231AE and 232AE of the extended low beam image 231 and the extended additional light distribution image 232 according to the upward gradient and the steering angle with reference to the table stored in the memory ME.

Figure 25:
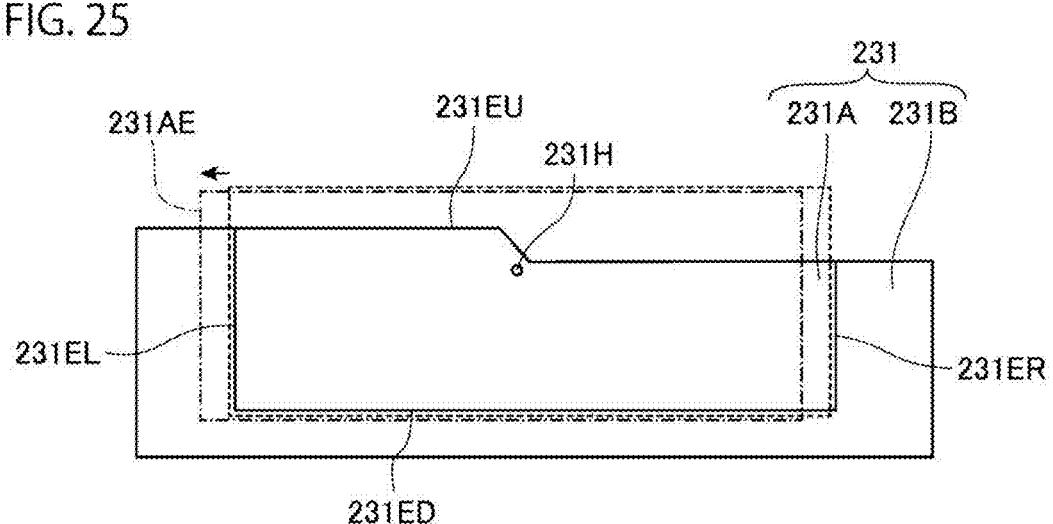
FIG. 25 is a view illustrating an example of movement of an extraction range of the extended low beam image.

First, the movement of the extraction range 231AE of the extended low beam image 231 will be described. FIG. 25 is a view illustrating an example of the movement of the extraction range 231AE of the extended low beam image 231. In FIG. 25, the extraction range 231AE before the movement is indicated by a broken line, the extraction range 231AE after the movement is indicated by a line with alternating long and short dashes, and the extraction ranges 231AE are slightly shifted vertically and horizontally. In a case where the steering angle increases, the image generation unit 20 moves the extraction range 231AE of the extended low beam image 231 by a distance corresponding to an increase amount in a predetermined direction as illustrated in FIG. 25. The predetermined direction is a left direction in FIG. 25, and is a direction from the edge 231ER to the edge 231EL of the reference low beam image 231A. On the other hand, in a case where the steering angle decreases, the image generation unit 20 moves the extraction range 231AE by a distance corresponding to a decrease amount in a right direction in FIG. 25, that is, in a direction from the edge 231EL to the edge 231ER of the reference low beam image 231A. In addition, in a case where the upward gradient increases, the image generation unit 20 moves the extraction range 231AE by a distance corresponding to an increase amount in a downward direction in FIG. 25, that is, in a direction from the edge 231EU to the edge 231ED of the reference low beam image 231A. In addition, in a case where the upward gradient decreases, the image generation unit 20 moves the extraction range 231AE by a distance corresponding to a decrease amount in an upward direction in FIG. 25, that is, in a direction from the edge 231ED to the edge 231EU of the reference low beam image 231A. That is, the table stored in the memory ME is a table for such movement of the extraction range 231AE.

The image generation unit 20 extracts a plurality of predetermined images while moving the extraction range 231AE in the extended low beam image 231. The predetermined images include a predetermined image in the middle of movement of the extraction range 231AE and a predetermined image extracted from the extraction range 231AE at a position corresponding to the upward gradient and the steering angle after the movement is completed, and the number of predetermined images in the middle of movement may be one. In addition, a movement period is, for example, 1.0 s, and a time interval at which the plurality of images are generated is, for example, 0.01 s, but the movement period and the time interval are not particularly limited. As described above, the predetermined image extracted from the extraction range 231AE at a position other than the reference position includes a part of the low beam supplementary image 231B and a part of the reference low beam image 231A, and is an image representing a region including the elbow point EP and the hot zone HZL of the low beam light distribution pattern PL1. Therefore, it can be understood that the image generation unit 20 extracts a plurality of predetermined images while moving the extraction range in the predetermined direction in such a way that such a predetermined image is extracted.

Figure 26:
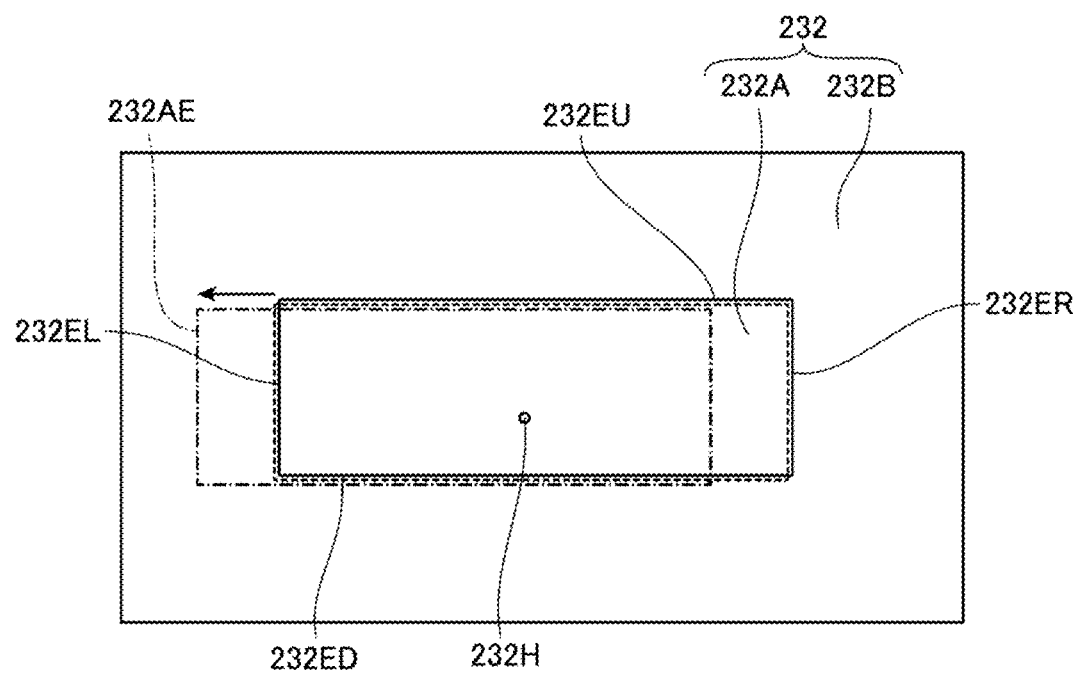
FIG. 26 is a view illustrating an example of movement of an extraction range of the extended additional light distribution image similarly to FIG. 25.

Next, the movement of the extraction range 232AE of the extended additional light distribution image 232 will be described. FIG. 26 is a view illustrating an example of the movement of the extraction range 232AE of the extended additional light distribution image 232 similarly to FIG. 25. Similarly to the extraction range 231AE of the extended low beam image 231, the image generation unit 20 moves the extraction range 232AE of the extended additional light distribution image 232. For example, in a case where the steering angle increases, the image generation unit 20 moves the extraction range 232AE of the extended additional light distribution image 232 by a distance corresponding to an increase amount in a predetermined direction as illustrated in FIG. 26. The predetermined direction is a left direction in FIG. 26, and is a direction from the edge 232ER to the edge 232EL of the reference additional light distribution image 232A. Furthermore, in a case where the steering angle decreases, the image generation unit 20 moves the extraction range 232AE by a distance according to a decrease amount in a right direction in FIG. 26, that is, in a direction from the edge 232EL to the edge 232ER of the reference additional light distribution image 232A. Furthermore, in a case where the upward gradient increases, the image generation unit 20 moves the extraction range 232AE by a distance corresponding to an increase amount in a downward direction in FIG. 26, that is, in a direction from the edge 232EU to the edge 232ED of the reference additional light distribution image 232A. Furthermore, in a case where the upward gradient decreases, the image generation unit 20 moves the extraction range 232AE by a distance according to a decrease amount in an upward direction in FIG. 26, that is, in a direction from the edge 232ED to the edge 232EU of the reference additional light distribution image 232A. That is, the table stored in the memory ME is a table for such movement of the extraction range 232AE. Furthermore, in the present embodiment, movement distances of the extraction range 232AE in the horizontal direction and the vertical direction are smaller than movement distances of the extraction range 231AE in the horizontal direction and the vertical direction, and may be equal to or larger than the movement distance of the extraction range 231AE.

Similarly to the predetermined image, the image generation unit 20 extracts a plurality of specific images while moving the extraction range 232AE of the extended additional light distribution image 232. In the present embodiment, a movement period of the extraction range 232AE of the extended additional light distribution image 232 is the same as the movement period of the extraction range 231AE of the extended low beam image 231. In addition, a timing of extracting the specific image in the movement period of the extraction range 232AE and a timing of extracting the predetermined image in the movement period of the extraction range 231AE are the same, and the number of specific images to be extracted and the number of predetermined images are the same. As described above, the specific image extracted from the extraction range 232AE at a position other than the reference position includes a part of the additional light distribution supplementary image 232B and a part of the reference additional light distribution image 232A, and includes the specific portion 232H. Therefore, it can be understood that the image generation unit 20 extracts a plurality of specific images while moving the extraction range 232AE in the predetermined direction in such a way that such a specific image is extracted.

Next, the image generation unit 20 generates a plurality of images by superimposing and combining each of the predetermined images and each of the specific images according to the order of extraction using a layer function. The plurality of images include an image generated from the predetermined image and the specific image extracted from the extraction ranges 231AE and 232AE after the movement is completed, and an image generated from the predetermined image and the specific image extracted from the extraction ranges 231AE and 232AE in the middle of the movement. An image may be generated by superimposing the extracted images each time one predetermined image and one specific image are extracted.

Figure 27:
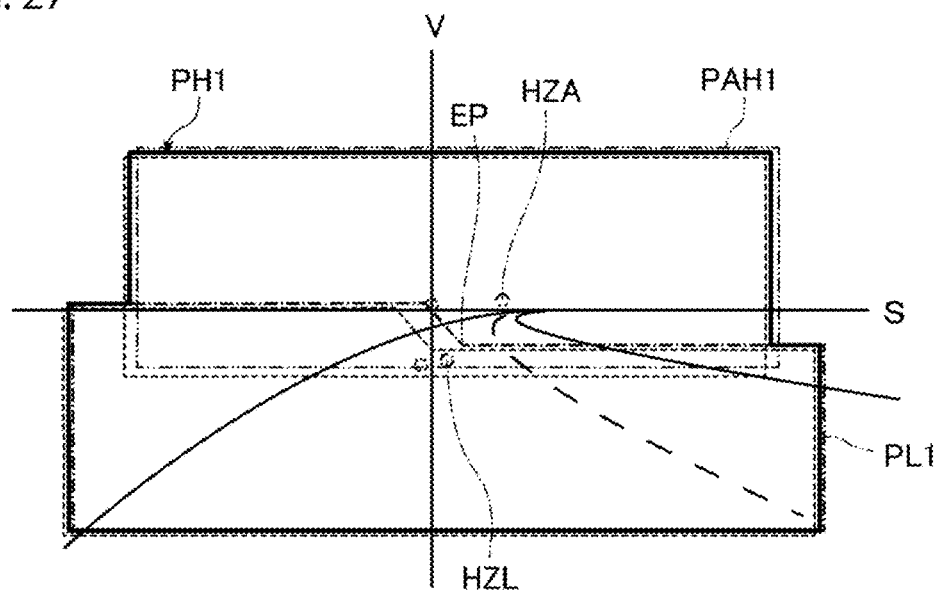
FIG. 27 is a view illustrating a change of a high beam light distribution pattern in the fourth embodiment.

The image generation unit 20 outputs information of the generated images to the control unit CO. Therefore, the image formed by the light source unit 12 sequentially changes, and for example, as illustrated in FIG. 27, the high beam light distribution pattern gradually changes. FIG. 27 is a view illustrating a change of the high beam light distribution pattern in the present embodiment, and is a view illustrating a change in a case where the steering angle increases. In FIG. 27, the low beam light distribution pattern PL1 and the additional light distribution pattern PAH1 in the high beam light distribution pattern PH1 before the change are indicated by dotted lines, and the light distribution patterns PL1 and PAH1 before the change are slightly shifted vertically and horizontally. In addition, the low beam light distribution pattern PL1 in the high beam light distribution pattern PH1 after the change is indicated by a line with alternating long and short dashes, the additional light distribution pattern PAH1 is indicated by a line with alternating long and two short dashes, and the light distribution patterns PL1 and PAH1 are slightly shifted vertically and horizontally. As illustrated in FIG. 27, in the present embodiment, in a case where the steering angle increases, the elbow point EP and the hot zone HZL in the low beam light distribution pattern PL1 gradually move in the right direction, and the hot zone HZA in the additional light distribution pattern PAH1 gradually moves in the right direction. In the present embodiment, since the movement distance of the extraction range 231AE in the horizontal direction is smaller than the movement distance of the extraction range 232AE in the horizontal direction, a movement distance of the hot zone HZL in the horizontal direction is smaller than a movement distance of the hot zone HZA in the horizontal direction. Therefore, similarly to the first embodiment, the vehicle headlight 1 of the present embodiment can suppress deterioration in visibility of a side close to a vehicle 100 as compared with a case where the movement distances of the hot zones HZL and HZA in the left and right directions are the same while improving visibility of a far side of a curved road. Although not illustrated, in a case where the steering angle decreases, the elbow point EP and the hot zones HZL and HZA gradually move in the left direction.

Figure 28:
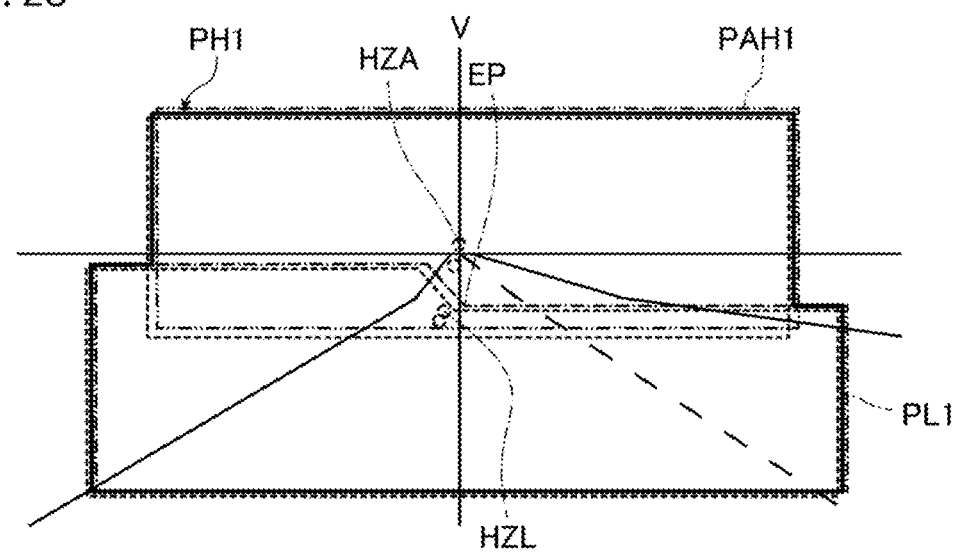
FIG. 28 is a view illustrating another change of the high beam light distribution pattern in the fourth embodiment similarly to FIG. 27.

FIG. 28 is a view illustrating another change of the high beam light distribution pattern in the present embodiment similarly to FIG. 27, and is a view illustrating a change in a case where the upward gradient increases. As illustrated in FIG. 28, in the present embodiment, in a case where the upward gradient increases, the elbow point EP and the hot zone HZL in the low beam light distribution pattern PL1 gradually move in the upward direction, and the hot zone HZA in the additional light distribution pattern PAH1 gradually moves upward. In the present embodiment, since the movement distance of the extraction range 231AE in the vertical direction is smaller than the movement distance of the extraction range 232AE in the vertical direction, a movement distance of the hot zone HZL in the vertical direction is smaller than a movement distance of the hot zone HZA in the vertical direction. Therefore, similarly to the third embodiment, with the vehicle headlight 1 of the present embodiment, it is possible to suppress deterioration in visibility of a side close to the vehicle as compared with a case where the movement distances of the hot zones HZL and HZA in the vertical direction are the same while improving visibility of a far side. Although not illustrated, in a case where the upward gradient decreases, the elbow point EP and the hot zones HZL and HZA gradually move in the downward direction.

As described above, in the vehicle headlight 1 of the present embodiment as the third aspect, the memory ME stores the extended low beam image 231 and the extended additional light distribution image 232. The extended low beam image 231 includes the reference low beam image 231A representing the low beam light distribution pattern PL1 and the low beam supplementary image 231B having a predetermined brightness and connected to both the left and right edges 231EL and 231ER in the reference low beam image 231A and the edge 231ED representing the lower edge of the low beam light distribution pattern PL1 in the reference low beam image 231A. The extended additional light distribution image 232 includes the reference additional light distribution image 232A representing the additional light distribution pattern PAH1 and the additional light distribution supplementary image 232B having a specific brightness and connected to both the left and right edges 232EL and 232ER, the upper edge 231EU, and the lower edge 231ED in the reference additional light distribution image 232A. The image generation unit 20 extracts the predetermined image including a portion representing a region including the elbow point EP and the hot zone HZL in the low beam light distribution pattern PL1 in the extended low beam image 231. In addition, the image generation unit 20 extracts a plurality of predetermined images while moving the extraction range 231AE in the predetermined direction in such a way that a part of the low beam supplementary image 231B is included in the predetermined image. In addition, the image generation unit 20 extracts a plurality of specific images while moving the extraction range 232AE in the predetermined direction in such a way as to extract a specific image including a part representing the hot zone HZA of the additional light distribution pattern PAH1 and a part of the additional light distribution supplementary image 232B in the extended additional light distribution image 232. In addition, the image generation unit 20 generates a plurality of images by superimposing each of the extracted specific images and each of the extracted predetermined images. Therefore, with the vehicle headlight 1 of the present embodiment as the third aspect, the hot zone HZL of the low beam light distribution pattern PL1 and the hot zone HZA of the additional light distribution pattern PAH1 can be moved in the same direction. In addition, in the vehicle headlight 1 according to the present embodiment as the third aspect, images in the middle of the movement of the hot zones HZL and HZA are generated by the image generation unit 20 based on the extended low beam image 231 and the extended additional light distribution image 232 stored in the memory. Therefore, with the vehicle headlight 1 of the present embodiment as the third aspect, it is possible to further suppress an increase in amount of information stored in the memory ME as compared with a case where the images in the middle of the movement of the hot zones HZL and HZA are stored in the memory ME.

The second aspect of the present invention has been described by taking the third embodiment as an example, and the third aspect of the present invention has been described by taking the fourth embodiment as an example. However, the second aspect and the third aspect of the present invention are not limited thereto.

For example, in the third embodiment, the image generation unit 20 that vertically and horizontally moves the low beam image 31 and the additional light distribution image 32 has been described as an example. However, as the second aspect, the image generation unit 20 may move at least the additional light distribution image 32 in a predetermined direction. In a case where the image generation unit 20 moves the additional light distribution image 32 in the horizontal direction, the additional light distribution pattern PAH1 can be moved in the horizontal direction. In a case where the image generation unit 20 moves the additional light distribution image 32 in the vertical direction, the additional light distribution pattern PAH1 can be moved in the vertical direction.

In the third embodiment, the image generation unit 20 that moves the low beam image 31 and the additional light distribution image 32 in the horizontal direction according to the steering angle and moves the low beam image 31 and the additional light distribution image 32 in the vertical direction according to the upward gradient has been described as an example. However, as the second aspect, information for moving the low beam image 31 and the additional light distribution image 32 by the image generation unit 20 is not particularly limited. For example, the image generation unit 20 may move the low beam image 31 and the additional light distribution image 32 in the horizontal direction according to a blinking state of left and right turn lamps included in the vehicle 100, or may move the low beam image 31 and the additional light distribution image 32 in the vertical direction according to an inclination of the vehicle 100 in the pitch direction.

Figure 29:
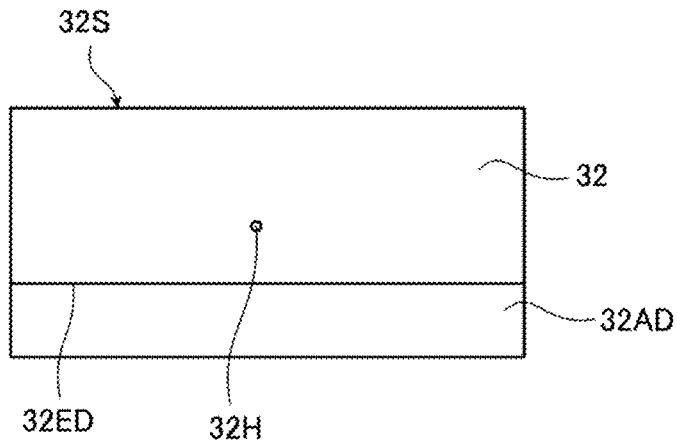
FIG. 29 is a view schematically illustrating an additional light distribution image in a modified example.
Figure 30:
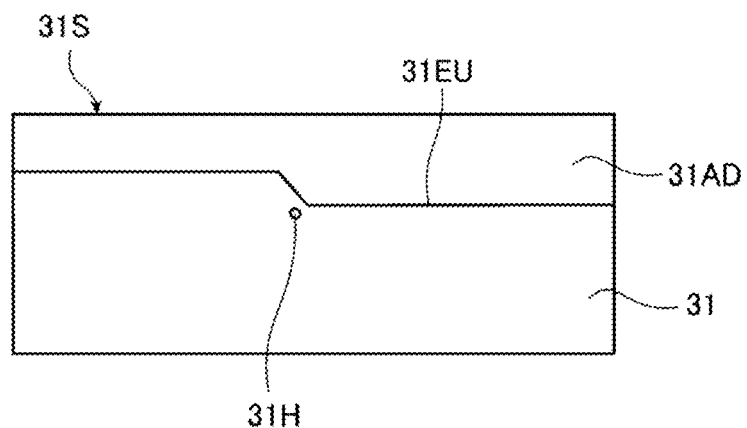
FIG. 30 is a view schematically illustrating a low beam image in the modified example.

In addition, in the third embodiment, the image generation unit 20 that superimposes the low beam image 31 and the additional light distribution image 32 on the supplementary image 36 stored in the memory ME in a case where the distance D1 is equal to or larger than the predetermined value has been described as an example. However, as the second aspect, the image generation unit 20 may generate the supplementary image 36 according to the distance D1. In addition, from the viewpoint of suppressing formation of a dark region in the high beam light distribution pattern PH1, the image generation unit 20 may change the additional light distribution image 32 in such a way that a lower side of the additional light distribution pattern PAH1 extends downward in a case where the distance D1 is equal to or larger than a predetermined value. For example, the image generation unit 20 may change the additional light distribution image 32 to another additional light distribution image 32S illustrated in FIG. 29. The another additional light distribution image 32S is an image in which an extended image 32AD is connected to the edge 32ED representing the lower edge of the additional light distribution pattern PAH1 in the additional light distribution image 32. The extended image 32AD becomes brighter as the distance to the additional light distribution image 32 decreases, but the brightness of the extended image 32AD may be uniform as a whole. Furthermore, the extended image 32AD may be superimposed on the additional light distribution image 32 in such a way as to straddle the edge 32ED. In addition, the image generation unit 20 may change the low beam image 31 in such a way that an upper side of the low beam light distribution pattern extends upward in a case where the distance D1 is equal to or larger than a predetermined value. For example, the image generation unit 20 may change the low beam image 31 to another low beam image 31S illustrated in FIG. 30. The another low beam image 31S is an image in which an expanded image 31AD is connected to the edge 31EU representing the cutoff line CL of the low beam light distribution pattern in the low beam image 31. The extended image 31AD becomes brighter as the distance to the low beam image 31 decreases, but the brightness of the extended image 31AD may be uniform as a whole. Furthermore, the expanded image 31AD may be superimposed on the low beam image 31 in such a way as to straddle the edge 31EU. Even with such a configuration, it is possible to suppress formation of a dark region in the high beam light distribution pattern PH1. In addition, the image generation unit 20 may change the low beam image 31 to the another low beam image 31S and change the additional light distribution image 32 to the another additional light distribution image 32S described above.

Furthermore, in the fourth embodiment, the image generation unit 20 that moves the extraction ranges 231AE and 232AE of the extended low beam image 231 and the extended additional light distribution image 232 vertically and horizontally has been described as an example. However, as the third aspect, the image generation unit 20 may move at least the extraction range 232AE of the extended additional light distribution image 232. In a case where the image generation unit 20 moves the extraction range 232AE in the horizontal direction, the hot zone HZA in the additional light distribution pattern PAH1 can be moved in the horizontal direction. In this case, the additional light distribution supplementary image 232B in the extended additional light distribution image 232 may be connected to at least both the left and right edges 232EL and 232ER of the reference additional light distribution image 232A. In addition, in a case where the image generation unit 20 moves the extraction range 232AE in the vertical direction, the hot zone HZA can be moved in the vertical direction. In this case, the additional light distribution supplementary image 232B in the extended additional light distribution image 232 may be connected to at least one of the upper edge 232EU or the lower edge 232ED of the reference additional light distribution image 232A. In addition, in a case where the image generation unit 20 moves the extraction range 231AE of the extended low beam image 231, the extraction range 231AE may be moved in such a way that a part of the low beam supplementary image 231B is included in the predetermined image. For example, in a case where the image generation unit 20 moves the extraction range 231AE in the horizontal direction, the low beam supplementary image 231B in the extended additional light distribution image 232 may be connected to at least both the left and right edges 231EL and 231ER of the reference low beam image 231A. In a case where the image generation unit 20 moves the extraction range 231AE in the vertical direction, the low beam supplementary image 231B may be connected to at least the edge 231ED of the reference low beam image 231A.

In addition, in the fourth embodiment, the image generation unit 20 that moves the extraction ranges 231AE and 232AE of the extended low beam image 231 and the extended additional light distribution image 232 in the horizontal direction according to the steering angle, and moves the extraction ranges 231AE and 232AE of the extended low beam image 231 and the extended additional light distribution image 232 in the vertical direction according to the upward gradient has been described as an example. However, as the third aspect, information for moving the extraction ranges 231AE and 232AE by the image generation unit 20 is not particularly limited. For example, the image generation unit 20 may move the extraction ranges 231AE and 232AE in the horizontal direction according to the blinking state of the left and right turn lamps included in the vehicle 100, or may move the extraction ranges 231AE and 232AE in the vertical direction according to the inclination of the vehicle 100 in the pitch direction.

In the third and fourth embodiments, the image generation unit 20 that generates an image representing the high beam light distribution pattern has been described as an example. However, in the second aspect and the third aspect, the image generated by the image generation unit 20 may be a part of the high beam light distribution pattern PH1. In this case, for example, the lamp portion 5 includes the lamp unit 10 and another lamp unit. Then, the image generation unit 20 generates an image representing a portion of the additional light distribution pattern PAH1 in the high beam light distribution pattern PH1 and a portion including the elbow point and the hot zone HZL in the low beam light distribution pattern PL1. Then, a portion of the low beam light distribution pattern PL1 that is not represented by the image generated by the image generation unit 20 is formed by light from the another lamp unit. A light distribution pattern formed by light from the lamp unit 10 and a light distribution pattern formed by light from the another lamp unit may overlap each other. Further, a configuration of the another lamp unit is not particularly limited.

In the third and fourth embodiments, the image generation unit 20 that generates an image by using a layer has been described as an example. However, as the second aspect and the third aspect, an image generation method of the image generation unit 20 is not particularly limited, and an image may be generated by a method not using the layer. In the third embodiment, the plurality of tables in which the steering angle and the upward gradient are associated with the positions of the low beam image 31 and the additional light distribution image 32 are stored in the memory ME. In addition, in the fourth embodiment, the plurality of tables in which the steering angle and the upward gradient are associated with the positions of the extraction ranges 231AE and 232AE of the extended low beam image 231 and the extended additional light distribution image 232 are stored in the memory ME. However, in the second aspect and the third aspect, the image generation unit 20 may calculate the positions based on input signals of the steering angle and the upward gradient.

Furthermore, similarly to the first aspect, as the second aspect and the third aspect, the light source unit 12 may include a plurality of light emitting units capable of individually changing the amount of light to be emitted, and emits light based on the image generated by the image generation unit 20. For example, the light source unit 12 may include a DMD including a plurality of reflective elements arranged in a matrix and a light irradiation unit that irradiates the DMD with light.

In addition, similarly to the first aspect, as the second aspect and the third aspect, at least one of the control unit CO, the image generation unit 20, and the memory ME may be shared by the pair of vehicle headlights 1. Furthermore, signals output from the detection device 120, the sensor, and the like included in the vehicle 100 may be input to the image generation unit 20 without passing through the ECU 101 of the vehicle 100. In addition, a vehicle including the vehicle headlight 1, the number of vehicle headlights 1 included in a vehicle, and the like are not particularly limited. For example, in a case where the vehicle is a two-wheeled vehicle, the number of vehicle headlights 1 may be one.

Fifth Embodiment

Next, a fifth embodiment as a fourth aspect and a fifth aspect will be described. The same or equivalent constituent elements as those of the first embodiment are denoted by the same reference numerals and an overlapping description will be omitted unless otherwise specified.

A vehicle 100 of the present embodiment is mainly different from the vehicle 100 of the first embodiment in that a signal from a detection device 120 and a signal from a vehicle speed sensor 140 are not input to an image generation unit 20. Therefore, the present embodiment will be described with reference to FIG. 1.

A memory ME of the present embodiment stores information of first and second images and the like used when the image generation unit 20 generates an image. The first image is an image for forming an additional light distribution pattern by light emitted from a light source unit 12, and the additional light distribution pattern is a light distribution pattern added to a low beam light distribution pattern to form a high beam light distribution pattern. The second image is an image for forming the low beam light distribution pattern by the light emitted from the light source unit 12. The first image and the second image are grayscale images, and data of each pixel in each image is an opacity and the same predetermined grayscale value, and a pixel having a larger opacity is brighter. However, the data of each pixel is not particularly limited. Furthermore, the information stored in the memory ME may be read from a memory outside the vehicle via a wireless communication device included in the vehicle 100.

Figure 31:
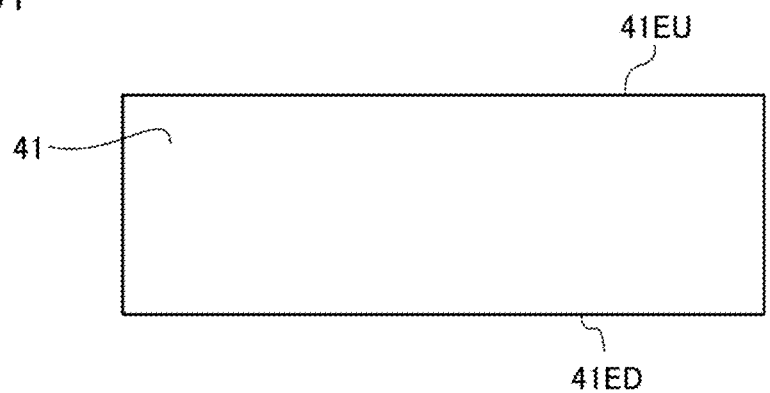
FIG. 31 is a view schematically illustrating a first image of a fifth embodiment as fourth and fifth aspects of the present invention.
Figure 32:
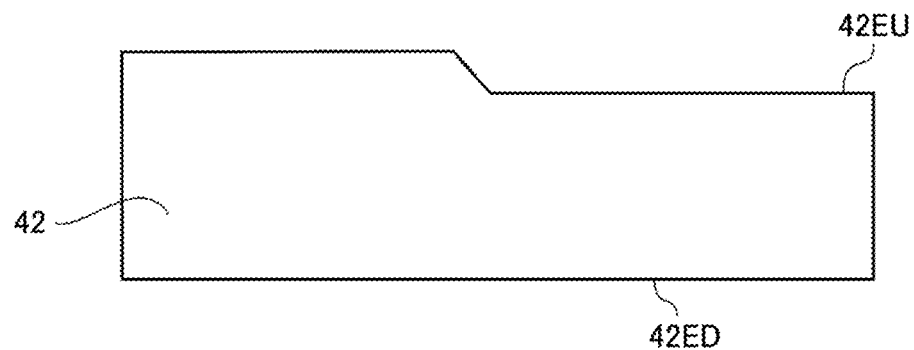
FIG. 32 is a view illustrating a second image of the fifth embodiment similarly to FIG. 31.

FIG. 31 is a view schematically illustrating the first image in the present embodiment, and FIG. 32 is a view illustrating the second image in the present embodiment similarly to FIG. 31. A first image 41 of the present embodiment is an image representing the additional light distribution pattern having a substantially rectangular shape elongated in the horizontal direction, and a second image 42 is an image representing the low beam light distribution pattern having an elbow point. In the present embodiment, an upper right pixel in the first image 41 illustrated in FIG. 31 and the second image 42 illustrated in FIG. 32 corresponds to a lower right light emitting element 13 illustrated in FIG. 3, a lower left pixel in the first image 41 illustrated in FIG. 31 and the second image 42 illustrated in FIG. 32 corresponds to an upper left light emitting element 13 illustrated in FIG. 3. That is, the correspondence relationship is vertically inverted. Therefore, a light distribution pattern of light emitted to the front of the vehicle 100 is a light distribution pattern corresponding to the first image 41 illustrated in FIG. 31 or a light distribution pattern corresponding to the second image 42 illustrated in FIG. 32. Furthermore, pixels of images in the following drawings correspond to the light emitting elements 13, similarly to the first image 41 illustrated in FIG. 31.

The image generation unit 20 of the present embodiment is configured to read the first image 41 and the second image 42 stored in the memory ME and generate an image based on the first image 41 and the second image 42.

Next, an operation of the vehicle headlight 1 of the present embodiment will be described. In the present embodiment, an image generation step S11 is different from the image generation step S11 of the first embodiment. Therefore, the image generation step S11 of the present embodiment will be described below.

In the image generation step S11 of the present embodiment, the image generation unit 20 generates an image based on the first image 41 and the second image 42 according to a signal input from a light switch 110 via an ECU 101, and outputs information of the image to a control unit CO. The image generation unit 20 repeats generation of such an image at predetermined time intervals. In a case where no signal is input from the light switch 110, the image generation unit 20 does not generate the image.

As an example of generation of an image by the image generation unit 20, first, a case where a signal from the light switch 110 indicates low beam emission will be described. In this case, the image generation unit 20 outputs the information of the second image 42 read from the memory ME to the control unit CO. Therefore, a low beam is emitted from the vehicle headlight 1.

Figure 33:
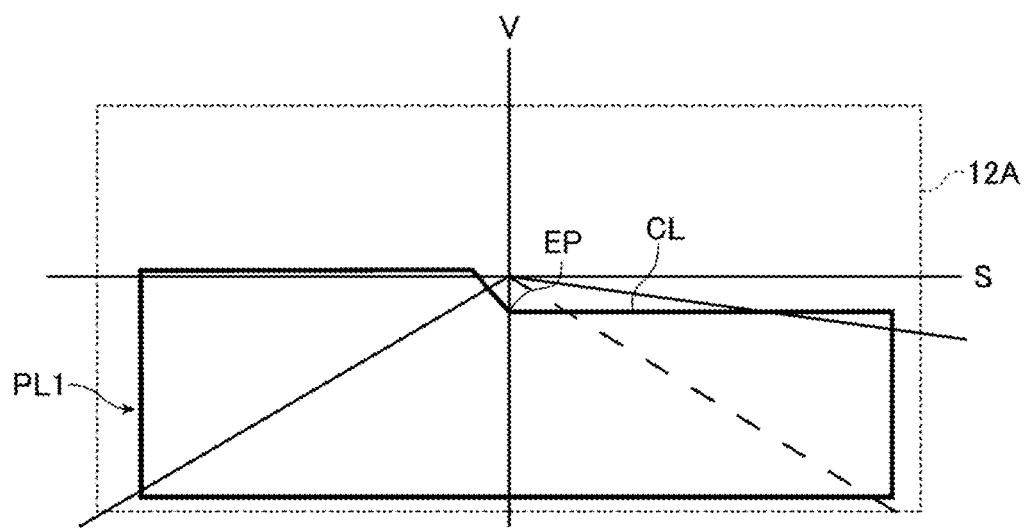
FIG. 33 is a view illustrating an example of a low beam light distribution pattern in the fifth embodiment similarly to FIG. 7.

FIG. 33 is a view illustrating an example of the low beam light distribution pattern in the present embodiment similarly to FIG. 7. A cutoff line CL in a low beam light distribution pattern PL1 of the present embodiment has an elbow point EP positioned below a horizontal line S and on or near a vertical line V, so that a step is formed.

Figure 34:
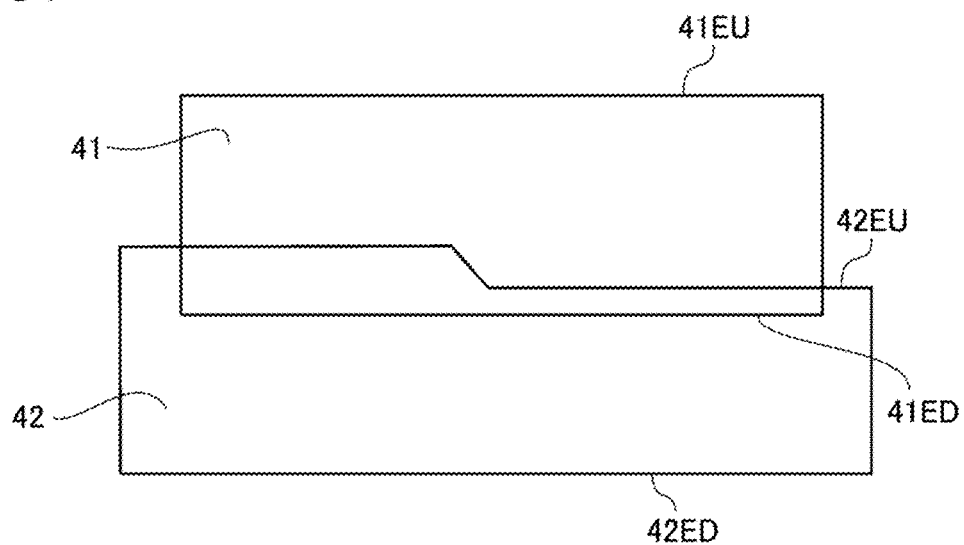
FIG. 34 is a view schematically illustrating a state where the first image and the second image are superimposed.

Next, a case where a signal from the light switch 110 indicates high beam emission will be described. In this case, as illustrated in FIG. 34, the image generation unit 20 generates an image representing the high beam light distribution pattern by combining the first image 41 and the second image 42 in a state where a part of the first image 41 and a part of the second image 42 read from the memory ME overlap each other. In the present embodiment, an opacity of a pixel in a region where the first image 41 and the second image 42 overlap is calculated by adding opacities of the pixels in the first image 41 and the second image 42. In a case where the calculated opacity exceeds 100%, the opacity is 100%. The grayscale value is the same as those of the pixels in the first image 41 and the second image 42. As described above, a pixel having a larger opacity is brighter. The image generation unit 20 outputs information of the image generated in this manner to the control unit co. Therefore, a high beam is emitted from the vehicle headlight 1.

Figure 35:
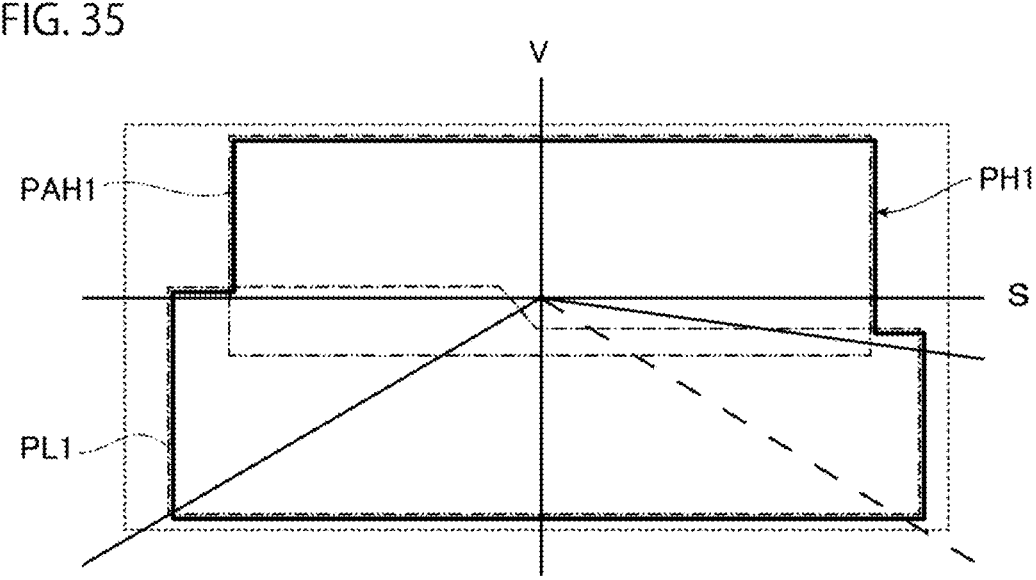
FIG. 35 is a view illustrating an example of a high beam light distribution pattern in the fifth embodiment similarly to FIG. 33.

FIG. 35 is a view illustrating an example of the high beam light distribution pattern in the present embodiment similarly to FIG. 32. In FIG. 35, the low beam light distribution pattern PL1 is indicated by a line with alternating long and short dashes, and an additional light distribution pattern PAH1 is indicated by a line with alternating long and two short dashes, and the light distribution patterns PL1 and PAH1 are slightly shifted vertically and horizontally.

Figure 36:
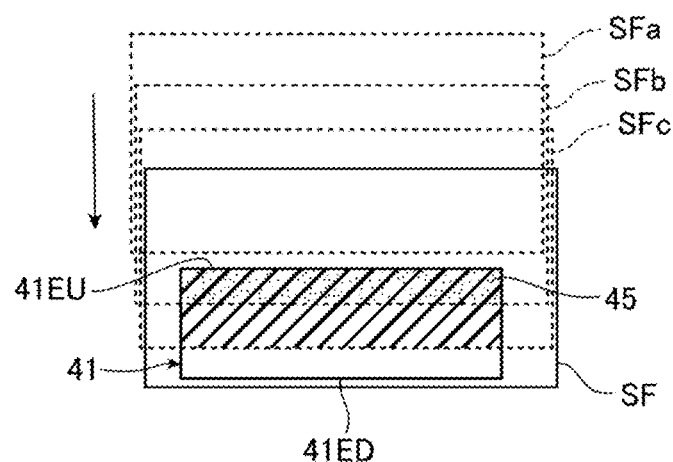
FIG. 36 is a view schematically illustrating an example of a state of movement of an extraction frame.

Next, a case where a signal from the light switch 110 changes from a signal indicating the low beam emission to a signal indicating the high beam emission will be described. In this case, the image generation unit 20 extracts the first image 41 by using an extraction frame for extracting the first image 41 on the data. Specifically, as illustrated in FIG. 36, the image generation unit 20 of the present embodiment moves an extraction frame SF in such a way as to increase a range of the first image 41 positioned within the rectangular extraction frame SF from which the first image 41 is extracted. A movement direction of the extraction frame SF is a direction from an edge 41EU representing an upper edge of the additional light distribution pattern PAH1 in the first image 41 toward an edge 41ED representing a lower edge of the additional light distribution pattern PAH1. A shape of the extraction frame SF is not particularly limited. The image generation unit 20 extracts a plurality of first images 41 in the extraction frame SF as intermediate images 45 while moving the extraction frame SF in this manner. In FIG. 36, the extraction frame SF after the movement is indicated by a solid line, an extraction frame SFa before the movement and extraction frames SFb and SFc in the middle of movement are indicated by broken lines, and the extraction frames SFa, SFb, and SFc are slightly shifted horizontally. In the present embodiment, the extraction frame SF is moved as described above in a state where the first image 41 is not positioned within the extraction frame SF. Therefore, the first image 41 enters the extraction frame SF from the edge 41EU. In addition, since the extraction frame SF moves as described above, the intermediate image 45 in a case where the range of the first image 41 positioned in the extraction frame SF is a part of the first image 41 is a part of the first image 41 including the edge 41EU. Then, the intermediate image 45 extracted by the extraction frame SF having a larger movement distance is an image whose extraction range in the first image 41 is wider in the movement direction of the extraction frame SF. In FIG. 36, the intermediate image 45 extracted by the extraction frame SFb is hatched with a plurality of dots, and the intermediate image 45 extracted by the extraction frame SFc is hatched with oblique lines. The intermediate image 45 extracted by the extraction frame SFc is an image wider in the movement direction of the extraction frame SF than the intermediate image 45 extracted by the extraction frame SFb having a smaller movement distance than the extraction frame SFc. In addition, the intermediate image 45 in a case where the entire first image 41 is positioned within the extraction frame SF is the first image 41. As described above, the intermediate image 45 is an image in which the additional light distribution pattern PAH1 gradually extends upward from an upper side in accordance with an increase in movement distance of the extraction frame SF.

The image generation unit 20 of the present embodiment generates a plurality of images by combining the respective intermediate images 45 and the second image 42 in a state where at least a part of each of the extracted intermediate images 45 overlaps the second image 42. A method of combining the images is the same as the method of combining the first image 41 and the second image 42 described above. In the present embodiment, the image generation unit 20 superimposes each intermediate image 45 and the second image 42 in such a way that an edge on a side opposite to the edge 41EU in each intermediate image 45 is positioned at a predetermined position in the second image 42. The predetermined position is, for example, a position where the edge 41ED representing the lower edge of the additional light distribution pattern PAH1 in the first image 41 is positioned when an image representing a high beam light distribution pattern PH1 is generated. A relative position between the intermediate image 45 and the second image 42 is not particularly limited. In addition, a movement period of the extraction frame SF is, for example, 200 ms, and a time interval at which the plurality of images are generated is, for example, 10 ms, but the movement period and the time interval are not particularly limited. Further, when the movement of the extraction frame SF is started, a part of the first image 41 may be positioned in the extraction frame SF.

Figure 37:
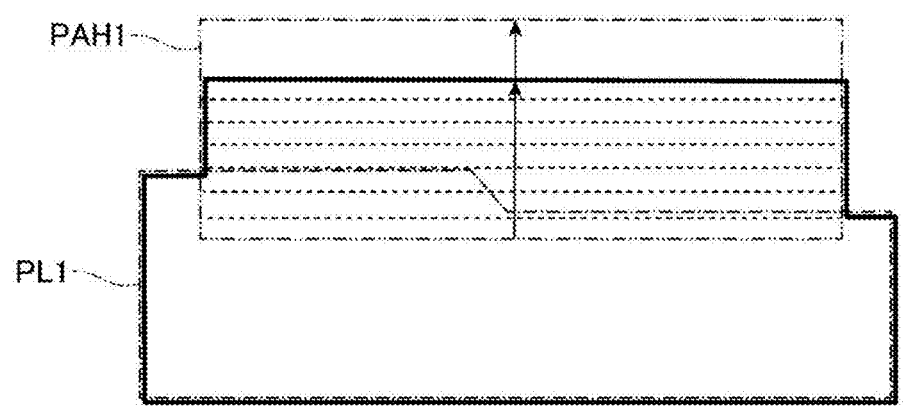
FIG. 37 is a view illustrating an example of a change of a light distribution pattern in the fifth embodiment.

The image generation unit 20 outputs information of the generated images to the control unit CO. Therefore, the image formed by the light source unit 12 sequentially changes. As described above, the intermediate image 45 is an image in which the additional light distribution pattern PAH1 gradually extends upward from the upper side in accordance with an increase in movement distance of the extraction frame SF. Therefore, as illustrated in FIG. 37, the additional light distribution pattern PAH1 changes in such a way as to gradually extend upward from the low beam light distribution pattern PL1, so that the low beam light distribution pattern PL1 can become the high beam light distribution pattern PH1. Therefore, with the vehicle headlight 1 of the present embodiment, it is possible to further suppress a driver from feeling uncomfortable for a change in light distribution pattern as compared with a case where the low beam light distribution pattern PL1 instantaneously changes to the high beam light distribution pattern PH1. In FIG. 37, the low beam light distribution pattern PL1 is indicated by a line with alternating long and short dashes, and the additional light distribution pattern PAH1 is indicated by a line with alternating long and two short dashes.

Figure 38:
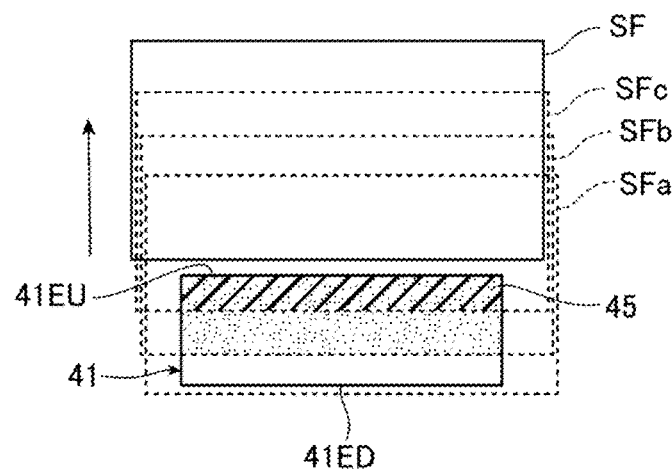
FIG. 38 is a view illustrating another example of the state of the movement of the extraction frame similarly to FIG. 36.

Next, a case where a signal from the light switch 110 changes from a signal indicating the high beam emission to a signal indicating the low beam emission will be described. In this case, as illustrated in FIG. 38, the image generation unit 20 moves the extraction frame SF in such a way as to decrease the range of the first image 41 positioned within the rectangular extraction frame SF from which the first image 41 is extracted. A movement direction of the extraction frame SF is a direction from the edge 41ED to the edge 41EU in the first image 41. The image generation unit 20 extracts a plurality of first images 41 in the extraction frame SF as intermediate images 45 while moving the extraction frame SF in this manner. In FIG. 38, similarly to FIG. 37, the extraction frame SF after the movement is indicated by a solid line, an extraction frame SFa before the movement and extraction frames SFb and SFc in the middle of movement are indicated by broken lines, and the extraction frames SFa, SFb, and SFc are slightly shifted horizontally. In the present embodiment, the extraction frame SF is moved as described above in a state where the entire first image 41 is positioned within the extraction frame SF. Therefore, the first image 41 comes out of the extraction frame SF from the edge 41ED. In addition, since the extraction frame SF moves as described above, the intermediate image 45 in a case where the range of the first image 41 positioned in the extraction frame SF is a part of the first image 41 is a part of the first image 41 including the edge 41EU. Then, the intermediate image 45 extracted by the extraction frame SF having a larger movement distance is an image whose extraction range in the first image 41 is narrower in the movement direction of the extraction frame SF. In FIG. 38, the intermediate image 45 extracted by the extraction frame SFb is hatched with a plurality of dots, and the intermediate image 45 extracted by the extraction frame SFc is hatched with oblique lines. The intermediate image 45 extracted by the extraction frame SFc is an image narrower in the movement direction of the extraction frame SF than the intermediate image 45 extracted by the extraction frame SFb having a smaller movement distance than the extraction frame SFc. In addition, the intermediate image 45 in a case where the first image 41 is not positioned within the extraction frame SF is an empty image. As described above, the intermediate image 45 is an image in which the additional light distribution pattern PAH1 gradually contracts downward from a lower side in accordance with an increase in movement distance of the extraction frame SF.

The image generation unit 20 of the present embodiment generates a plurality of images by combining the respective intermediate images 45 and the second image 42 in a state where at least a part of each of the extracted intermediate images 45 overlaps the second image 42. A method of combining the images is the same as the method of combining the intermediate image 45 and the first image 41 described above. In the present embodiment, the image generation unit 20 superimposes each intermediate image 45 and the second image 42 in such a way that an edge on a side opposite to the edge 41EU in each intermediate image 45 is positioned at a predetermined position in the second image 42. The predetermined position is, for example, a position where the edge 41ED representing the lower edge of the additional light distribution pattern PAH1 in the first image 41 is positioned when an image representing the high beam light distribution pattern PH1 is generated. A relative position between the intermediate image 45 and the second image 42 is not particularly limited. In addition, a movement period of the extraction frame SF is, for example, 200 ms, and a time interval at which the plurality of intermediate images 45 are generated is, for example, 10 ms, but the movement period and the time interval are not particularly limited. In addition, a movement speed of the extraction frame SF in this case may be the same as a movement speed of the extraction frame SF when the low beam light distribution pattern PL1 is changed to the high beam light distribution pattern PH1, or may be lower or higher than the movement speed. Further, when the movement of the extraction frame SF is started, a part of the first image 41 may be positioned outside the extraction frame SF.

Figure 39:
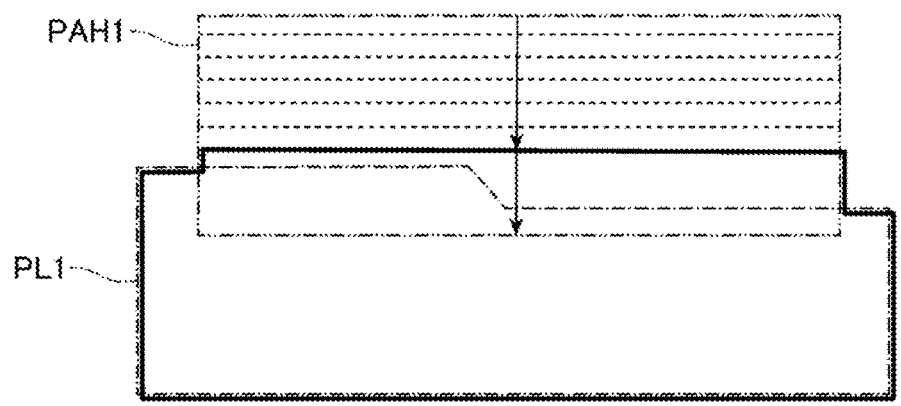
FIG. 39 is a view illustrating another example of the change of the light distribution pattern in the fifth embodiment similarly to FIG. 37.

The image generation unit 20 outputs information of the generated images to the control unit CO. Therefore, the image formed by the light source unit 12 sequentially changes. As described above, the intermediate image 45 is an image in which the additional light distribution pattern PAH1 gradually contracts downward from the lower side in accordance with an increase in movement distance of the extraction frame SF. Therefore, as illustrated in FIG. 39, the additional light distribution pattern PAH1 changes in such a way as to gradually contract downward, so that the high beam light distribution pattern PH1 becomes the low beam light distribution pattern PL1. Therefore, with the vehicle headlight 1 of the present embodiment, it is possible to further suppress a driver from feeling uncomfortable for a change in light distribution pattern as compared with a case where the low beam light distribution pattern PL1 instantaneously changes to the high beam light distribution pattern PH1.

As described above, in a case where the change of the light distribution pattern of the emitted light is steep, the driver may feel uncomfortable for the change. In order to suppress such an uncomfortable feeling, for example, it is conceivable to gradually change the light distribution pattern and increase the number of stages of change to make the change of the light distribution pattern look smooth. In this case, in the vehicle headlight of Patent Literature 1 described above, it is necessary to store information regarding the amount of light emitted from each micro LED for each light distribution pattern in the middle of the change in the memory. That is, the number of images for forming the light distribution pattern increases, and the amount of information stored in the memory increases.

Therefore, in the vehicle headlight 1 of the present embodiment as the fourth aspect and the fifth aspect, the memory ME stores the first image 41 for forming the additional light distribution pattern PAH1 by the light emitted from the light source unit 12, and the second image 42 for forming the low beam light distribution pattern PL1 by the light emitted from the light source unit 12. When the light distribution pattern of the light emitted from the light source unit 12 is switched from the low beam light distribution pattern PL1 to the high beam light distribution pattern PH1, the image generation unit 20 in the vehicle headlight 1 of the present embodiment as the fourth aspect extracts a plurality of first images 41 in the extraction frame SF as the intermediate images 45 while moving the extraction frame SF in such a way as to increase the range of the first image 41 positioned in the extraction frame SF from which the first image 41 is extracted. The movement direction of the extraction frame SF is the direction from the edge 41EU representing the upper edge of the additional light distribution pattern PAH1 in the first image 41 toward the edge 41ED representing the lower edge of the additional light distribution pattern PAH1. In addition, the image generation unit 20 generates a plurality of images by combining the respective intermediate images 45 and the second image 42 in a state where at least a part of each of the extracted intermediate images 45 overlaps the second image 42. Therefore, with the vehicle headlight 1 of the present embodiment as the fourth aspect, as described above, the additional light distribution pattern PAH1 changes in such a way as to gradually extend upward from the low beam light distribution pattern PL1, so that the low beam light distribution pattern PL1 can become the high beam light distribution pattern PH1. In addition, when the light distribution pattern of the light emitted from the light source unit 12 is switched from the high beam light distribution pattern PH1 to the low beam light distribution pattern PL1, the image generation unit 20 in the vehicle headlight 1 of the present embodiment as the fifth aspect extracts a plurality of first images 41 in the extraction frame SF as the intermediate images 45 while moving the extraction frame SF in such a way as to decrease the range of the first image 41 positioned in the extraction frame SF. The movement direction of the extraction frame SF is the direction from the edge 41ED representing the lower edge of the additional light distribution pattern PAH1 in the first image 41 toward the edge 41EU representing the upper edge of the additional light distribution pattern PAH1. In addition, the image generation unit 20 generates a plurality of images by combining the respective intermediate images 45 and the second image 42 in a state where at least a part of each of the extracted intermediate images 45 overlaps the second image 42. Therefore, with the vehicle headlight 1 of the present embodiment as the fifth aspect, as described above, the additional light distribution pattern PAH1 changes in such a way as to gradually contract downward, so that the high beam light distribution pattern PH1 can become the low beam light distribution pattern PL1. In addition, in the vehicle headlight 1 of the present embodiment as the fourth aspect and the fifth aspect, an image in the middle of change of the light distribution pattern is generated by the image generation unit 20 based on the first image 41 and the second image 42 stored in the memory ME. Therefore, with the vehicle headlight 1 of the present embodiment as the fourth aspect and the fifth aspect, it is possible to further suppress an increase in amount of information stored in the memory ME as compared with a case where the image in the middle of change of the light distribution pattern is stored in the memory ME.

Sixth Embodiment

Next, a sixth embodiment as a sixth aspect and a seventh aspect of the present invention will be described in detail. The same or equivalent constituent elements as those of the fifth embodiment are denoted by the same reference numerals and an overlapping description will be omitted unless otherwise specified. In the present embodiment, a first image is different from the first image 41 of the fifth embodiment, and an image generation step is mainly different from the image generation step S11 of the fifth embodiment.

A first image 41 of the present embodiment is an image for forming a high beam light distribution pattern PH1 by light emitted from a light source unit 12, and is an image in which the first image 41 and the second image 42 in the fifth embodiment are combined.

Therefore, in the present embodiment, in a case where a signal from a light switch 110 indicates high beam emission, an image generation unit 20 outputs information of the first image 41 read from a memory ME to a control unit CO. Therefore, a high beam is emitted from a vehicle headlight 1.

Figure 40:
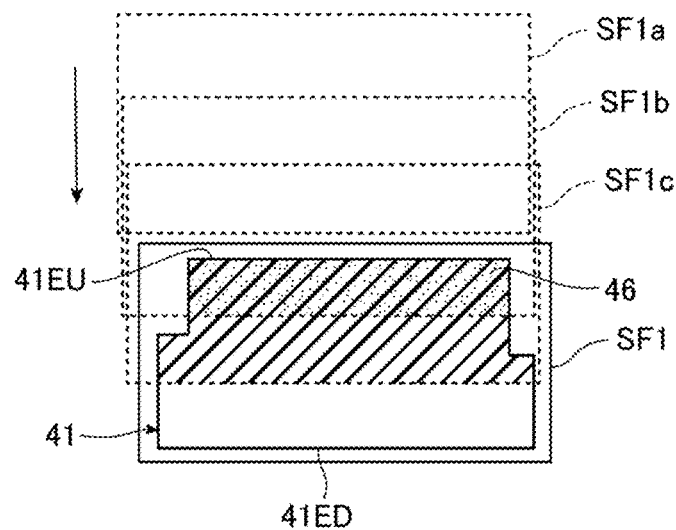
FIG. 40 is a view illustrating an example of a state of movement of a first extraction frame similarly to FIG. 36.

Next, a case where a signal from the light switch 110 changes from a signal indicating low beam emission to a signal indicating the high beam emission will be described. In this case, the image generation unit 20 extracts the first image 41 by using a first extraction frame for extracting the first image 41 and extracts a second image 42 using a second extraction frame for extracting the second image 42 on the data. Specifically, as illustrated in FIG. 40, the image generation unit 20 of the present embodiment extracts a plurality of first images 41 in a first extraction frame SF1 as first intermediate images 46 while moving the first extraction frame SF1 in such a way as to increase a range of the first image 41 positioned in the rectangular first extraction frame SF1 from which the first image 41 is extracted. FIG. 40 is a view illustrating an example of a state of movement of the first extraction frame SF1 similarly to FIG. 36. A movement direction of the first extraction frame SF1 is a direction from an edge 41EU representing an upper edge of the high beam light distribution pattern PH1 in the first image 41 to an edge 41ED representing a lower edge of the high beam light distribution pattern PH1. The extraction of the first intermediate images 46 is substantially the same as the extraction of the intermediate images 45 in this case in the fifth embodiment except that the first image 41 is an image representing the high beam light distribution pattern PH1. Therefore, the first extraction frame SF1 moves as described above in a state where the first image 41 is not positioned within the first extraction frame SF1. Similarly to the intermediate image 45 of the fifth embodiment, the first intermediate image 46 extracted by the first extraction frame SF1 having a larger movement distance is an image whose extraction range in the first image 41 is wider in the movement direction of the first extraction frame SF1. Then, the extracted first intermediate image 46 is an image in which the high beam light distribution pattern PH1 gradually extends upward from an upper side in accordance with an increase in movement distance of the first extraction frame SF1. A shape of the first extraction frame SF1 is not particularly limited. Further, when the movement of the first extraction frame SF1 is started, a part of the first image 41 may be positioned in the first extraction frame SF1.

Figure 41:
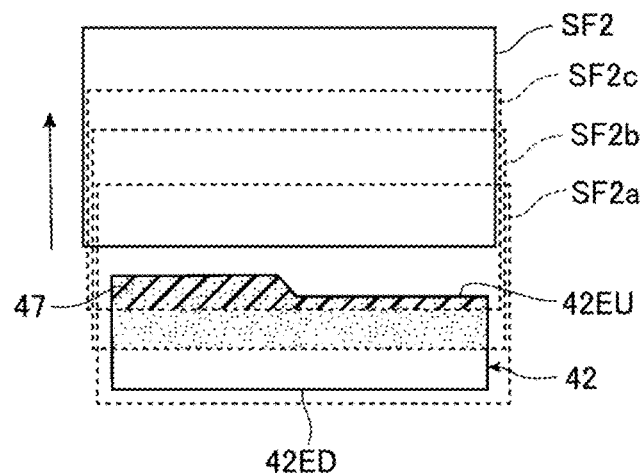
FIG. 41 is a view illustrating an example of a state of movement of a second extraction frame similarly to FIG. 36.

In addition, as illustrated in FIG. 41, the image generation unit 20 moves a second extraction frame SF2 in such a way as to decrease a range of the second image 42 positioned within the rectangular second extraction frame SF2 from which the second image 42 is extracted. FIG. 41 is a view illustrating an example of a state of movement of the second extraction frame SF2 similarly to FIG. 36. A movement direction of the second extraction frame SF2 is a direction from an edge 42ED representing a lower edge of a low beam light distribution pattern PL1 in the second image 42 toward an edge 42EU representing a cutoff line CL which is an upper edge of the low beam light distribution pattern PL1. A shape of the second extraction frame SF2 is not particularly limited. In addition, a size of the second extraction frame SF2 may be the same as a size of the first extraction frame SF1, or may be different from the size of the first extraction frame SF1. The image generation unit 20 extracts a plurality of second images 42 in the second extraction frame SF2 as second intermediate images 47 while moving the second extraction frame SF2 in this manner. In FIG. 41, the second extraction frame SF2 after the movement is indicated by a solid line, a second extraction frame SF2*a* before the movement and second extraction frames SF2*b* and SF2*c* in the middle of movement are indicated by broken lines, and the second extraction frames SF2*a*, SF2*b*, and SF2*c* are slightly shifted horizontally. In the present embodiment, the second extraction frame SF2 is moved as described above in a state where the entire second image 42 is positioned within the second extraction frame SF2. Therefore, the second image 42 comes out of the second extraction frame SF2 from the edge 42ED. In addition, since the second extraction frame SF2 moves as described above, the second intermediate image 47 in a case where the range of the second image 42 positioned in the second extraction frame SF2 is a part of the second image 42 is a part of the second image 42 including the edge 42EU. Then, the second intermediate image 47 extracted by the second extraction frame SF2 having a larger movement distance is an image whose extraction range in the second image 42 is narrower in the movement direction of the second extraction frame SF2. In FIG. 41, the second intermediate image 47 extracted by the second extraction frame SF2*b* is hatched with a plurality of dots, and the second intermediate image 47 extracted by the second extraction frame SF2*c* is hatched with oblique lines. The second intermediate image 47 extracted by the second extraction frame SF2*c* is an image narrower in the movement direction of the second extraction frame SF2 than the second intermediate image 47 extracted by the second extraction frame SF2*b* having a smaller movement distance than the second extraction frame SF2*c*. In addition, the second intermediate image 47 in a case where the second image 42 is not positioned within the second extraction frame SF2 is an empty image. As described above, the second intermediate image 47 is an image in which the low beam light distribution pattern PL1 gradually contracts downward from a lower side in accordance with an increase in movement distance of the second extraction frame SF2.

When the movement of the second extraction frame SF2 is started, a part of the second image 42 may be positioned outside the second extraction frame SF2. Furthermore, in the present embodiment, movement periods of the first extraction frame SF1 and the second extraction frame SF2 are, for example, 200 ms, and time intervals at which the plurality of first intermediate images 46 and the plurality of second intermediate images 47 are generated are, for example, 10 ms, but the movement periods and the time intervals are not particularly limited. In addition, the image generation unit 20 of the present embodiment moves the first extraction frame SF1 and the second extraction frame SF2 in such a way that a period in which the first image 41 and the first extraction frame SF1 intersect each other and a period in which the second image 42 and the second extraction frame SF2 intersect each other are the same.

In the present embodiment, the image generation unit 20 generates a plurality of images by combining each of the first intermediate images 46 and each of the second intermediate images 47 in a state where at least a part of each of the plurality of extracted first intermediate images 46 and at least a part of each of the plurality of extracted second intermediate images 47 overlap each other. A method of combining the images is the same as the method of combining the images in the fifth embodiment. In addition, the image generation unit 20 superimposes the first intermediate image 46 and the second intermediate image 47 in such a way that an edge on a side opposite to the edge 41EU in the first intermediate image 46 overlaps an edge on a side opposite to the edge 42EU in the second intermediate image 47. However, a relative position between the first intermediate image 46 and the second intermediate image 47 at the time of overlapping is not particularly limited.

Figure 42:
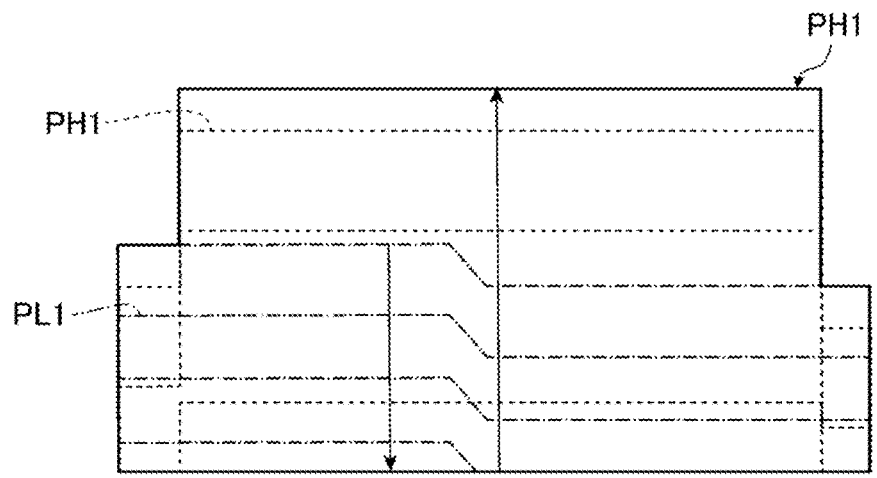
FIG. 42 is a view illustrating an example of a change of a light distribution pattern in a sixth embodiment as sixth and seventh aspects of the present invention.

The image generation unit 20 outputs information of the generated images to the control unit CO. Therefore, the image formed by the light source unit 12 sequentially changes. As described above, the extracted first intermediate image 46 is an image in which the high beam light distribution pattern PH1 gradually extends upward from the upper side in accordance with an increase in movement distance of the first extraction frame SF1. In addition, the second intermediate image 47 is an image in which the low beam light distribution pattern PL1 gradually contracts downward from the lower side in accordance with an increase in movement distance of the second extraction frame SF2. In addition, the period in which the first image 41 and the first extraction frame SF1 intersect each other is the same as the period in which the second image 42 and the second extraction frame SF2 intersect each other. Therefore, as illustrated in FIG. 42, the low beam light distribution pattern PL1 gradually contracts downward and the high beam light distribution pattern PH1 gradually extends upward from the lower side, so that the low beam light distribution pattern PL1 can become the high beam light distribution pattern PH1. Therefore, with the vehicle headlight 1 of the present embodiment, it is possible to further suppress a driver from feeling uncomfortable for a change in light distribution pattern as compared with a case where the low beam light distribution pattern PL1 instantaneously changes to the high beam light distribution pattern PH1. In FIG. 42, a change of the high beam light distribution pattern PH1 is indicated by a broken line, and a change of the low beam light distribution pattern PL1 is indicated by a line with alternating long and short dashes.

Figure 43:
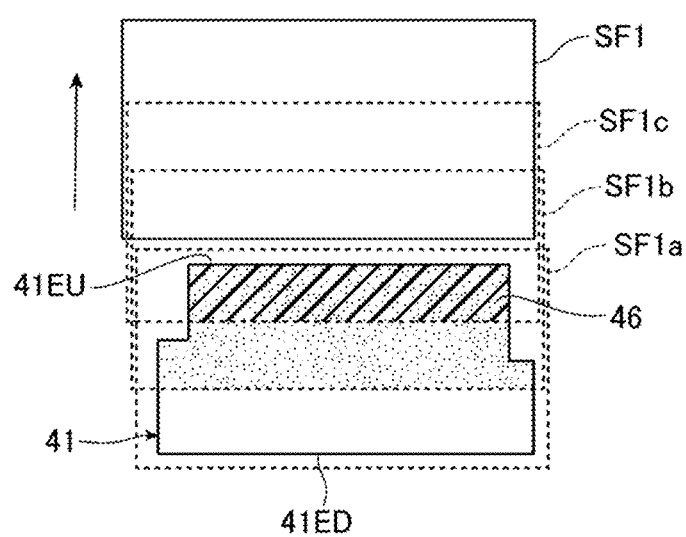
FIG. 43 is a view illustrating another example of the state of the movement of the first extraction frame similarly to FIG. 40.

Next, a case where a signal from the light switch 110 changes from a signal indicating the high beam emission to a signal indicating the low beam emission will be described. In this case, the image generation unit 20 extracts the first image 41 using the first extraction frame SF1 and the second image 42 using the second extraction frame SF2 on the data. Specifically, as illustrated in FIG. 43, the image generation unit 20 of the present embodiment extracts a plurality of first images 41 in the first extraction frame SF1 as the first intermediate images 46 while moving the first extraction frame SF1 in such a way as to decrease the range of the first image 41 positioned in the first extraction frame SF1. FIG. 43 is a view illustrating another example of the state of movement of the first extraction frame SF1 similarly to FIG. 40. The movement direction of the first extraction frame SF1 is a direction from the edge 41ED to the edge 41EU in the first image 41. The extraction of the first intermediate images 46 is substantially the same as the extraction of the intermediate images 45 in this case in the fifth embodiment except that the first image 41 is an image representing the high beam light distribution pattern PH1. Therefore, similarly to the intermediate image 45 of the fifth embodiment, the first intermediate image 46 extracted by the first extraction frame SF1 having a larger movement distance is an image whose extraction range in the first image 41 is narrower in the movement direction of the first extraction frame SF1. Then, the extracted first intermediate image 46 is an image in which the high beam light distribution pattern PH1 gradually contracts downward from the lower side in accordance with an increase in movement distance of the first extraction frame SF1. When the movement of the first extraction frame SF1 is started, a part of the first image 41 may be positioned outside the first extraction frame SF1.

Figure 44:
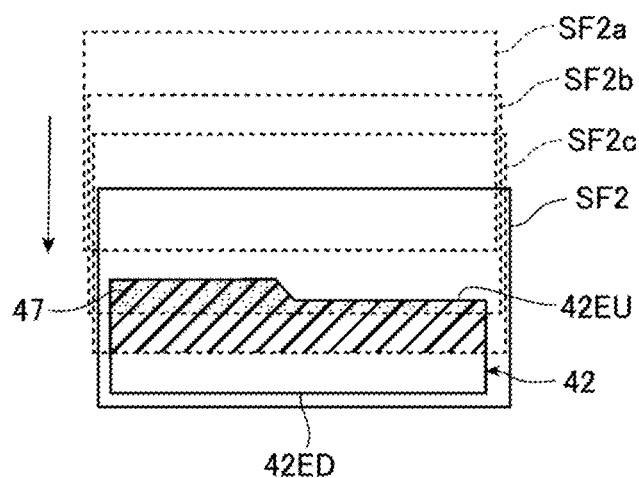
FIG. 44 is a view illustrating another example of the state of the movement of the second extraction frame similarly to FIG. 41.

In addition, as illustrated in FIG. 44, the image generation unit 20 moves the second extraction frame SF2 in such a way as to increase the range of the second image 42 positioned in the second extraction frame SF2. FIG. 44 is a view illustrating another example of the state of movement of the second extraction frame SF2 similarly to FIG. 41. The movement direction of the second extraction frame SF2 is a direction from the edge 42ED to the edge 42EU in the second image 42. The image generation unit 20 extracts a plurality of second images 42 in the second extraction frame SF2 as the second intermediate images 47 while moving the second extraction frame SF2 in this manner. In the present embodiment, the second extraction frame SF2 is moved as described above in a state where the second image 42 is not positioned within the second extraction frame SF2. Therefore, the second image 42 enters the second extraction frame SF2 from the edge 42EU. In addition, since the second extraction frame SF2 moves as described above, the second intermediate image 47 in a case where the range of the second image 42 positioned in the second extraction frame SF2 is a part of the second image 42 is a part of the second image 42 including the edge 42EU. Then, the second intermediate image 47 extracted by the second extraction frame SF2 having a larger movement distance is an image whose extraction range in the second image 42 is wider in the movement direction of the second extraction frame SF2. For example, in FIG. 44, the second intermediate image 47 extracted by the second extraction frame SF2c is an image wider in the movement direction of the second extraction frame SF2 than the second intermediate image 47 extracted by the second extraction frame SF2b having a smaller movement distance than the second extraction frame SF2c. In addition, the second intermediate image 47 in a case where the entire second image is positioned within the second extraction frame SF2 is the second image 42. As described above, the second intermediate image 47 is an image in which the low beam light distribution pattern PL1 gradually extends upward from the lower side in accordance with an increase in movement distance of the second extraction frame SF2.

When the movement of the second extraction frame SF2 is started, a part of the second image 42 may be positioned in the second extraction frame SF2. Furthermore, in the present embodiment, the movement periods of the first extraction frame SF1 and the second extraction frame SF2 are, for example, 200 ms, and the time intervals at which the plurality of first intermediate images 46 and the plurality of second intermediate images 47 are generated are, for example, 10 ms, but the movement periods and the time intervals are not particularly limited. In addition, the image generation unit 20 moves the first extraction frame SF1 and the second extraction frame SF2 in such a way that the period in which the first image 41 and the first extraction frame SF1 intersect each other and the period in which the second image 42 and the second extraction frame SF2 intersect each other are the same.

The image generation unit 20 generates a plurality of images by combining each of the first intermediate images 46 and each of the second intermediate images 47 in a state where at least a part of each of the plurality of extracted first intermediate images 46 and at least a part of each of the plurality of extracted second intermediate images 47 overlap each other. A method of combining the images is the same as the method of combining the images in the fifth embodiment. In the present embodiment, the image generation unit 20 superimposes the first intermediate image 46 and the second intermediate image 47 in such a way that the edge on the side opposite to the edge 41EU in the first intermediate image 46 overlaps the edge on the side opposite to the edge 42EU in the second intermediate image 47. However, the relative position between the first intermediate image 46 and the second intermediate image 47 at the time of overlapping is not particularly limited.

Figure 45:
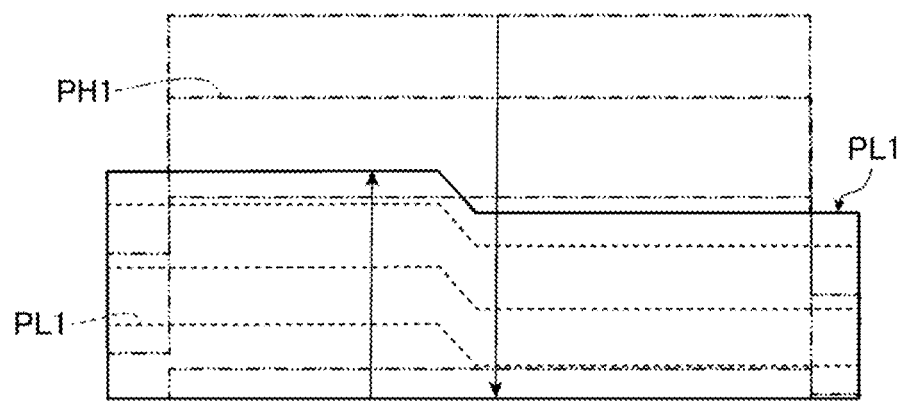
FIG. 45 is a view illustrating another example of the change of the light distribution pattern in the sixth embodiment.

The image generation unit 20 outputs information of the generated images to the control unit CO. Therefore, the image formed by the light source unit 12 sequentially changes. As described above, the first intermediate image 46 is an image in which the high beam light distribution pattern PH1 gradually contracts downward from the lower side in accordance with an increase in movement distance of the first extraction frame SF1. Further, the second intermediate image 47 is an image in which the low beam light distribution pattern PL1 gradually extends upward from the lower side in accordance with an increase in movement distance of the second extraction frame SF2. In addition, the period in which the first image 41 and the first extraction frame SF1 intersect each other is the same as the period in which the second image 42 and the second extraction frame SF2 intersect each other. Therefore, as illustrated in FIG. 45, the low beam light distribution pattern PL1 gradually extends upward from the lower side while the high beam light distribution pattern PH1 gradually contracts downward, so that the high beam light distribution pattern PH1 can become the low beam light distribution pattern PL1. Therefore, with the vehicle headlight 1 of the present embodiment, it is possible to further suppress the driver from feeling uncomfortable for a change in light distribution pattern as compared with a case where the high beam light distribution pattern PH1 instantaneously changes to the low beam light distribution pattern PL1. In FIG. 45, a change of the high beam light distribution pattern PH1 is indicated by a line with alternating long and two short dashes, and a change of the low beam light distribution pattern PL1 is indicated by a broken line.

As described above, in the vehicle headlight 1 of the present embodiment as the sixth aspect and the seventh aspect, the memory ME stores the first image 41 for forming the high beam light distribution pattern PH1 by the light emitted from the light source unit 12 and the second image 42 for forming the low beam light distribution pattern PL1 by the light emitted from the light source unit 12. When the light distribution pattern of the light emitted from the light source unit 12 is switched the low beam light distribution pattern PL1 to the high beam light distribution pattern PH1, the image generation unit 20 in the vehicle headlight 1 of the present embodiment as the sixth aspect extracts a plurality of first images 41 in the first extraction frame SF1 as the first intermediate images 46 while moving the first extraction frame SF1 in such a way as to increase the range of the first image 41 positioned in the first extraction frame SF1. The movement direction of the first extraction frame SF1 is a direction from the edge 41EU to the edge 41ED in the first image 41. In addition, the image generation unit 20 extracts a plurality of second images 42 in the second extraction frame SF2 as the second intermediate images 47 while moving the second extraction frame SF2 in such a way as to decrease the range of the second image 42 positioned in the second extraction frame SF2. The movement direction of the second extraction frame SF2 is a direction from the edge 42ED to the edge 42EU in the second image 42. Then, the image generation unit 20 generates a plurality of images by combining each of the first intermediate images 46 and each of the second intermediate images 47 in a state where at least a part of each of the extracted first intermediate images 46 and at least a part of each of the extracted second intermediate images 47 overlap each other. In addition, the period in which the first image 41 and the first extraction frame SF1 intersect each other is the same as the period in which the second image 42 and the second extraction frame SF2 intersect each other. Therefore, with the vehicle headlight 1 of the present embodiment as the sixth aspect, as described above, the low beam light distribution pattern PL1 gradually contracts downward and the high beam light distribution pattern PH1 gradually extends upward, so that the low beam light distribution pattern PL1 can become the high beam light distribution pattern PH1. Further, when the light distribution pattern of the light emitted from the light source unit 12 is switched from the high beam light distribution pattern PH1 to the low beam light distribution pattern PL1, the image generation unit 20 in the vehicle headlight 1 of the present embodiment as the seventh aspect extracts a plurality of first images 41 in the first extraction frame SF1 as the first intermediate images 46 while moving the first extraction frame SF1 in such a way as to decrease the range of the first image 41 positioned in the first extraction frame SF1. The movement direction of the first extraction frame SF1 is a direction from the edge 41ED to the edge 41EU in the first image 41. In addition, the image generation unit 20 extracts a plurality of second images 42 in the second extraction frame SF2 as the second intermediate images 47 while moving the second extraction frame SF2 in such a way as to increase the range of the second image 42 positioned in the second extraction frame SF2. The movement direction of the first extraction frame SF1 is a direction from the edge 41EU to the edge 41ED in the first image 41. Then, the image generation unit 20 generates a plurality of images by combining each of the first intermediate images 46 and each of the second intermediate images 47 in a state where at least a part of each of the extracted first intermediate images 46 and at least a part of each of the extracted second intermediate images 47 overlap each other. In addition, the period in which the first image 41 and the first extraction frame SF1 intersect each other is the same as the period in which the second image 42 and the second extraction frame SF2 intersect each other. Therefore, with the vehicle headlight 1 of the present embodiment as the seventh aspect, as described above, the low beam light distribution pattern PL1 gradually extends upward while the high beam light distribution pattern PH1 gradually contracts downward, so that the high beam light distribution pattern PH1 can become the low beam light distribution pattern PL1. In addition, in the vehicle headlight 1 of the present embodiment as the sixth aspect and the seventh aspect, an image in the middle of change of the light distribution pattern is generated by the image generation unit 20 based on the first image 41 and the second image 42 stored in the memory ME. Therefore, with the vehicle headlight 1 of the present embodiment as the sixth aspect and the seventh aspect, it is possible to further suppress an increase in amount of information stored in the memory ME as compared with a case where the image in the middle of change of the light distribution pattern is stored in the memory ME.

The fourth and fifth of the present invention have been described by taking the fifth embodiment as an example, and the sixth and seventh aspects of the present invention have been described by taking the sixth embodiment as an example. However, the fourth to seventh aspects of the present invention are not limited thereto.

For example, in the sixth embodiment, the image generation unit 20 that moves the first extraction frame SF1 and the second extraction frame SF2 in such a way that the period in which the first image 41 and the first extraction frame SF1 intersect each other and the period in which the second image 42 and the second extraction frame SF2 intersect each other are the same has been described as an example. However, the periods do not have to be the same. For example, from the viewpoint of gradually extending the high beam light distribution pattern PH1 upward while gradually contracting the low beam light distribution pattern PL1 downward, or gradually extending the low beam light distribution pattern PL1 upward while gradually contracting the high beam light distribution pattern PH1 downward, it is sufficient if at least a part of the period in which the first image 41 and the first extraction frame SF1 intersect each other and at least a part of the period in which the second image 42 and the second extraction frame SF2 intersect each other overlap each other.

In addition, in a case where the low beam light distribution pattern PL1 is changed to the high beam light distribution pattern PH1, the image generation unit 20 may start the movement of the second extraction frame SF2 after the range of the first image 41 positioned in the first extraction frame SF1 becomes the entire first image 41. In this case, the first intermediate image 46 until the entire first image 41 is positioned within the first extraction frame SF1 is combined with the second intermediate image 47 that is the second image 42. Therefore, after the entire high beam light distribution pattern PH1 comes out and the entire low beam light distribution pattern PL1 and the high beam light distribution pattern PH1 overlap each other, the low beam light distribution pattern PL1 can be gradually contracted downward. Therefore, it is possible to prevent the front of the vehicle from being darker than when the low beam is emitted during the change of the light distribution pattern.

In addition, in a case where the high beam light distribution pattern PH1 is changed to the low beam light distribution pattern PL1, the image generation unit 20 may start the movement of the first extraction frame SF1 after the range of the second image 42 positioned in the second extraction frame SF2 becomes the entire second image 42. In this case, the second intermediate image 47 until the entire second image 42 is positioned within the second extraction frame SF2 is combined with the first intermediate image 46 that is the first image 41. Therefore, with such a configuration, after the entire low beam light distribution pattern PL1 comes out and the entire low beam light distribution pattern PL1 and the high beam light distribution pattern PH1 overlap each other, the high beam light distribution pattern PH1 can be gradually contracted downward. Therefore, it is possible to prevent the front of the vehicle from being darker than when the low beam is emitted during the change of the light distribution pattern.

In addition, a movement speed of the first extraction frame SF1 may be higher than, equal to, or lower than a movement speed of the second extraction frame SF2.

In addition, a method of combining the images by the image generation unit 20 is not particularly limited. For example, the images may be combined by weighted addition, and in this case, for example, a weighting coefficient is the opacity of the overlapping pixels.

In addition, similarly to the first aspect, as the fourth to seventh aspects, the light source unit 12 may include a plurality of light emitting units capable of individually changing the amount of light to be emitted, and emits light based on the image generated by the image generation unit 20. For example, the light source unit 12 may include a DMD including a plurality of reflective elements arranged in a matrix and a light irradiation unit that irradiates the DMD with light.

In addition, similarly to the first aspect, as the fourth to seventh aspects, at least one of the control unit CO, the image generation unit 20, or the memory ME may be shared by the pair of vehicle headlights 1. In addition, a vehicle including the vehicle headlight 1, the number of vehicle headlights 1 included in a vehicle, and the like are not particularly limited. For example, in a case where the vehicle is a two-wheeled vehicle, the number of vehicle headlights 1 may be one.

Seventh Embodiment

Next, a seventh embodiment as an eighth aspect will be described. The same or equivalent constituent elements as those of the first embodiment are denoted by the same reference numerals and an overlapping description will be omitted unless otherwise specified.

Figure 46:
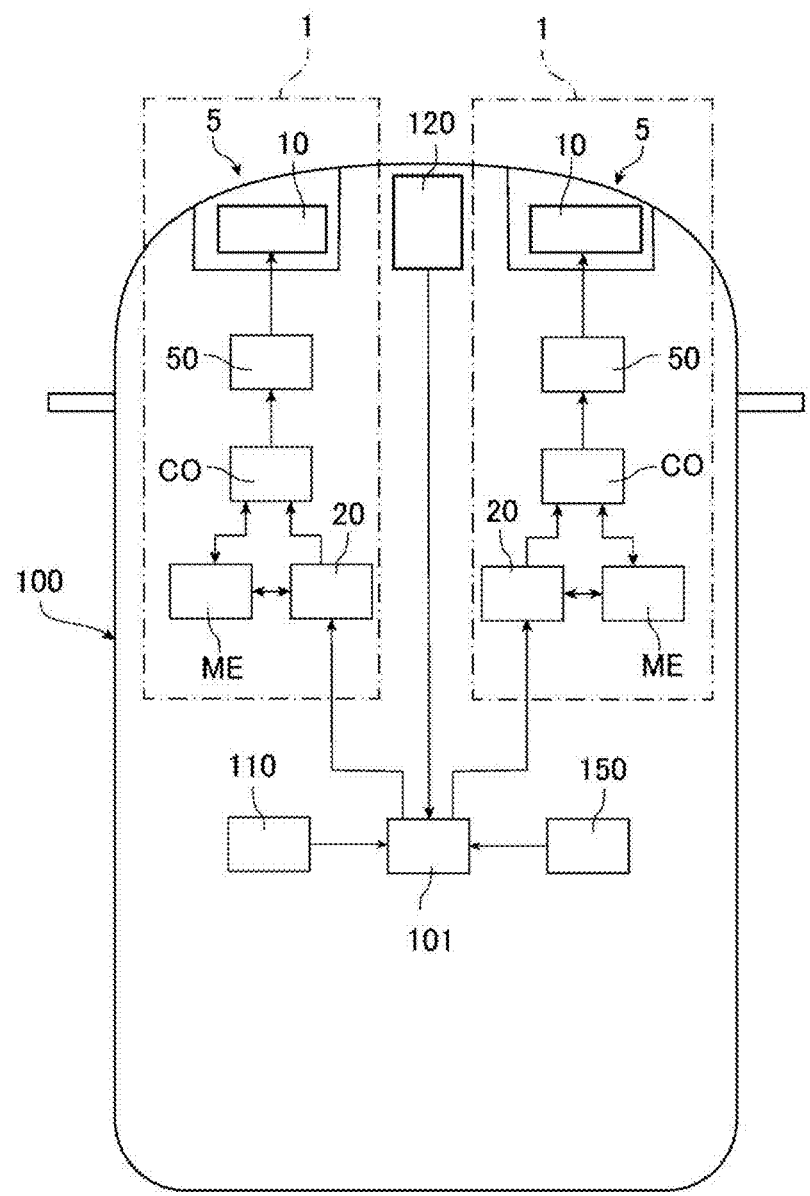
FIG. 46 is a plan view conceptually illustrating a vehicle including a vehicle headlight in a seventh embodiment as an eighth aspect of the present invention.

FIG. 46 is a plan view conceptually illustrating a vehicle including a vehicle headlight in the present embodiment. As illustrated in FIG. 46, a vehicle 100 of the present embodiment is mainly different from the vehicle 100 of the first embodiment in that a signal from a steering sensor 130 and a signal from a vehicle speed sensor 140 are not input to an image generation unit 20, and a signal from a turn switch 150 is input to the image generation unit 20.

Figure 47:
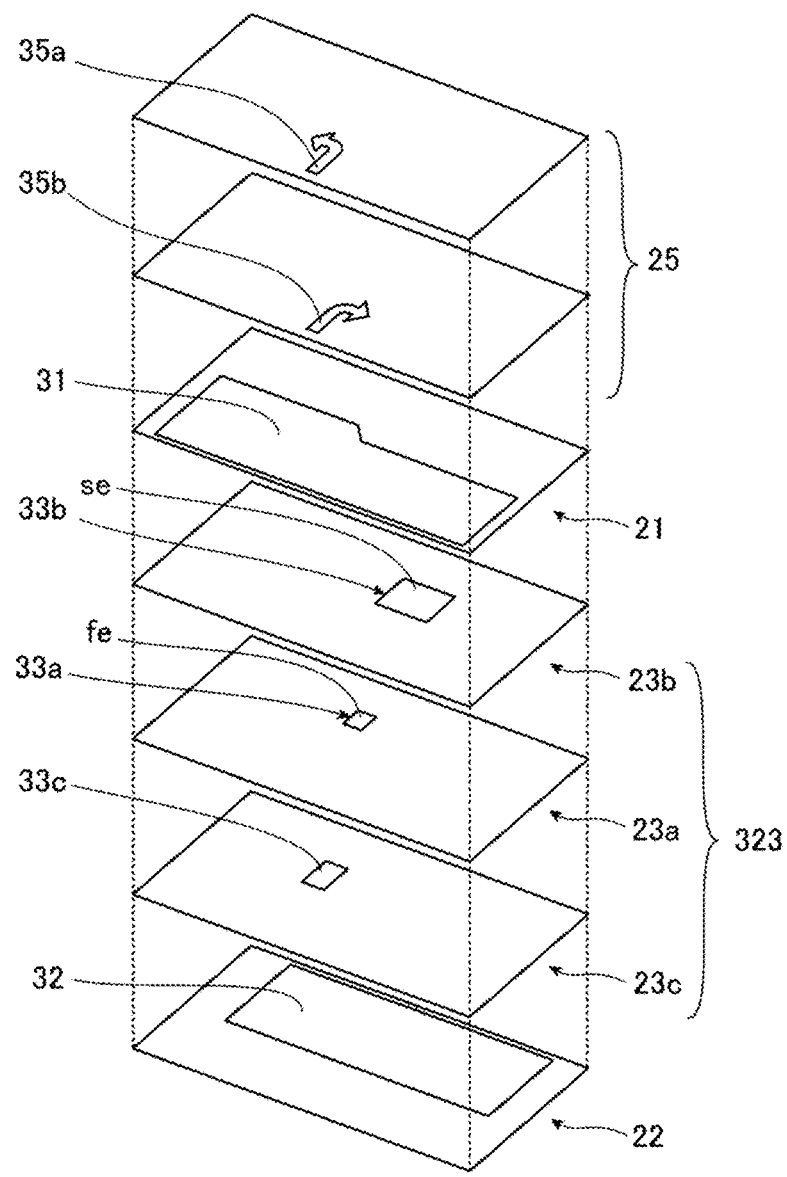
FIG. 47 is a view for describing a concept of a layer in an image generation unit of the seventh embodiment.

FIG. 47 is a view for describing a concept of a layer in the image generation unit 20 of the present embodiment. As illustrated in FIG. 47, the image generation unit 20 of the present embodiment includes a low beam layer group 21, an additional light distribution layer group 22, an additional image layer group 323, and a drawing layer group 25. The layer groups 21, 22, 323, and 25 each include at least one layer. In addition, a priority is set for each layer, and in FIG. 47, a layer with a lower priority is illustrated in the lower side. The priority indicates the order of superimposition, and a layer having a higher priority is superimposed on a layer having a lower priority. In the present embodiment, the priorities of the layer groups 21, 22, 323, and 25 are lower in the order of the drawing layer group 25, the low beam layer group 21, the additional image layer group 323, and the additional light distribution layer group 22. However, the priorities of the layer groups 21, 22, 323, and 25 are not particularly limited, and may be changeable. In addition, the priority of the layer in each of the layer groups 21, 22, 323, and 25 may also be changeable. Further, a variable opacity is set for each layer. In a case where the opacity is 100%, an image arranged in the corresponding layer is completely opaque. As the opacity decreases, the transparency of the image arranged in the corresponding layer increases. In a case where the opacity is 0%, the image arranged in the corresponding layer is completely transparent, and the image does not exist.

The low beam layer group 21 of the present embodiment includes one layer. A memory ME stores a low beam image 31 for forming a predetermined low beam light distribution pattern by light emitted from a light source unit 12. The image generation unit 20 reads the low beam image 31 from the memory ME and arranges the low beam image 31 in the layer of the low beam layer group 21. The low beam image 31 of the present embodiment is an image of a low beam light distribution pattern having an elbow point. In the present embodiment, an upper right pixel in the image illustrated in FIG. 47 corresponds to a lower right light emitting element 13 illustrated in FIG. 3, and a lower left pixel in the image illustrated in FIG. 47 corresponds to an upper left light emitting element 13 illustrated in FIG. 3. That is, the correspondence relationship is vertically inverted. Therefore, the light distribution pattern of the light emitted to the front of the vehicle 100 is a light distribution pattern corresponding to the image illustrated in FIG. 47. Furthermore, pixels of images in the following drawings correspond to the light emitting elements 13, similarly to the image illustrated in FIG. 47.

The additional light distribution layer group 22 of the present embodiment includes one layer. The memory ME stores an additional light distribution image 32 as a reference image. The additional light distribution image 32 is an image for forming an additional light distribution pattern as a reference light distribution pattern by light emitted from the light source unit 12. The additional light distribution pattern is a light distribution pattern added to the low beam light distribution pattern to form a high beam light distribution pattern, and is a part of the high beam light distribution pattern. The image generation unit 20 reads the additional light distribution image 32 from the memory ME and arranges the additional light distribution image 32 in the layer of the additional light distribution layer group 22.

The additional image layer group 323 of the present embodiment includes a plurality of layers. The memory ME stores a plurality of additional images superimposed on a part of the additional light distribution image 32. The image generation unit 20 reads the additional images one by one from the memory ME and arranges the additional images in different layers of the additional image layer group 323. In the present embodiment, at least a part of each of the plurality of additional images does not overlap the low beam image 31. Furthermore, the plurality of additional images include a plurality of darkened images and a plurality of brightened images, and each of the plurality of additional images is one of the plurality of darkened images and the plurality of brightened images. In the present embodiment, the plurality of darkened images include a plurality of slightly darkened images 33*a* including a first image element fe and a plurality of highly darkened images 33*b* including a second image element se darker than the first image element fe. Then, the additional image layer group 323 includes a slightly darkened layer group 23*a* including a plurality of layers in which the plurality of slightly darkened images 33*a* are arranged, a highly darkened layer group 23*b* including a plurality of layers in which the plurality of highly darkened images 33*b* are arranged, and a brightened layer group 23*c* including a plurality of layers in which the plurality of brightened images 33*c* are arranged. FIG. 4 illustrates three layers in which one slightly darkened image 33*a*, one highly darkened image 33*b*, and one brightened image 33*c* are arranged, and a description of the other layers is omitted. In the present embodiment, the priority level becomes lower in the order of the highly darkened layer group 23*b*, the slightly darkened layer group 23*a*, and the brightened layer group 23*c*. However, the priorities of the layer groups 23*a*, 23*b*, and 23*c* and a priority of each layer in the layer groups 23*a*, 23*b*, and 23*c* are not particularly limited, and may be changeable.

Figure 48:
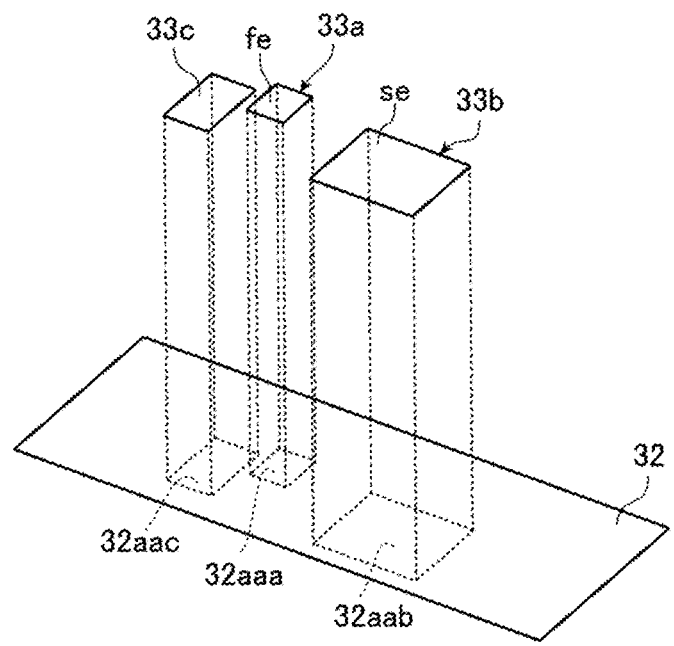
FIG. 48 is a view for describing a slightly darkened image, a highly darkened image, and a brightened image.

FIG. 48 is a view for describing the slightly darkened image 33*a*, the highly darkened image 33*b*, and the brightened image 33*c*, and illustrates an example of a state where the images 33*a*, 33*b*, and 33*c* are superimposed on a part of the additional light distribution image 32. As illustrated in FIG. 48, in the present embodiment, the images 33*a*, 33*b*, and 33*c* overlap regions 32*aaa*, 32*aab*, and 32*aac* in the additional light distribution image 32. The slightly darkened image 33*a* is darker than the region 32*aaa* in the additional light distribution image 32. Furthermore, although a description by illustration is omitted, at least parts of the plurality of slightly darkened images 33*a* that overlap the region 32*aaa* in the additional light distribution image 32 are different from each other. Furthermore, the first image elements fe included in the slightly darkened images 33*a* are quadrangles having the same predetermined brightness value, and have different positions, areas, aspect ratios, and the like. However, the brightness in the first image element fe does not have to be constant, and the shape of the first image element fe is not particularly limited. Furthermore, the slightly darkened image 33*a* may include a plurality of first image elements fe separated from each other.

The highly darkened image 33*b* is darker than the region 32*aaa* in the additional light distribution image 32 and the slightly darkened image 33*a*. Furthermore, although a description by illustration is omitted, at least parts of the plurality of highly darkened images 33*b* that overlap the region 32*aab* in the additional light distribution image 32 are different from each other. Furthermore, the second image elements se included in the highly darkened images 33*b* are quadrangles having the same predetermined brightness value, and have different positions, areas, aspect ratios, and the like. However, the brightness in the second image element se does not have to be constant, and the shape of the second image element se is not particularly limited. Furthermore, the highly darkened image 33*b* may include a plurality of second image elements se separated from each other. The brightness of the second image element se may be 0.

The brightened image 33*c* is brighter than the region 32*aac* in the additional light distribution image 32. Furthermore, although a description by illustration is omitted, at least parts of the plurality of brightened images 33*c* that overlap the region 32*aac* in the additional light distribution image 32 are different from each other. In the present embodiment, the brightened images 33*c* each include one quadrangular image element having the same brightness, and the image elements have different positions, areas, aspect ratios, and the like. However, the plurality of brightened images 33*c* are not particularly limited, and may include image elements having different brightnesses, shapes, and the like, or may include a plurality of image elements separated from each other.

The drawing layer group 25 of the present embodiment includes a plurality of layers. The memory ME stores a plurality of drawing images for forming a plurality of drawing light distribution patterns in which light emitted from the light source unit 12 draws different predetermined characters on a road surface. The image generation unit 20 reads the drawing images from the memory ME and arranges the drawing images one by one in different layers of the drawing layer group 25. In the present embodiment, the drawing layer group 25 includes two layers. In one layer, a drawing image 35a of a drawing light distribution pattern in which an arrow bent leftward when viewed from a driver is drawn on the road surface is arranged, and in the other layer, a drawing image 35b of a drawing light distribution pattern in which an arrow bent rightward when viewed from the driver is drawn on the road surface is arranged. The drawing image 35a is associated with a blinking state of a left turn lamp, and the drawing image 35b is associated with a blinking state of a right turn lamp. Although not illustrated, the drawing images 35a and 35b overlap a part of the low beam image 31 and are brighter than a region overlapping the drawing images 35a and 35b in the low beam image 31. Further, the priority of each layer in the drawing layer group 25 can be changed. The predetermined character may be a figure, a symbol, a letter, or the like, and the number of characters or the like is not particularly limited.

Next, the turn switch 150 of the present embodiment illustrated in FIG. 46 is a switch that selects the blinking states of the left and right turn lamps included in the vehicle 100, and is a switch that selects blinking of the left turn lamp, blinking of the right turn lamp, and non-lighting. The turn switch 150 outputs a signal indicating the selected state to the image generation unit 20 via an ECU 101 in a case where blinking of the left turn lamp or blinking of the right turn lamp is selected, and does not output a signal when non-lighting is selected.

Next, an operation of the vehicle headlight 1 of the present embodiment will be described. In the present embodiment, an image generation step S11 is different from the image generation step S11 of the first embodiment. Therefore, the image generation step S11 of the present embodiment will be described below.

In the image generation step S11 of the present embodiment, the image generation unit 20 selects at least one image to be arranged in the layer based on signals input from a light switch 110, a detection device 120, and the turn switch 150 via the ECU 101. Then, based on the selected image, the image generation unit 20 generates an image representing a light distribution pattern including the reference light distribution pattern that is at least a part of the low beam light distribution pattern or at least a part of the high beam light distribution pattern, and outputs information of the image to a control unit CO. The image generation unit 20 repeats generation of such an image at predetermined time intervals. In a case where no signal is input from the light switch 110, the image generation unit 20 does not generate the image.

As an example of generation of an image by the image generation unit 20, first, a case where the image generation unit 20 generates an image representing a light distribution pattern including at least a part of the low beam light distribution pattern based on a signal from the turn switch 150 will be described. In this case, a signal indicating low beam emission is input to the image generation unit 20.

In a case where no signal is input from the turn switch 150, the image generation unit 20 selects the low beam image 31 and generates the low beam image 31. In the present embodiment, the image generation unit 20 generates the low beam image 31 by setting the opacity of the layer of the low beam image 31 to 100% and setting the opacity of all the other layers to 0%, and outputs information of the low beam image 31 to the control unit CO. Therefore, light having the low beam light distribution pattern is emitted from the vehicle headlight 1.

In the present embodiment, the low beam light distribution pattern formed when a signal from the turn switch 150 is input to the image generation unit 20 is the same as the low beam light distribution pattern illustrated in FIG. 7. That is, the low beam image 31 is an image representing such a low beam light distribution pattern PL1.

In addition, in a case where a signal indicating blinking of one of the left and right turn lamps is input in a state where the previously generated image is the low beam image 31, the image generation unit 20 selects the low beam image 31 and a drawing image associated with the blinking state indicated by the signal from the turn switch 150. Then, the image generation unit 20 of the present embodiment generates an image in which the selected drawing image is superimposed on the low beam image 31 by superimposing the selected drawing image on a part of the low beam image 31 and fades in the selected drawing image, and an image in the middle of change. In the present embodiment, the image generation unit 20 sequentially generates images by gradually increasing the opacity of the layer of the selected drawing image to 100% in a state where the opacity of the layer of the low beam image 31 is 100% and the opacity of all the other layers is 0%. The image in which the selected drawing image is superimposed on the low beam image 31 is an image generated in a state where the opacity of the layer of the drawing image is 100%, and an image generated in a state where the opacity is other than 100% is an image in the middle of change. The number of images in the middle of change may be one. In addition, a change period is, for example, 1.0 s, and a time interval at which a plurality of images are generated is, for example, 0.01 s, but the change period and the time interval are not particularly limited.

The image generation unit 20 outputs information of the generated images to the control unit CO. Therefore, the image formed by the light source unit 12 sequentially changes from the low beam image 31 to an image in which the drawing image 35a or the drawing image 35b is superimposed on the low beam image 31. Therefore, the light distribution pattern of the light emitted from the vehicle headlight 1 gradually changes from the low beam light distribution pattern PL1 to a light distribution pattern in which the drawing light distribution pattern is added to the low beam light distribution pattern PL1. Therefore, with the vehicle headlight 1 of the present embodiment, it is possible to draw the predetermined character on the road surface while emitting a low beam, and it is possible to make the change of the light distribution pattern look smooth, and it is possible to suppress the driver from feeling uncomfortable for the change of the light distribution pattern. The image generation unit 20 may generate only an image in which the drawing image is superimposed on the low beam image 31 without generating the image in the middle of change. With such a configuration, an operation load of the image generation unit 20 can be reduced.

In addition, in a case where no signal is input from the turn switch 150 in a state where the previously generated image is an image in which the drawing image is superimposed on the low beam image 31, the image generation unit 20 fades out the drawing image from the previously generated image in such a way that the previously generated image becomes the low beam image 31, and generates an image in the middle of change together with the low beam image 31. In the present embodiment, the image generation unit 20 sequentially generates images by gradually decreasing the opacity of the layer of the drawing image to 0% in a state where the opacity of the layer of the low beam image 31 and the opacity of the layer of the drawing image in the previous image are 100% and the opacity of all the other layers is 0%. The low beam image 31 is an image generated in a state where the opacity of the layer of the drawing image is 0%, and an image generated in a state where the opacity is other than 0% is an image in the middle of change. There may be one image in the middle of change generated by the image generation unit 20. In addition, a change period and a time interval at which images are generated in this case are the same as those in a case of the blinking of the turn lamp, but are not particularly limited.

The image generation unit 20 outputs information of the generated images to the control unit CO. Therefore, the image formed by the light source unit 12 sequentially changes from an image obtained by adding the drawing image to the low beam image 31 to the low beam image 31. Therefore, the light distribution pattern of the light emitted from the vehicle headlight 1 gradually changes from the light distribution pattern in which the drawing light distribution pattern is added to the low beam light distribution pattern PL1 to the low beam light distribution pattern PL1. Therefore, the change of the light distribution pattern can be made look smooth. The image generation unit 20 may generate only the low beam image 31 without generating the image in the middle of change. With such a configuration, an operation load of the image generation unit 20 can be reduced.

Figure 49:
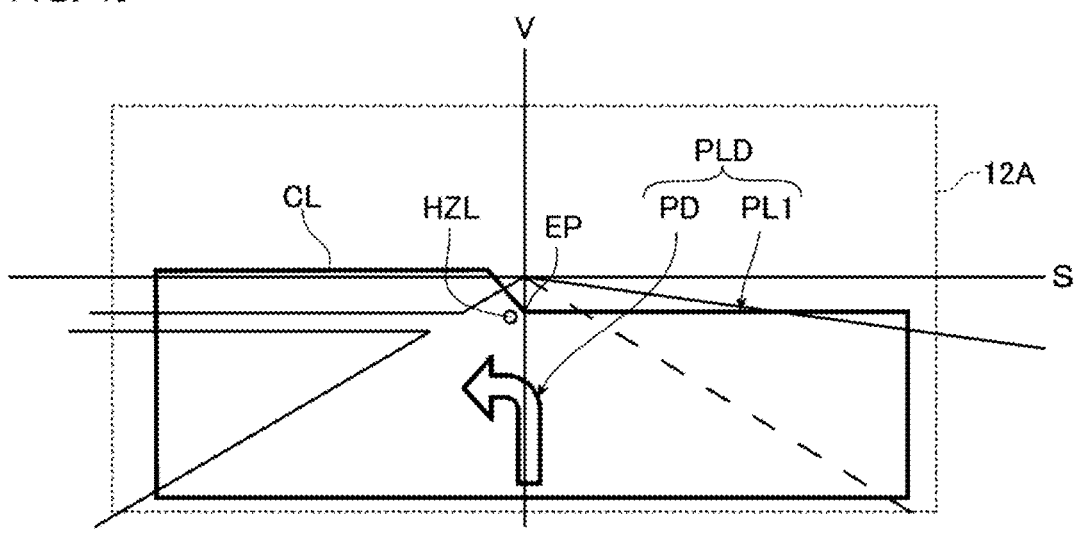
FIG. 49 is a view illustrating an example of a light distribution pattern in which a drawing light distribution pattern is added to a low beam light distribution pattern in the seventh embodiment similarly to FIG. 7.

FIG. 49 is a view illustrating an example of the light distribution pattern in which the drawing light distribution pattern is added to the low beam light distribution pattern PL1 in the present embodiment similarly to FIG. 7, and illustrates an example of a light distribution pattern in a case where a signal indicating blinking of the left turn lamp is input to the image generation unit 20. As illustrated in FIG. 49, when the left turn lamp blinks, a drawing light distribution pattern PD for drawing an arrow bent leftward is added to the low beam light distribution pattern PL1. Although not illustrated, when the right turn lamp blinks, a drawing light distribution pattern for drawing an arrow bent rightward is added to the low beam light distribution pattern PL1. As a result, it is possible to make surrounding people easily recognize a turning direction of the vehicle 100 with the drawing on the road surface. In addition, when the drawing light distribution pattern PD fades in on the low beam light distribution pattern PL1, the low beam light distribution pattern PL1 becomes a light distribution pattern PLD in which the drawing light distribution pattern PD is added to the low beam light distribution pattern PL1. In addition, when the drawing light distribution pattern PD fades out from the light distribution pattern PLD, the light distribution pattern PL1 becomes the low beam light distribution pattern PL1.

Next, a case where the image generation unit 20 generates an image representing a light distribution pattern including at least a part of the high beam light distribution pattern based on signals from the detection device 120 and the turn switch 150 will be described. In this case, a signal indicating high beam emission is input to the image generation unit 20.

First, a case where a signal from the turn switch 150 and a signal indicating information of a predetermined target object from the detection device 120 are not input to the image generation unit 20 will be described. In this case, the image generation unit 20 generates a reference high beam image in which the low beam image 31 is superimposed on a part of the additional light distribution image 32. Therefore, it can be understood that the reference high beam image is stored in the memory ME while being separated into the low beam image 31 as a predetermined image and the additional light distribution image 32 as a specific image superimposed on a part of the low beam image 31 to form the reference high beam image. In the present embodiment, the image generation unit 20 generates the reference high beam image by setting the opacity of the layers of the additional light distribution image 32 and the low beam image 31 to 100% and setting the opacity of all the other layers to 0%, and outputs information of the reference high beam image to the control unit CO. Therefore, light having the high beam light distribution pattern is emitted from the vehicle headlight 1.

Figure 50:
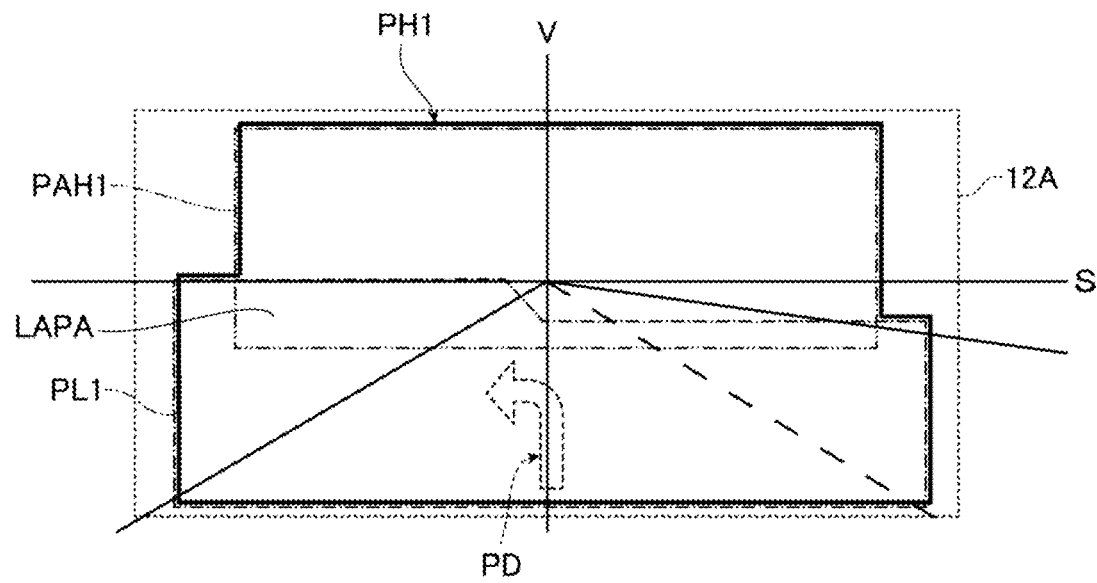
FIG. 50 is a view illustrating an example of a high beam light distribution pattern in the seventh embodiment similarly to FIG. 49.

FIG. 50 is a view illustrating an example of the high beam light distribution pattern in the present embodiment similarly to FIG. 49. As described above, a high beam light distribution pattern PH1 illustrated in FIG. 50 is formed by light based on the reference high beam image in which the low beam image 31 is superimposed on a part of the additional light distribution image 32. Therefore, it can be understood that the high beam light distribution pattern PH1 is formed by superimposing the low beam light distribution pattern PL1 and an additional light distribution pattern PAH1. In FIG. 50, the low beam light distribution pattern PL1 is indicated by a line with alternating long and short dashes, the additional light distribution pattern PAH1 is indicated by a line with alternating long and two short dashes, and the drawing light distribution pattern PD is indicated by a broken line. In addition, the additional light distribution pattern PAH1 and the low beam light distribution pattern PL1 are slightly shifted vertically and horizontally. A light distribution pattern of a region LAPA where the low beam light distribution pattern PL1 and the additional light distribution pattern PAH1 overlap each other in the high beam light distribution pattern PH1 is the light distribution pattern of the region LAPA in the low beam light distribution pattern PL1.

Next, a case where a signal from the turn switch 150 is not input, and a signal indicating information of the predetermined target object from the detection device 120 is input to the image generation unit 20 will be described.

In a case where the information of the predetermined target object is input in a state where the previously generated image is the reference high beam image, the image generation unit 20 generates an image in the middle of change together with an image representing a predetermined high beam light distribution pattern. The predetermined high beam light distribution pattern is a light distribution pattern obtained by changing the amount of light of a predetermined region in the high beam light distribution pattern PH1. The image generation unit 20 selects at least one of the plurality of additional images based on the information of the predetermined target object input from the detection device 120, and stores information indicating a layer of the selected additional image in the memory ME as information indicating a reference layer. The image generation unit 20 of the present embodiment generates an image by superimposing the selected additional image on a part of the additional light distribution image 32 as the reference image and fading in the selected additional image, and generates an image in the middle of change and an image of the predetermined high beam light distribution pattern by further superimposing the low beam image 31 on a part of each generated image. A brightness of a region overlapping the additional image in the additional light distribution image 32 changes from that before the additional image is superimposed. Therefore, the image in which the selected additional image is superimposed on a part of the additional light distribution image 32 is an image representing a predetermined additional light distribution pattern obtained by changing the amount of light of a part of the additional light distribution pattern PAH1. Furthermore, at least a part of each of the additional images does not overlap the low beam image 31. Therefore, at least a part of a region where the amount of light is changed in the additional light distribution pattern PAH1 does not overlap the low beam light distribution pattern PL1. Therefore, a predetermined high beam image is an image representing the predetermined high beam light distribution pattern obtained by changing the amount of light of a partial region in the high beam light distribution pattern PH1.

The image generation unit 20 selects at least one of the plurality of additional images in such a way as to obtain the predetermined high beam light distribution pattern obtained by changing the amount of light of a predetermined region overlapping the predetermined target object in the additional light distribution pattern PAH1 that is a part of the high beam light distribution pattern. In the present embodiment, the image generation unit 20 selects the slightly darkened image 33*a* in such a way as to decrease the amount of light in a first predetermined region overlapping a retroreflective object. Furthermore, the image generation unit 20 selects the brightened image 33*c* in such a way as to increase the amount of light of a second predetermined region overlapping a human, and selects the highly darkened image 33*b* in such a way as to decrease the amount of light of a third predetermined region overlapping another vehicle.

In the present embodiment, the image generation unit 20 sequentially generates images by gradually increasing the opacity of the layer of the selected additional image to 100% in a state where the opacity of the layers of the low beam image 31 and the additional light distribution image 32 is 100% and the opacity of all the other layers is 0%. That is, the image generation unit 20 simultaneously performs processing of superimposing the selected additional image on a part of the additional light distribution image 32 and fading in the selected additional image and processing of further superimposing the low beam image 31 on a part of the generated image. The predetermined high beam image is an image generated in a state where the opacity of the selected additional image is 100%, and an image generated in a state where the opacity is other than 100% is an image in the middle of change. The number of images in the middle of change may be one. In addition, a change period and a time interval at which images are generated in this case are the same as those in a case of the blinking of the turn lamp, but are not particularly limited.

The image generation unit 20 outputs a plurality of generated images to the control unit CO. Therefore, the image formed by the light source unit 12 sequentially changes from the reference high beam image to the predetermined high beam image. Therefore, the light distribution pattern of the light emitted from the vehicle headlight 1 gradually changes from the high beam light distribution pattern PH1 to the predetermined high beam light distribution pattern obtained by changing the amount of light of the predetermined region in the high beam light distribution pattern PH1. Therefore, the change of the light distribution pattern can be made look smooth. The image generation unit 20 may generate only an image representing the predetermined high beam light distribution pattern without generating the image in the middle of change. With such a configuration, an operation load of the image generation unit 20 can be reduced.

Figure 51:
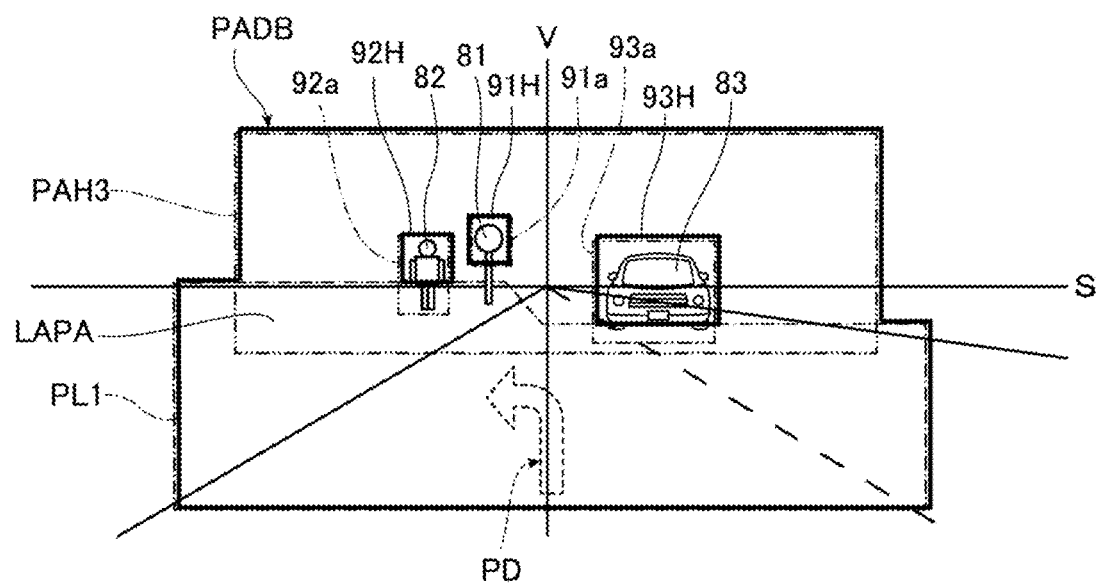
FIG. 51 is a view illustrating another example of the high beam light distribution pattern in the seventh embodiment similarly to FIG. 50.

FIG. 51 is a view illustrating another example of the high beam light distribution pattern in the present embodiment similarly to FIG. 50, and is a view illustrating the predetermined high beam light distribution pattern when a retroreflective object 81, a human 82, and another vehicle 83 are detected by the detection device 120. In FIG. 51, the retroreflective object 81 is a road sign, the another vehicle 83 is an oncoming vehicle, the low beam light distribution pattern PL1 is indicated by a line with alternating long and short dashes, a predetermined additional light distribution pattern PAH3 is indicated by a line with alternating long and two short dashes, and the drawing light distribution pattern PD is indicated by a broken line. The predetermined additional light distribution pattern PAH3 is a light distribution pattern formed by an image in which the selected additional image is superimposed on a part of the additional light distribution image 32. In the predetermined additional light distribution pattern PAH3, the amount of light of a first predetermined region 91*a* overlapping the retroreflective object 81 is smaller than the amount of light of the first predetermined region 91*a* in the additional light distribution pattern PAH1. At least a part of the first predetermined region 91*a* does not overlap the low beam light distribution pattern PL1. Therefore, in a predetermined high beam light distribution pattern PADB, the amount of light of a first region 91H that is a region not overlapping the low beam light distribution pattern PL1 in the first predetermined region 91*a* is smaller than the amount of light of the first region 91H in the high beam light distribution pattern PH1. The first region 91H overlaps the retroreflective object 81. Therefore, with the vehicle headlight 1 of the present embodiment, it is possible to decrease the amount of reflected light reflected by the retroreflective object 81 toward the vehicle 100 that is the host vehicle, to suppress glare to the driver due to the reflected light. In FIG. 51, the first region 91H is slightly shifted from the first predetermined region 91*a*. In the example illustrated in FIG. 51, a part of the first predetermined region 91*a* overlaps the low beam light distribution pattern PL1, and the first region 91H overlaps a part of the retroreflective object 81. However, from the viewpoint of suppressing glare to the driver, the first region 91H may overlap at least a part of the retroreflective object 81. For example, the low beam image 31, the additional light distribution image 32, and the slightly darkened image 33*a* may be adjusted in such a way that the first region 91H overlaps the entire retroreflective object 81.

In addition, the amount of light of a second predetermined region 92*a* overlapping the human 82 in the predetermined additional light distribution pattern PAH3 is larger than the amount of light of the second predetermined region 92*a* in the additional light distribution pattern PAH1. At least a part of the second predetermined region 92*a* does not overlap the low beam light distribution pattern PL1. Therefore, in the predetermined high beam light distribution pattern PADB, the amount of light of a second region 92H that is a region not overlapping the low beam light distribution pattern PL1 in the second predetermined region 92*a* is larger than the amount of light of the second region 92H in the high beam light distribution pattern PH1. The second region 92H overlaps the human 82. Therefore, with the vehicle headlight 1 of the present embodiment, the amount of light emitted to the human 82 can be increased to facilitate visual recognition of the human 82. In FIG. 51, the second region 92H is slightly shifted from the second predetermined region 92*a*. In the example of FIG. 51, the second predetermined region 92*a* does not overlap the low beam light distribution pattern PL1, and the second region 92H overlaps the entire human 82. However, from the viewpoint of easily visually recognizing the human 82, the second region 92H may overlap at least a part of the human 82. For example, the low beam image 31, the additional light distribution image 32, and the brightened image 33*c* may be adjusted in such a way that the second region 92H overlaps the entire human 82.

In addition, the amount of light of a third predetermined region 93a overlapping the another vehicle 83 in the predetermined additional light distribution pattern PAH3 is smaller than the amount of light of the third predetermined region 93a in the additional light distribution pattern PAH1 and smaller than the amount of light of the first predetermined region 91a in the predetermined additional light distribution pattern PAH3. At least a part of the third predetermined region 93a does not overlap the low beam light distribution pattern PL1. Therefore, in the predetermined high beam light distribution pattern PADB, the amount of light of a third region 93H that is a region not overlapping the low beam light distribution pattern PL1 in the third predetermined region 93a is smaller than the amount of light of the third region 93H in the high beam light distribution pattern PH1. The amount of light of the third region 93H is smaller than the amount of light of the first region 91H in the predetermined high beam light distribution pattern PADB. The third region 93H overlaps the another vehicle 83. Therefore, with the vehicle headlight 1 of the present embodiment, it is possible to further suppress glare to the driver of the another vehicle 83 and to further suppress deterioration in visibility of the retroreflective object 81 as compared with a case where the amount of light of the third region 93H in the predetermined high beam light distribution pattern PADB is the same as the amount of light of the first region 91H in the predetermined high beam light distribution pattern PADB. In FIG. 51, the third region 93H is slightly shifted from the third predetermined region 93a. In the example illustrated in FIG. 51, a part of the third predetermined region 93a overlaps the low beam light distribution pattern PL1, and the third region 93H overlaps a part of the another vehicle 83. However, it is sufficient if the third region 93H overlaps at least a part of a visual recognition portion for the driver of the another vehicle 83 to visually recognize the outside of the vehicle from the viewpoint of suppressing glare to the driver of the another vehicle 83. For example, the low beam image 31, the additional light distribution image 32, and the highly darkened image 33b may be adjusted in such a way that the third region 93H overlaps the entire another vehicle 83. The visual recognition portion is, for example, a front window in a case where the another vehicle 83 is an oncoming vehicle, and is, for example, a side mirror, a rear window, an imaging device that images an area behind the vehicle, or the like in a case where the another vehicle 83 is a preceding vehicle.

Here, in a case where at least one of the reference layers stored in the memory ME is different from at least one of the layers of the selected additional images due to a change in input information of the predetermined target object, the image generation unit 20 generates an image as follows. The image generation unit 20 generates another predetermined high beam image based on the selected additional image as an image representing a light distribution pattern after the change, and generates an image in the middle of the change. The image generation unit 20 generates an image by superimposing the another predetermined high beam image on at least a part of the predetermined high beam image that is an image before the change and fading in the another predetermined high beam image, and fading out the predetermined high beam image. In the predetermined high beam image that is the image before the change and the another predetermined high beam image that is the image after the change, portions different from each other are at least a part of a portion where the selected additional image is positioned, and the other portions are the same. Therefore, in the present embodiment, the image generation unit 20 gradually increases the opacity of the additional image added when generating the another predetermined high beam image to 100% in a state where each layer has an opacity for generating the predetermined high beam image. In addition, the image generation unit 20 gradually decreases the opacity of the additional image that is not selected when the another predetermined high beam image is generated to 0%. The image generation unit 20 sequentially generates images by gradually changing the opacity in this manner. The another predetermined high beam image is generated in a state where the layer of the additional image to be added has an opacity of 100% and the layer of the additional image that is not selected has an opacity of 0%. In addition, an image generated in a state where the opacity of the layer of the additional image to be added is other than 100% or the opacity of the layer of the additional image that is not selected is other than 0% is an image in the middle of change. The opacity is changed in such a way that the total value of the gradually increased opacity and the gradually decreased opacity is 100, but the total value does not have to be 100, and there may be one image in the middle of change generated by the image generation unit 20. In addition, a change period and a time interval at which images are generated in this case are the same as those in a case of the blinking of the turn lamp, but are not particularly limited.

The image generation unit 20 rewrites the reference layer stored in the memory ME with the layer of the additional image selected when the another predetermined high beam image is generated, and outputs information of a plurality of generated images to the control unit CO. Therefore, the image formed by the light source unit 12 sequentially changes from the predetermined high beam image to the another predetermined high beam image. Therefore, the light distribution pattern of the light emitted from the vehicle headlight 1 gradually changes from the predetermined high beam light distribution pattern to the another predetermined high beam light distribution pattern. Therefore, the change of the light distribution pattern can be made look smooth. The image generation unit 20 may generate only the another predetermined high beam image based on the selected additional image without generating the image in the middle of change, and output information of the generated image to the control unit CO. With such a configuration, an operation load of the image generation unit 20 can be reduced.

In addition, in a case where the information is not input from the detection device 120 in a state where the information of the predetermined target object is input from the detection device 120 at the time of generating the previous image, the image generation unit 20 generates the image in the middle of change together with the reference high beam image representing the high beam light distribution pattern PH1. The image generation unit 20 generates a plurality of images by superimposing the additional image selected at the time of generating the predetermined high beam image representing the previously generated predetermined high beam light distribution pattern on a part of the additional light distribution image 32 as the reference image and fading out the additional image. Then, the image generation unit 20 generates the image in the middle of change and the reference high beam image by further superimposing the low beam image 31 on a part of each of the generated images. Specifically, the image generation unit 20 sequentially generates images by gradually decreasing the opacity of the layer of the additional image selected at the time of generating the previous image to 0% in a state where each layer has an opacity for generating the previous image. Such an image generation unit 20 simultaneously performs processing of superimposing the selected additional image on a part of the additional light distribution image 32 and fading out the selected additional image and processing of further superimposing the low beam image 31 on a part of the generated image. The reference high beam image is generated in a state where the opacity of the layer of the selected additional image is 0%, and an image generated in a state where the opacity is other than 0% is an image in the middle of change. There may be one image in the middle of change generated by the image generation unit 20. In addition, a change period and a time interval at which images are generated in this case are the same as those in a case of the blinking of the turn lamp, but are not particularly limited.

The image generation unit 20 deletes the reference layer stored in the memory ME and outputs the plurality of generated images to the control unit CO. Therefore, the image formed by the light source unit 12 sequentially changes from the predetermined high beam image to the reference high beam image. Therefore, the light distribution pattern of the light emitted from the vehicle headlight 1 gradually changes from the predetermined high beam light distribution pattern obtained by changing the amount of light of the predetermined region in the high beam light distribution pattern PH1 to the high beam light distribution pattern PH1. Therefore, the change of the light distribution pattern can be made look smooth. The image generation unit 20 may generate only the reference high beam image representing the high beam light distribution pattern PH1 without generating the image in the middle of change, and output information of the generated image to the control unit CO. With such a configuration, an operation load of the image generation unit 20 can be reduced.

Next, a case where an input state of a signal from the turn switch 150 changes will be described. In this case, similarly to a case of the low beam, the image generation unit 20 of the present embodiment generates a plurality of images by fading in the selected drawing image on the previously generated image or fading out the drawing image from the previously generated image, and outputs information of the images to the control unit CO. Therefore, the light distribution pattern of the light emitted from the vehicle headlight 1 gradually changes from the high beam light distribution pattern PH1 or the predetermined high beam light distribution pattern to a light distribution pattern in which the drawing light distribution pattern is added.

Alternatively, the light distribution pattern of the light emitted from the vehicle headlight 1 gradually changes from a light distribution pattern in which the drawing light distribution pattern is added to the high beam light distribution pattern PH1 to the high beam light distribution pattern PH1, or from a light distribution pattern in which the drawing light distribution pattern is added to the predetermined high beam light distribution pattern to the predetermined high beam light distribution pattern. Therefore, with the vehicle headlight 1 of the present embodiment, it is possible to draw the predetermined character on the road surface while emitting the high beam, and to make the change of the light distribution pattern look smooth.

As described above, in a case where light emitted from the vehicle headlight included in the host vehicle is emitted to a retroreflective object such as a sign, a part of the light may be reflected toward the host vehicle as glare for the driver of the host vehicle. In addition, in a case where the amount of light emitted from the vehicle headlight and emitted to a human such as a pedestrian is small, it may be difficult for the driver to visually recognize the human. As described above, it may be difficult to perform driving, and there is a demand for controlling a light distribution in such a way as to facilitate driving. In response to such a demand, for example, in the vehicle headlight described in Patent Literature 1 described above, it is conceivable to change a light distribution pattern of emitted light to a light distribution pattern obtained by changing a brightness of a predetermined region overlapping the retroreflective object or the human in the light distribution pattern. The predetermined region is determined for each of the retroreflective object and the human, and the number of light distribution patterns changed according to the retroreflective object and the human is, for example, the number of combinations of target objects in a target object group including a plurality of retroreflective objects and humans at different positions. For this reason, it is necessary to store information regarding the amount of light emitted from each micro LED for each of such a large number of light distribution patterns in a memory, and the amount of information stored in the memory increases.

Therefore, in the present embodiment as the eighth aspect, the memory ME stores the additional light distribution image 32 as the reference image for forming the additional light distribution pattern PAH1 as the reference light distribution pattern by the light emitted from the light source unit 12, and a plurality of additional images superimposed on a part of the additional light distribution image 32. Each of the plurality of additional images is one of the plurality of slightly darkened images 33*a* and 33*b* and the plurality of brightened images 33*c*. The image generation unit 20 selects at least one of the plurality of additional images based on the information from detection device 120 that detects the predetermined target object. In addition, the image generation unit 20 superimposes the selected additional image on a part of the additional light distribution image 32 to generate an image for forming the predetermined additional light distribution pattern PAH3 obtained by changing the amounts of light of the predetermined regions 91*a*, 92*a*, and 93*a* overlapping the predetermined target object in the additional light distribution pattern PAH1 by the light emitted from the light source unit 12.

Therefore, as described above, the vehicle headlight 1 of the present embodiment as the eighth aspect can control the light distribution of the emitted light according to a situation in front of the vehicle 100, and for example, can increase the amount of light emitted to the human 82 as the predetermined target object detected by the detection device 120. Therefore, the vehicle headlight 1 of the present embodiment as the eighth aspect can facilitate visual recognition of the human 82 as compared with a case where the amount of light emitted to the human 82 does not change. In addition, the vehicle headlight 1 of the present embodiment as the eighth aspect can decrease the amount of light emitted to the retroreflective object 81 as the predetermined target object. Therefore, in the vehicle headlight 1 of the present embodiment as the eighth aspect, the amount of light reflected by the retroreflective object 81 toward the host vehicle is decreased as compared with a case where the amount of light emitted to the retroreflective object 81 does not change, and it is thus possible to suppress glare to the driver of the host vehicle due to the reflected light. In addition, in the vehicle headlight 1 of the present embodiment as the eighth aspect, the image generation unit 20 generates an image representing the predetermined additional light distribution pattern PAH3 by superimposing an additional image selected from among the plurality of additional images on a part of the additional light distribution image 32. Therefore, the number of generatable images representing the predetermined additional light distribution pattern PAH3 is the number of combinations of images in an image group including the plurality of darkened images 33a and 33b and the plurality of brightened images 33c. However, the information stored in the memory is the images of the image group and the reference image. Therefore, with the vehicle headlight 1 of the present embodiment as the eighth aspect, it is possible to further suppress an increase in amount of information stored in the memory ME as compared with a case of storing all the images representing the predetermined light distribution pattern that can be generated by the image generation unit 20 in the memory ME.

Furthermore, in the vehicle headlight 1 of the present embodiment as the eighth aspect, the plurality of darkened images include the slightly darkened image 33a including the first image element fe and the highly darkened image 33b including the second image element se darker than the first image element fe. Therefore, the vehicle headlight 1 of the present embodiment as the eighth aspect can decrease the amount of light to be emitted to a different amount according to the target object detected by the detection device 120. Then, as described above, in the vehicle headlight 1 of the present embodiment as the eighth aspect, the amount of light emitted to the retroreflective object 81 detected by the detection device 120 can be made larger than the amount of light emitted to the another vehicle 83 detected by the detection device 120. Therefore, the vehicle headlight 1 according to the present embodiment as the eighth aspect can further suppress deterioration in visibility of the retroreflective object 81 while suppressing glare to the driver of the another vehicle 83, as compared with a case where the amount of light emitted to the retroreflective object 81 is decreased to the same amount as the amount of light emitted to the another vehicle 83. From the viewpoint of suppressing glare to the driver of the another vehicle 83, the brightness of the highly darkened image 33b is preferably 0. Furthermore, the brightness of the plurality of darkened images may be the predetermined same brightness. In addition, from the viewpoint of changing the brightness of the light to be emitted according to the target object, it is sufficient if the slightly darkened image 33a includes the first image element fe and the highly darkened image 33b includes the second image element se. For example, the slightly darkened image 33a and the highly darkened image 33b may include the first image element fe and the second image element se.

In the vehicle headlight 1 according to the present embodiment as the eighth aspect, the image generation unit 20 generates an image by superimposing the selected additional image on a part of the additional light distribution image 32, and generates an image by further superimposing the low beam image 31 on a part of the generated image. Therefore, in the generated image, a region overlapping the additional image and the low beam image 31 is the region in the low beam image 31. Therefore, for example, even in a case where the additional image is set without considering whether or not the additional image overlaps the low beam image 31, it is possible to prevent a region overlapping the low beam light distribution pattern in the high beam light distribution pattern from being changed depending on the detected predetermined target object.

Eighth Embodiment

Next, an eighth embodiment as an eighth aspect of the present invention will be described in detail. The same or equivalent constituent elements as those of the seventh embodiment are denoted by the same reference numerals and an overlapping description will be omitted unless otherwise specified. A lamp portion of the present embodiment is mainly different from the lamp portion 5 of the seventh embodiment in that the lamp portion includes a lamp unit 10 and another lamp unit. In the present embodiment, the lamp unit 10 and the another lamp unit are housed in a housing space in a casing 16 side by side in the horizontal direction.

Another lamp unit 70 in the present embodiment has a configuration similar to that of the another lamp unit illustrated in FIG. 13, and includes a light source unit 72 and a projection lens 15.

In the present embodiment, the another lamp unit 70 emits light that becomes a low beam light distribution pattern having substantially the same cutoff line CL as the cutoff line CL in the low beam light distribution pattern PL1 of the seventh embodiment. That is, a shape of an upper end of a light shielding portion 76 is adjusted in such a way that the light distribution pattern of the emitted light becomes such a low beam light distribution pattern.

An image generation unit 20 in the lamp unit 10 of the present embodiment has the same configuration as the image generation unit 20 of the seventh embodiment except that a low beam layer group 21 and a drawing layer group 25 are not included. Then, the lamp unit 10 emits light that becomes an additional light distribution pattern added to the low beam light distribution pattern formed by light emitted from the another lamp unit 70 to form a high beam light distribution pattern. A part of the additional light distribution pattern overlaps a part of the low beam light distribution pattern formed by the another lamp unit 70. As described above, a region where the additional light distribution pattern and the low beam light distribution pattern overlap each other is substantially the same as the region LAPA in the seventh embodiment.

Similarly to the seventh embodiment, the image generation unit 20 of the present embodiment selects at least one of a plurality of additional images based on information of a predetermined target object input from a detection device 120. Then, the image generation unit 20 generates an image by superimposing the selected additional image on a part of an additional light distribution image 32 as a reference image and fading in the selected additional image, and outputs information of the generated image to the control unit CO. Therefore, similarly to the seventh embodiment, the light distribution pattern of the emitted light changes according to the information of the predetermined target object input from the detection device 120, and becomes a predetermined additional light distribution pattern PAH3 obtained by changing the amount of light of a partial region in an additional light distribution pattern PAH1.

With a vehicle headlight 1 of the present embodiment, similarly to the vehicle headlight 1 of the seventh embodiment, a light distribution of emitted light can be controlled to increase the amount of light emitted to a human 82 or decrease the amount of light emitted to a retroreflective object 81. In addition, with the vehicle headlight 1 of the present embodiment, similarly to the vehicle headlight 1 of the seventh embodiment, it is possible to suppress an increase in amount of information stored in a memory ME.

Although the eighth aspect of the present invention has been described by taking the seventh and eighth embodiments as an example, the eighth aspect of the present invention is not limited thereto.

For example, in the seventh embodiment, the memory ME in which the additional light distribution image 32 representing the additional light distribution pattern is stored as the reference image on which the additional image is superimposed has been described as an example. However, as the eighth aspect, it is sufficient if the reference image is an image representing a light distribution pattern including at least a part of the low beam light distribution pattern or at least a part of the high beam light distribution pattern. For example, the reference image may be the low beam image 31, and in this case, the additional image and the drawing image may overlap a part of the low beam image 31, and the additional image and the drawing image may overlap each other. Further, the reference image may be a reference high beam image in which the low beam image 31 is superimposed on the additional light distribution image 32. In this case, the additional image and the drawing image may be superimposed on a part of the reference high beam image, and the additional image and the drawing image may be superimposed on each other.

In the seventh and eighth embodiments, the image generation unit 20 that generates an image by superimposing the selected additional image on a part of the additional light distribution image 32 and generates an image by further superimposing the low beam image 31 on a part of the generated image has been described as an example. However, as the eighth aspect, the image generation unit 20 may generate an image by superimposing the selected additional image on a part of the additional light distribution image 32, and generate an image by further superimposing the generated image on a part of the low beam image 31. Examples of such a configuration include a configuration in which the priority of the low beam layer group 21 is lower than that of the additional light distribution layer group 22. In the seventh embodiment, the image generation unit 20 that superimposes the drawing image according to a signal from the turn switch 150 has been described as an example. However, as the eighth aspect, a timing of superimposing the drawing images is not particularly limited.

Furthermore, in the seventh and eighth embodiments, the image generation unit 20 that generates an image using each layer whose opacity is adjustable has been described as an example. However, as the eighth aspect, an image generation method of the image generation unit 20 is not particularly limited, and an image may be generated by a method not using the layer. In this case, for example, pixels included in an image excluding the darkened images 33*a* and 33*b* for reducing the brightness by superimposition are set as pixels for which the same grayscale value is set and the opacity is adjusted to express the grayscale level. Furthermore, pixels included in the darkened images 33*a* and 33*b* are set as pixels for which the grayscale value is set to 0 and the opacity is adjusted to express the grayscale level. In a case where images other than the darkened images 33*a* and 33*b* are superimposed, the opacity of the pixels in the overlapping region is calculated by weighted addition of the opacities of the pixels of the respective images. In a case where the darkened images 33*a* and 33*b* and the images other than the darkened images 33*a* and 33*b* are superimposed, the opacity of the pixels in the overlapping region is calculated by weighted averaging of the opacities of the pixels of the respective images. In a case where an image is generated using a method in which data such as the opacity of the pixels included the image can be individually changed as described above, the image generation unit 20 may perform interlace processing in a case where an image is generated by superimposing the selected additional image on a part of the reference image and fading in or fading out the selected additional image. With such a configuration, an operation load of the image generation unit 20 can be reduced.

Furthermore, in a case where the darkened images are superimposed, for example, the opacity of the pixels in the overlapping region may be calculated by weighted averaging of the opacities of the pixels of the respective darkened images. Alternatively, in a case where the darkened images are superimposed, the pixels in the overlapping region may be the pixels in the overlapping region in any one of the superimposed darkened images. In the latter case, it is possible to suppress formation of a region darker than intended in the additional light distribution pattern PAH1.

In the seventh and eighth embodiments, the image generation unit 20 that changes an image to be generated according to a change of the information of the predetermined target object input from the detection device 120 has been described as an example. However, as the eighth aspect, the image generation unit 20 may change an image to be generated even in a case where the information input from the detection device 120 does not change. For example, when the information of the predetermined target object is input from the detection device 120, the image generation unit 20 may alternately generate an image for forming a first light distribution pattern by light emitted from the light source unit 12 and an image for forming a second light distribution pattern by light emitted from the light source unit 12 at predetermined time intervals. The first light distribution pattern is the predetermined additional light distribution pattern PAH3 obtained by changing the amounts of light of the predetermined regions 91*a*, 92*a*, and 93*a* overlapping the predetermined target object in the additional light distribution pattern PAH1. The second light distribution pattern is a light distribution pattern obtained by changing the amounts of light of the predetermined regions 91*a*, 92*a*, and 93*a* in the predetermined additional light distribution pattern PAH3 that is the first light distribution pattern. That is, the image generation unit 20 changes the selected additional image from the additional image selected when generating an image representing the predetermined additional light distribution pattern PAH3 that is the first light distribution pattern in such a way that an image representing the second light distribution pattern is generated. Then, the image generation unit 20 generates an image representing the second light distribution pattern by superimposing the selected additional image on a part of the additional light distribution image 32 as the reference image. The amounts of light of the predetermined regions 91*a*, 92*a*, and 93*a* may increase or decrease as compared with those before the change. For example, examples of the second light distribution pattern can include a light distribution pattern obtained by changing the amount of light of the entire second predetermined region 92*a* in the predetermined additional light distribution pattern PAH3 that is the first light distribution pattern illustrated in FIG. 51. With such a configuration, the amount of light emitted to the human 82 as the target object can be periodically changed according to the lapse of time. Therefore, with the vehicle headlight 1 as the eighth aspect, it is possible to enhance an ability to alert the driver of the host vehicle to the presence of the human 82 as the target object and to enhance an ability to alert the human 82 to the presence of the vehicle 100. The target object for which the amount of light of the emitted light is periodically changed is not limited to the human 82. In addition, the second light distribution pattern may be a light distribution pattern obtained by returning the amounts of light of the predetermined regions 91*a*, 92*a*, and 93*a* in the first light distribution pattern to the amount of light of the additional light distribution pattern PAH1. In this case, for example, the image generation unit 20 generates an image by alternately changing the opacity of the additional image to 0% and 100% in a state where each layer has an opacity for generating the image of the first light distribution pattern. In this way, the image of the first light distribution pattern and the image of the second light distribution pattern are alternately generated. The second light distribution pattern may be a light distribution pattern obtained by setting the amounts of light of the predetermined regions 91a, 92a, and 93a in the first light distribution pattern to 0. For example, the second light distribution pattern may be a light distribution pattern obtained by setting the amount of light of the second predetermined region 92a in the predetermined additional light distribution pattern PAH3 that is the first light distribution pattern illustrated in FIGS. 51 to 0. With such a configuration, light emitted to the human 82 as the target object can blink. A time interval at which the image of the first light distribution pattern and the image of the second light distribution pattern are generated is not particularly limited, and is, for example, 0.1 s. In addition, the image generation unit 20 may store the generated image of the first light distribution pattern and the generated image of the second light distribution pattern in the memory ME, and alternately output the two images to the control unit Co during a predetermined period. In this case, for example, the image generation unit 20 generates a new image of the first light distribution pattern and a new image of the second light distribution pattern immediately after the lapse of the predetermined period, stores the generated two images in the memory ME, and alternately outputs the two images to the control unit CO during another predetermined period immediately after the lapse of the predetermined period. Then, the image generation unit 20 repeats generation of the image of the first light distribution pattern and the image of the second light distribution pattern and alternate output of the generated two images. With such a configuration, an operation load of the image generation unit 20 can be reduced. The predetermined period is, for example, 1.0 s, but is not particularly limited.

In addition, similarly to the first aspect, as the eighth aspect, the light source unit 12 may include a plurality of light emitting units capable of individually changing the amount of light to be emitted, and emits light based on the image generated by the image generation unit 20. For example, the light source unit 12 may include a DMD including a plurality of reflective elements arranged in a matrix and a light irradiation unit that irradiates the DMD with light.

In addition, similarly to the first aspect, as the eighth aspect, at least one of the control unit CO, the image generation unit 20, or the memory ME may be shared by the pair of vehicle headlights 1. Furthermore, signals output from the detection device 120, the sensor, and the like included in the vehicle 100 may be input to the image generation unit 20 without passing through the ECU 101 of the vehicle 100. In addition, a vehicle including the vehicle headlight 1, the number of vehicle headlights 1 included in a vehicle, and the like are not particularly limited. For example, in a case where the vehicle is a two-wheeled vehicle, the number of vehicle headlights 1 may be one.

In the eighth embodiment, the another lamp unit 70 including the light source unit 72 that includes the light emitting element 73, the circuit board 74, and the shade 75, and the projection lens 15 has been described as an example. However, it is sufficient if a light distribution pattern including the low beam light distribution pattern or the high beam light distribution pattern can be formed by the light emitted from the another lamp unit 70 and the light emitted from the lamp unit 10, and a configuration of the another lamp unit 70 is not particularly limited. In addition, a light distribution pattern formed by light emitted from the lamp unit 10 and a light distribution pattern formed by light emitted from the another lamp unit 70 do not have to overlap each other. In this case, a part of an outer edge of one light distribution pattern is in contact with a part of an outer edge of the other light distribution pattern.

Ninth Embodiment

Next, a ninth embodiment as a ninth aspect will be described. The same or equivalent constituent elements as those of the first embodiment are denoted by the same reference numerals and an overlapping description will be omitted unless otherwise specified.

A vehicle 100 in the present embodiment is mainly different from the vehicle 100 in the first embodiment in that a signal from a steering sensor 130 and a signal from a vehicle speed sensor 140 are not input to an image generation unit 20. Therefore, the present embodiment will be described with reference to FIG. 1.

A memory of the present embodiment stores ME information of a plurality of images including a reference image, a plurality of spot irradiation images, and a plurality of darkened images and the like used when the image generation unit 20 generates an image. The reference image is an image for forming a reference light distribution pattern that is at least a part of a low beam light distribution pattern by light emitted from a light source unit 12. In the present embodiment, a reference light distribution pattern is the low beam light distribution pattern, and the reference image is a low beam image for forming the low beam light distribution pattern by the light emitted from the light source unit 12. The plurality of spot irradiation images are images for forming different spot light distribution patterns by the light emitted from the light source unit 12, and at least some of the spot light distribution patterns do not overlap the low beam light distribution pattern. The plurality of darkened images are images having a predetermined brightness and at least partially overlapping the reference image. The plurality of darkened images do not have to be stored in the memory ME. The plurality of images stored in the memory ME in the present embodiment are grayscale images in which data of each pixel in each image is a grayscale value, and a pixel having a larger grayscale value is brighter. However, the data of each pixel is not particularly limited. Furthermore, these pieces of information may be read from a memory outside the vehicle via a wireless communication device included in the vehicle 100.

The image generation unit 20 of the present embodiment generates an image by combining the plurality of images stored in the memory ME according to a signal from a detection device 120 using a layer function, and outputs information of the image to a control unit CO.

Figure 52:
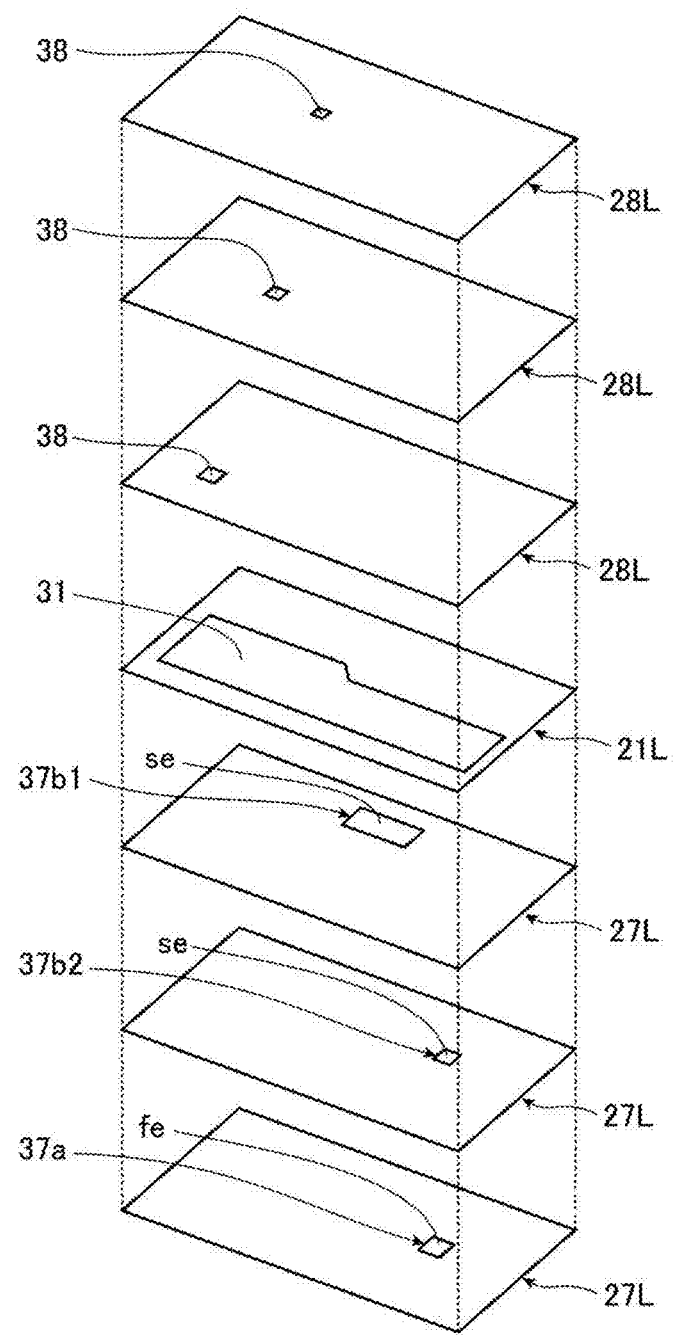
FIG. 52 is a view for describing a concept of a layer in an image generation unit of a ninth embodiment as a ninth aspect of the present invention.

FIG. 52 is a view for describing a concept of a layer in the image generation unit 20 of the present embodiment. As illustrated in FIG. 52, the image generation unit 20 of the present embodiment includes a low beam layer 21L, a plurality of spot irradiation image layers 27L, and a plurality of darkened image layers 28L. A priority is set for each layer, and in FIG. 52, a layer with a lower priority is illustrated in the lower side. The priority indicates the order of superimposition, and a layer having a higher priority is superimposed on a layer having a lower priority. In the present embodiment, the priorities of the layers 21L, 27L, and 28L are lower in the order of the darkened image layer 28L, the low beam layer 21L, and the spot irradiation image layer 27L. However, the priorities of the layers 21L, 27L, and 28L are not particularly limited, and may be changeable. Further, a variable opacity is set for each layer. In a case where the opacity is 100%, an image arranged in the corresponding layer is completely opaque. As the opacity decreases, the transparency of the image arranged in the corresponding layer increases. In a case where the opacity is 0%, the image arranged in the corresponding layer is completely transparent, and the image does not exist.

In the present embodiment, the image generation unit 20 reads a low beam image 31 as a reference image from the memory ME and arranges the low beam image 31 in the low beam layer 21L. The low beam image 31 of the present embodiment is an image of the low beam light distribution pattern having an elbow point. In the present embodiment, an upper right pixel in the image illustrated in FIG. 52 corresponds to a lower right light emitting element 13 illustrated in FIG. 3, and a lower left pixel in the image illustrated in FIG. 52 corresponds to an upper left light emitting element 13 illustrated in FIG. 3. That is, the correspondence relationship is vertically inverted. Therefore, the light distribution pattern of the light emitted to the front of the vehicle 100 is a light distribution pattern corresponding to the image illustrated in FIG. 52. Furthermore, pixels of images in the following drawings correspond to the light emitting elements 13, similarly to the image illustrated in FIG. 52.

In addition, the image generation unit 20 of the present embodiment reads the plurality of spot irradiation images from the memory ME, and arranges the plurality of spot irradiation images one by one in the different spot irradiation image layers 27L. In the present embodiment, the plurality of spot irradiation images include a plurality of first spot irradiation images 37a including a first image element fe and a plurality of second spot irradiation images 37b1 and 37b2 including a second image element se darker than the first image element fe. FIG. 52 illustrates three layers 27L in which one first spot irradiation image 37a and two second spot irradiation images 37b1 and 37b2 are arranged, and a description of the other layers 27L is omitted. In the present embodiment, the priority of the layer 27L in which the first spot irradiation image 37a is arranged is lower than the priorities of the layers 27L in which the second spot irradiation images 37b1 and 37b2 are arranged, but the priorities are not particularly limited, and may be changeable.

Furthermore, the image generation unit 20 of the present embodiment reads the plurality of darkened images from the memory ME and arranges the darkened images one by one in the different darkened image layers 28L. FIG. 52 illustrates three layers 28L in which three darkened images 38 are arranged, and a description of the other layers 28L is omitted.

Figure 53:
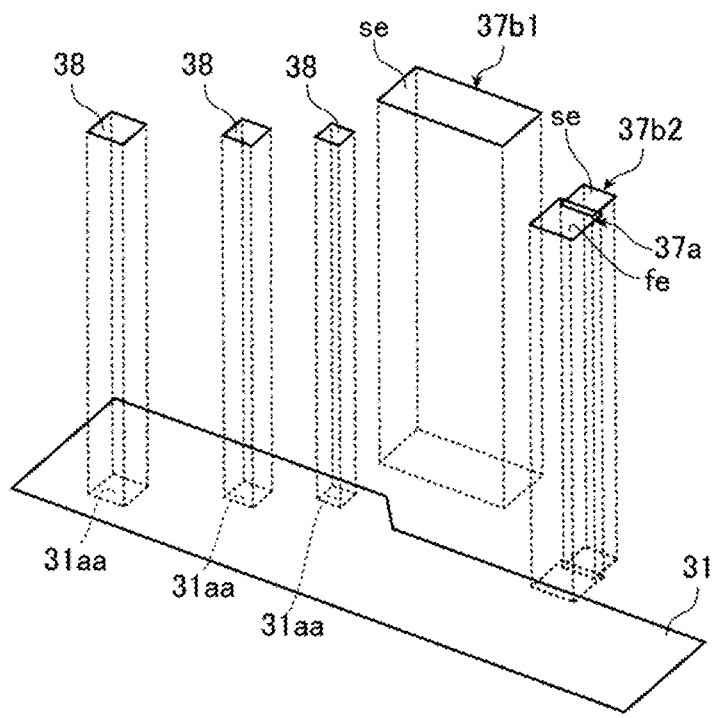
FIG. 53 is a view for describing a first spot irradiation image, a second spot irradiation image, and a darkened image.

FIG. 53 is a view for describing the first spot irradiation image 37a, the second spot irradiation images 37b1 and 37b2, and the darkened image 38. As illustrated in FIG. 53, at least some of the first spot irradiation image 37a and the second spot irradiation images 37b1 and 37b2, which are the spot irradiation images, do not overlap the low beam image 31. The two second spot irradiation images 37b1 and 37b2 illustrated in FIG. 53 do not overlap the low beam image 31. Further, a part of the first spot irradiation image 37a illustrated in FIG. 53 overlaps the low beam image 31, and the other part of the first spot irradiation image 37a overlaps a part of the second spot irradiation image 37b1. Although not illustrated, the first image elements fe included in the first spot irradiation images 37a are quadrangles having the same predetermined brightness, and have different positions, areas, aspect ratios, and the like. However, the brightness in the first image element fe does not have to be constant, and the shape of the first image element fe is not particularly limited. Furthermore, the first spot irradiation image 37a may include a plurality of first image elements fe separated from each other.

Furthermore, the second image elements se included in the second spot irradiation images 37b1 and 37b2 are quadrangles having the same predetermined brightness, and have different positions, areas, aspect ratios, and the like. However, the brightness in the second image element se does not have to be constant, and the shape of the second image element se is not particularly limited. Furthermore, the second spot irradiation images 37b1 and 37b2 may include a plurality of second image elements se separated from each other.

Furthermore, the darkened image 38 overlaps a region 31aa in the low beam image 31, and is darker than the region 31aa in the low beam image 31. Furthermore, at least some of the regions 31aa for the darkened images 38 are different from each other. FIG. 53 illustrates three darkened images 38 entirely overlapping the low beam image 31, and the regions 31aa do not overlap each other. In the present embodiment, the darkened images 38 each includes one quadrangular image element having the same predetermined brightness, and at least one of a position, an area, an aspect ratio, or the like is different between the image elements. The plurality of darkened images 38 are not particularly limited, the brightness of the image element included in the darkened image 38 does not have to be uniform, and a shape of the image element is not particularly limited. Furthermore, the darkened image 38 may include a plurality of image elements separated from each other, and the brightness of the darkened image 38 may be 0.

Next, an operation of the vehicle headlight 1 of the present embodiment will be described. In the present embodiment, an image generation step S11 is different from the image generation step S11 of the first embodiment. Therefore, the image generation step S11 of the present embodiment will be described below.

In the image generation step S11 of the present embodiment, the image generation unit 20 selects at least one image to be arranged in the layer based on a signal input from the detection device 120 via an ECU 101. Then, based on the selected image, the image generation unit 20 generates an image representing a light distribution pattern including the reference light distribution pattern that is at least a part of the low beam light distribution pattern, and outputs information of the image to the control unit CO. The image generation unit 20 repeats generation of such an image at predetermined time intervals.

As an example of generation of an image by the image generation unit 20, first, a case where no signal is input from the detection device 120 will be described. In this case, a predetermined target object positioned in front of the vehicle 100 is not detected by the detection device 120.

In a case where no signal is input from the detection device 120, the image generation unit 20 selects the low beam image 31 that is the reference image and generates the low beam image 31. In the present embodiment, the image generation unit 20 generates the low beam image 31 by setting the opacity of the low beam layer 21L on which the low beam image 31 is arranged to 100% and setting the opacity of all the other layers to 0%, and outputs information of the low beam image 31 to the control unit CO. Therefore, light having the low beam light distribution pattern as the reference light distribution pattern is emitted from the vehicle headlight 1.

Figure 54:
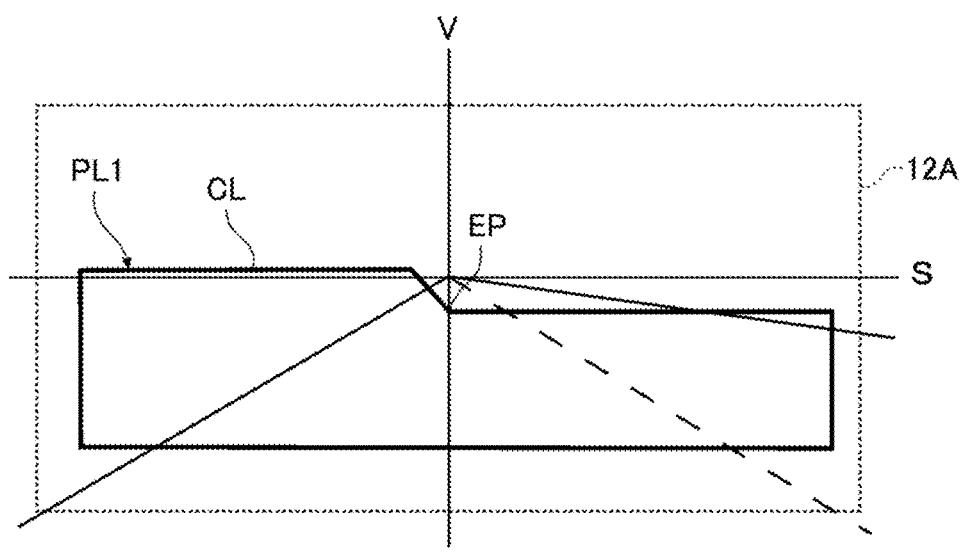
FIG. 54 is a view illustrating an example of a low beam light distribution pattern in the ninth embodiment similarly to FIG. 7.

FIG. 54 is a view illustrating an example of the low beam light distribution pattern in the present embodiment similarly to FIG. 7, and illustrates the low beam light distribution pattern formed when no signal is input from the detection device 120 to the image generation unit 20. A cutoff line CL in a low beam light distribution pattern PL1 of the present embodiment has an elbow point EP positioned below a horizontal line S and on or near a vertical line V, so that a step is formed.

Next, a case where a signal indicating information of the predetermined target object is input from the detection device 120 to the image generation unit 20 will be described.

In a case where the information of the predetermined target object of which at least a part does not overlap the low beam light distribution pattern PL1 is input in a state where the previously generated image is the low beam image 31, the image generation unit 20 of the present embodiment generates an image in the middle of change together with an image representing a first light distribution pattern. The first light distribution pattern is a light distribution pattern in which at least one spot light distribution pattern of which at least a part does not overlap the low beam light distribution pattern is added to the low beam light distribution pattern PL1 that is the reference light distribution pattern. The image generation unit 20 selects at least one of the plurality of spot irradiation images based on the information of the predetermined target object output from the detection device 120, and stores information indicating a layer of the selected spot irradiation image in the memory ME as information indicating the reference layer. The image generation unit 20 of the present embodiment generates an image by fading in the selected spot irradiation image on the low beam image 31, thereby generating the image in the middle of change and the image of the first light distribution pattern. As described above, the spot irradiation image is an image for forming the spot light distribution pattern by the light emitted from the light source unit 12, the spot light distribution pattern not overlapping at least a part of the low beam light distribution pattern PL1. Therefore, the image of the first light distribution pattern is an image representing the light distribution pattern in which such a spot light distribution pattern is added to the low beam light distribution pattern PL1.

The image generation unit 20 selects at least one spot irradiation image in such a way that the spot light distribution pattern added to the low beam light distribution pattern PL1 overlaps a portion of the predetermined target object that does not overlap the low beam light distribution pattern PL1. In the present embodiment, the image generation unit 20 selects the first spot irradiation image 37*a* to add a spot light distribution pattern overlapping a body of a human as the target object. In addition, the image generation unit 20 selects the second spot irradiation image 37*b*1 to add a spot light distribution pattern overlapping a head of the human, and selects another second spot irradiation image 37*b*2 to add a spot light distribution pattern overlapping a retroreflective object such as a sign as the target object.

Furthermore, in a case where a retroreflective object overlapping the low beam light distribution pattern PL1 is included in the predetermined target object, the image generation unit 20 of the present embodiment selects at least one of the plurality of darkened images 38 based on information of the retroreflective object. The image generation unit 20 stores information indicating a layer of the selected darkened image 38 in the memory ME as information indicating another reference layer. Then, when generating the image, the image generation unit 20 superimposes the selected darkened image 38 on a part of the low beam image 31. A brightness of the region 31*aa* overlapping the darkened image 38 in the low beam image 31 is darker than that before the darkened image 38 is superimposed. Therefore, the image in which the selected darkened image 38 is superimposed on a part of the low beam image 31 is an image representing a light distribution pattern obtained by decreasing the amount of light of a part of the low beam light distribution pattern PL1. Therefore, the image of the first light distribution pattern is an image representing such a light distribution pattern in which the spot light distribution pattern is added to the low beam light distribution pattern. The image generation unit 20 selects at least one of the plurality of darkened images 38 in such a way to obtain the low beam light distribution pattern PL1 obtained by decreasing the amount of light of a predetermined region overlapping the retroreflective object in the low beam light distribution pattern PL1. In a case where the darkened image 38 is not stored in the memory ME, the image generation unit 20 does not select the darkened image 38 described above.

In the present embodiment, the image generation unit 20 sequentially generates images by gradually increasing the opacity of the layer of the selected spot irradiation image and the layer of the selected darkened image 38 to 100% in a state where the opacity of the layer of the low beam image 31 is 100% and the opacity of all the other layers is 0%. That is, the image generation unit 20 simultaneously performs processing of fading in the selected spot irradiation image to the low beam image 31 and processing of superimposing the selected darkened image 38 on a part of the low beam image 31 and fading in the selected darkened image 38. The image of the first light distribution pattern is an image generated in a state where the opacity of the selected spot irradiation image is 100%, and the image generated in a state where the opacity is other than 100% is the image in the middle of change. The number of images in the middle of change may be one. In addition, a change period thereof is, for example, 1.0 s, and a time interval at which a plurality of images are generated is, for example, 0.01 s, but the change period and the time interval are not particularly limited.

The image generation unit 20 outputs a plurality of generated images to the control unit CO. Therefore, the image formed by the light source unit 12 sequentially changes from the low beam image 31 to the image of the first light distribution pattern. Therefore, the light distribution pattern of the light emitted from the vehicle headlight 1 gradually changes from the low beam light distribution pattern PL1 to the first light distribution pattern in which the spot light distribution pattern is added to the low beam light distribution pattern PL1. In addition, in a case where a retroreflective object overlapping the low beam light distribution pattern PL1 is included in the predetermined target object, the amount of light of the predetermined region in the low beam light distribution pattern PL1 gradually decreases at the time of the change. Therefore, the change of the light distribution pattern can be made look smooth. The image generation unit 20 may generate only the image representing the first light distribution pattern without generating the image in the middle of change. With such a configuration, an operation load of the image generation unit 20 can be reduced.

Figure 55:
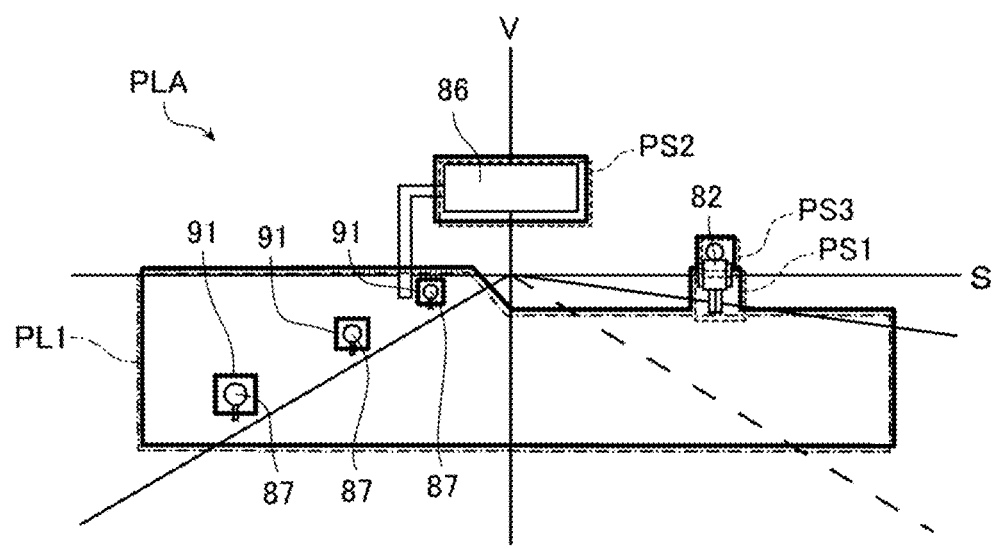
FIG. 55 is a view illustrating an example of a first light distribution pattern in the ninth embodiment similarly to FIG. 54.

FIG. 55 is a view illustrating an example of the first light distribution pattern in the present embodiment similarly to FIG. 54, and is a view illustrating the first light distribution pattern when the detection device 120 detects a human 82, and a sign 86 and delineators 87 as retroreflective objects. A first light distribution pattern PLA illustrated in FIG. 55 includes the low beam light distribution pattern PL1, a first spot light distribution pattern PS1, a second spot light distribution pattern PS2, and a third spot light distribution pattern PS3. In FIG. 55, the low beam light distribution pattern PL1 is indicated by a line with alternating long and short dashes, and the spot light distribution patterns PS1, PS2, and PS3 are indicated by broken lines. In addition, the low beam light distribution pattern PL1 and the spot light distribution patterns PS1, PS2, and PS3 are slightly shifted vertically and horizontally.

The first spot light distribution pattern PS1 is based on the first spot irradiation image 37a, and overlaps the body of the human 82 that does not overlap the low beam light distribution pattern PL1. A part of the first spot light distribution pattern PS1 overlaps the low beam light distribution pattern PL1. Therefore, with the vehicle headlight 1 of the present embodiment, it is possible to more easily visually recognize the human 82 and facilitate driving as compared with a case where a portion of the human 82 that does not overlap the low beam light distribution pattern PL1 is not irradiated with light. From the viewpoint of easily visually recognizing the human 82, the first spot light distribution pattern PS1 may overlap a portion of the human 82 that does not overlap the low beam light distribution pattern PL1. In addition, since the priority of the low beam image 31 is higher than the priority of the spot irradiation image, the amount of light of a region where the first spot light distribution pattern PS1 and the low beam light distribution pattern PL1 overlap each other is the amount of light of a region in the low beam light distribution pattern PL1. Therefore, the low beam light distribution pattern PL1 can be prevented from being affected by the first spot light distribution pattern PS1.

The second spot light distribution pattern PS2 is based on the second spot irradiation image 37b1, and overlaps the entire sign 86 that does not overlap the low beam light distribution pattern PL1. Therefore, with the vehicle headlight 1 of the present embodiment, it is possible to more easily visually recognize the sign 86 as compared with a case where the sign 86 that does not overlap the low beam light distribution pattern PL1 is not irradiated with light. From the viewpoint of easily visually recognizing the sign 86, the second spot light distribution pattern PS2 may overlap a portion of the sign 86 that does not overlap the low beam light distribution pattern PL1. The second spot light distribution pattern PS2 is darker than the first spot light distribution pattern PS1. Therefore, a brightness of light emitted to the sign 86 is lower than the brightness of light emitted to the human 82. Therefore, with the vehicle headlight 1 of the present embodiment, it is possible to further suppress glare to a driver of a host vehicle due to reflected light from the sign 86 while suppressing deterioration in visibility of the human 82 as compared with a case where the brightness of the light irradiated to the sign 86 is higher than the brightness of the light emitted to the human 82.

The third spot light distribution pattern PS3 is based on the second spot irradiation image 37b2, and overlaps the head of the human 82 that does not overlap the low beam light distribution pattern PL1. Therefore, with the vehicle headlight 1 of the present embodiment, it is possible to more easily visually recognize the human 82 and to improve an ability to alert the human 82 to the presence of the vehicle 100 as compared with a case where the head of the human 82 is not irradiated with light. The third spot light distribution pattern PS3 is darker than the first spot light distribution pattern PS1. Therefore, the brightness of the light emitted to the head of the human 82 is lower than the brightness of the light emitted to the body of the human 82. Therefore, with the vehicle headlight 1 of the present embodiment, it is possible to further suppress glare to the human 82 while suppressing deterioration in visibility of the human 82 as compared with a case where the brightness of the light emitted to the head of the human 82 is higher than the brightness of the light emitted to the body of the human 82.

Further, the amount of light of a predetermined region 91 overlapping the delineator 87 in the low beam light distribution pattern PL1 is smaller than the amount of light of the predetermined region 91 when the delineator 87 is not detected. Therefore, with the vehicle headlight 1 of the present embodiment, it is possible to suppress glare to the driver of the host vehicle due to reflected light from the delineator 87.

Here, in a case where at least one of the reference layers stored in the memory ME is different from at least one of the layers of the selected spot irradiation image and the selected darkened image 38 due to a change in input information of the predetermined target object, the image generation unit 20 generates an image as follows. The image generation unit 20 generates an image of another first light distribution pattern based on the selected spot irradiation image or darkened image 38 as an image representing a light distribution pattern after the change, and generates an image in the middle of change. The image generation unit 20 generates an image by superimposing the image of the another first light distribution pattern on at least a part of the image of the first light distribution pattern PLA before the change and fading in the image of the another first light distribution pattern, and fading out the image of the first light distribution pattern PLA before the change. In the image of the first light distribution pattern PLA before the change and the image of the another first light distribution pattern that is the image after the change, portions different from each other are at least a part of a portion where the selected spot irradiation image or darkened image 38 is positioned, and the other portions are the same. Therefore, the image generation unit 20 of the present embodiment gradually increases the opacity of the spot irradiation image or the darkened image 38 added when generating the image of the another first light distribution pattern to 100% in a state where each layer has an opacity for generating the image of the first light distribution pattern PLA before the change. In addition, the image generation unit 20 gradually decreases the opacity of the spot irradiation image or the darkened image 38 that is not selected when the image of the another first light distribution pattern is generated to 0%. The image generation unit 20 sequentially generates images by gradually changing the opacity in this manner. The image of the another first light distribution pattern is generated in a state where the layer of the spot irradiation image or the darkened image 38 to be added has an opacity of 100% and the layer of the spot irradiation image or the darkened image 38 that is not selected has an opacity of 0%. In addition, an image generated in a state where the opacity of the layer of the spot irradiation image or the darkened image 38 to be added is other than 100% or the opacity of the layer of the spot irradiation image or the darkened image 38 that is not selected is other than 0% is an image in the middle of change. The opacity is changed in such a way that the total value of the gradually increased opacity and the gradually decreased opacity is 100, but the total value does not have to be 100, and there may be one image in the middle of change generated by the image generation unit 20. In addition, a change period and a time interval at which the images are generated in this case are the same as those in a case of generating the image of the first light distribution pattern PLA described above, but are not particularly limited.

The image generation unit 20 rewrites the reference layer stored in the memory ME with the layers of the spot irradiation image and the darkened image 38 selected when the image of the another first light distribution pattern is generated, and outputs information of a plurality of generated images to the control unit CO. Therefore, the image formed by the light source unit 12 sequentially changes from the image of the first light distribution pattern PLA to the image of the another first light distribution pattern. Therefore, the light distribution pattern of the light emitted from the vehicle headlight 1 gradually changes from the first light distribution pattern PLA to the another first light distribution pattern. Therefore, the change of the light distribution pattern can be made look smooth. The image generation unit 20 may generate only the image of the another first light distribution pattern without generating the image in the middle of change, and output information of the generated image to the control unit CO. With such a configuration, an operation load of the image generation unit 20 can be reduced.

Furthermore, in a case where the information from the detection device 120 is not input in a state where the information of the predetermined target object output from the detection device 120 is input when the previous image is generated, the image generation unit 20 generates an image in the middle of change together with the low beam image 31. Specifically, the image generation unit 20 sequentially generates images by gradually decreasing the opacity of the spot irradiation image and the darkened image 38 selected at the time of generating the images to 0% in a state where each layer has an opacity for generating the previous image. The low beam image 31 is generated in a state where the opacity of the spot irradiation image and the darkened image 38 is 0%, and an image generated in a state where the opacity is other than 0% is an image in the middle of change. There may be one image in the middle of change generated by the image generation unit 20. In addition, a change period and a time interval at which the images are generated in this case are the same as those in a case of generating the image of the first light distribution pattern PLA described above, but are not particularly limited.

The image generation unit 20 deletes the reference layer stored in the memory ME and outputs the plurality of generated images to the control unit co. Therefore, the image formed by the light source unit 12 sequentially changes from the image of the first light distribution pattern PLA corresponding to the predetermined target object to the low beam image 31. Therefore, the light distribution pattern of the light emitted from the vehicle headlight 1 gradually changes from the first light distribution pattern PLA to the low beam light distribution pattern PL1. Therefore, the change of the light distribution pattern can be made look smooth. The image generation unit 20 may generate only the low beam image 31 without generating the image in the middle of change, and output information of the generated image to the control unit CO. With such a configuration, an operation load of the image generation unit 20 can be reduced.

Meanwhile, in order to improve the visibility of a sign, a human such as a pedestrian, or the like positioned outside a range irradiated with a low beam and facilitate driving, it is conceivable to change the low beam light distribution pattern to a light distribution pattern in which a light distribution pattern overlapping a sign, a human, or the like is added to the low beam light distribution pattern as described above. The number of light distribution patterns changed according to a sign, a human, or the like is, for example, the number of combinations of target objects in a target object group including a plurality of signs, humans, or the like at different positions. For this reason, for example, in the vehicle headlight described in Patent Literature 1 described above, in a case where the low beam light distribution pattern is changed as described above, it is necessary to store information regarding the amount of light emitted from each micro LED for each of such a large number of light distribution patterns in the memory, and the amount of information stored in the memory increases.

Therefore, in the present embodiment as the ninth aspect, the memory ME stores the low beam image 31 as the reference image for forming the low beam light distribution pattern PL1 as the reference light distribution pattern by the light emitted from the light source unit 12, and the plurality of spot irradiation images for forming the spot light distribution patterns PS1, PS2, and PS3 different from each other by the light emitted from the light source unit 12. At least some of the spot light distribution patterns PS1, PS2, and PS3 do not overlap the low beam light distribution pattern PL1. The image generation unit 20 selects at least one of the plurality of spot irradiation images based on the information from the detection device 120 that detects the predetermined target object. In addition, the image generation unit 20 generates an image for forming the first light distribution pattern PLA by the light emitted from the light source unit 12 from the selected spot irradiation image and the low beam image 31. The first light distribution pattern PLA is a light distribution pattern in which the spot light distribution patterns PS1, PS2, and PS3 overlapping a portion of the predetermined target object that does not overlap the low beam light distribution pattern PL1 are added to the low beam light distribution pattern PL1.

Therefore, as described above, the vehicle headlight 1 of the present embodiment as the ninth aspect can change the light distribution pattern of the emitted light according to a situation in front of the vehicle 100 from the low beam light distribution pattern PL1 to the first light distribution pattern PLA, and can irradiate a portion of the predetermined target object that does not overlap the low beam light distribution pattern PL1 with light. Therefore, with the vehicle headlight 1 of the present embodiment as the ninth aspect, it is possible to more easily visually recognize the predetermined target object and facilitate driving as compared with a case where a portion of the predetermined target object that does not overlap the low beam light distribution pattern PL1 is not irradiated with light. In addition, in the vehicle headlight 1 of the present embodiment as the ninth aspect, the image generation unit 20 generates an image representing the first light distribution pattern PLA from at least one spot irradiation image selected from the plurality of spot irradiation images and the low beam image 31. Therefore, the number of generatable images representing the first light distribution pattern PLA is the number of combinations of the plurality of spot irradiation images. However, the information stored in the memory ME is the spot irradiation image and the reference image. Therefore, with the vehicle headlight 1 of the present embodiment as the ninth aspect, it is possible to further suppress an increase in amount of information stored in the memory ME as compared with a case of storing all the images representing the first light distribution pattern PLA that can be generated by the image generation unit 20 are stored in the memory ME.

In addition, in the vehicle headlight 1 of the present embodiment as the ninth aspect, the plurality of spot irradiation images include the plurality of first spot irradiation images 37a including the first image element fe and the plurality of second spot irradiation images 37b1 and 37b2 including the second image element se darker than the first image element fe. Therefore, the vehicle headlight 1 of the present embodiment as the ninth aspect can change the brightness of light to be emitted according to the target object. Then, as described above, the vehicle headlight 1 of the present embodiment as the ninth aspect can decrease the brightness of the light emitted to the sign 86 as the retroreflective object to be lower than the brightness of the light emitted to the body of the human 82. Therefore, with the vehicle headlight 1 of the present embodiment as the ninth aspect, it is possible to further suppress glare to the driver of the host vehicle due to reflected light from the sign 86 while suppressing deterioration in visibility of the human 82 as compared with a case where the brightness of the light irradiated to the sign 86 is higher than the brightness of the light emitted to the body of the human 82. From the viewpoint of changing the brightness of the light to be emitted according to the target object, the first spot irradiation image 37a may include the first image element fe, and the second spot irradiation images 37b1 and 37b2 may include the second image element se. For example, the first spot irradiation image 37a and the second spot irradiation images 37b1 and 37b2 may include the first image element fe and the second image element se.

In the vehicle headlight 1 of the present embodiment as the ninth aspect, the image generation unit 20 uses the layer function. The priority of the layer 27L in which the first spot irradiation image 37a including the first image element fe is arranged is lower than the priorities of the layers 27L in which the second spot irradiation images 37b1 and 37b2 including the second image element se are arranged. Therefore, when generating the image representing the first light distribution pattern PLA, the image generation unit 20 sets a brightness of a region where the first image element fe and the second image element se overlap each other to a brightness of a region in the second image element se. Therefore, with the vehicle headlight 1 of the present embodiment as the ninth aspect, it is possible to suppress the brightness of the light emitted to the sign 86 as the retroreflective object from unintentionally becoming higher than the brightness of the light emitted to the human 82, and it is possible to suppress glare to the driver of the host vehicle due to reflected light from the sign 86. The image generation unit 20 may set the brightness of the region where the first image element fe and the second image element se overlap each other as the brightness of the region in the second image element se without using the layer function.

Furthermore, in the vehicle headlight 1 according to the present embodiment as the ninth aspect, the memory ME further stores the plurality of darkened images 38. The plurality of darkened images 38 are images at least partially overlapping the low beam image 31 as the reference image. In addition, at least parts of the plurality of darkened images 38 that overlap the region 31aa of the low beam image 31 are different from each other, and are darker than the low beam image 31 of the region 31aa. The image generation unit 20 selects at least one darkened image 38 from the plurality of darkened images 38 based on the information from the detection device 120. In addition, the image generation unit 20 generates an image representing a light distribution pattern obtained by decreasing the amount of light of the predetermined region 91 overlapping the retroreflective object of the low beam light distribution pattern PL1 in the first light distribution pattern PLA to be smaller than the amount of light of the predetermined region 91 of the low beam light distribution pattern PL1, by superimposing the selected darkened image 38 on the low beam image 31. Therefore, as described above, the vehicle headlight 1 of the present embodiment as the ninth aspect can decrease the amount of reflected light reflected by the delineator 87 as the retroreflective object toward the vehicle 100, and can suppress glare to the driver due to the reflected light.

Although the ninth aspect of the present invention has been described by taking the ninth embodiment as an example, the ninth aspect of the present invention is not limited thereto.

For example, in the ninth embodiment, the image generation unit 20 that changes an image to be generated according to a change of the information of the predetermined target object input from the detection device 120 has been described as an example. However, as the ninth aspect, the image generation unit 20 may change an image to be generated even in a case where the information input from the detection device 120 does not change. For example, when the information of the predetermined target object is input from the detection device 120, the image generation unit 20 may alternately generate an image for forming the first light distribution pattern PLA corresponding to the predetermined target object by the light emitted from the light source unit 12 and an image for forming the second light distribution pattern by the light emitted from the light source unit 12 at predetermined time intervals. The second light distribution pattern is a light distribution pattern obtained by changing the amount of light of at least a part of the spot light distribution pattern in the first light distribution pattern PLA. That is, the image generation unit 20 changes the selected spot irradiation image from the spot irradiation image selected at the time of generating the image representing the first light distribution pattern PLA in such a way that an image representing such a second light distribution pattern is generated. Then, the image generation unit 20 generates an image representing the second light distribution pattern from the selected spot irradiation image and the low beam image 31. At least a part of the amount of light in the spot light distribution pattern may increase or decrease from that before the change. For example, examples of the second light distribution pattern can include a light distribution pattern obtained by changing the total amount of light of the first spot light distribution pattern PS1 and the third spot light distribution pattern PS3 in the first light distribution pattern PLA illustrated in FIG. 55. With such a configuration, the amount of light emitted to the human 82 as the target object can be periodically changed according to the lapse of time. Therefore, with the vehicle headlight 1 as the ninth aspect, it is possible to enhance an ability to alert the driver of the host vehicle to the presence of the human 82 as the target object and to enhance an ability to alert the human 82 to the presence of the vehicle 100. The target object for which the amount of light of the emitted light is periodically changed is not limited to the human 82. The second light distribution pattern may be a light distribution pattern obtained by removing the spot light distribution pattern overlapping the predetermined target object from the first light distribution pattern PLA. Examples of such a second light distribution pattern can include a light distribution pattern obtained by removing the first spot light distribution pattern PS1 and the third spot light distribution pattern PS3 from the first light distribution pattern PLA illustrated in FIG. 55. With such a configuration, light emitted to the human 82 as the target object can blink. In this case, for example, in a state where each layer has an opacity for generating the image of the first light distribution pattern PLA, the image generation unit 20 generates an image by alternately changing the opacity of the first spot irradiation image 37a representing the first spot light distribution pattern PS1 and the second spot irradiation image 37b2 representing the third spot light distribution pattern PS3 to 0% and 100%. In this way, the image of the first light distribution pattern PLA and the image of the second light distribution pattern are alternately generated. A time interval at which the image of the first light distribution pattern PLA and the image of the second light distribution pattern are generated is not particularly limited, and is, for example, 0.1 s. In addition, the image generation unit 20 may store the generated image of the first light distribution pattern PLA and the generated image of the second light distribution pattern in the memory ME, and alternately output the two images to the control unit CO during a predetermined period. In this case, for example, the image generation unit 20 generates a new image of the first light distribution pattern PLA and a new image of the second light distribution pattern immediately after the lapse of the predetermined period, stores the generated two images in the memory ME, and alternately outputs the two images to the control unit Co during another predetermined period immediately after the lapse of the predetermined period. Then, the image generation unit 20 repeats generation of the image of the first light distribution pattern PLA and the image of the second light distribution pattern and alternate output of the generated two images. With such a configuration, an operation load of the image generation unit 20 can be reduced. The predetermined period is, for example, 1.0 s, but is not particularly limited.

In the ninth embodiment, the memory ME in which the low beam image 31 is stored as the reference image has been described as an example. However, as the ninth aspect, it is sufficient if the reference image stored in the memory ME is an image for forming the reference light distribution pattern that is at least a part of the low beam light distribution pattern PL1 by the light emitted from the light source unit 12, and the reference image stored in the memory ME may be an image for forming a part of the low beam light distribution pattern PL1 by the light emitted from the light source unit 12. In this case, for example, a lamp portion 5 includes a lamp unit 10 and another lamp unit. Then, a portion of the low beam light distribution pattern PL1 that is not represented by the reference image is formed by light from the another lamp unit. A part of the low beam light distribution pattern PL1 indicated by the reference image may overlap a light distribution pattern formed by light from the another lamp unit. Further, a configuration of the another lamp unit is not particularly limited.

In addition, in the ninth embodiment, the first spot irradiation image 37a representing the first spot light distribution pattern PS1 overlapping the body of the human 82 and the second spot irradiation image 37b2 representing the third spot light distribution pattern PS3 overlapping the head of the human 82 have been described as examples. However, as the ninth aspect, the first spot light distribution pattern PS1 may overlap at least a part of the body of the human 82 and at least a part of the head of the human 82. The priority of the layer 27L in which the first spot irradiation image 37a is arranged is lower than the priority of the layer 27L in which the second spot irradiation image 37b2 is arranged. Therefore, a region where the first spot light distribution pattern PS1 and the third spot light distribution pattern PS3 overlap each other is a pattern of the region in the third spot light distribution pattern PS3. Therefore, even in a case where the first spot light distribution pattern PS1 is configured as described above, it is possible to suppress the brightness of the light emitted to the head of the human 82 from becoming higher than the brightness of the light emitted to the body of the human 82 as in the ninth embodiment.

Furthermore, in the ninth embodiment, the image generation unit 20 that generates an image using each layer whose opacity is adjustable has been described as an example. However, as the ninth aspect, an image generation method of the image generation unit 20 is not particularly limited, and an image may be generated by a method not using the layer. In this case, for example, pixels included in an image excluding the darkened images 38 for reducing the brightness by superimposition are set as pixels for which the same grayscale value is set and the opacity is adjusted to express the grayscale level. Furthermore, pixels included in the darkened images 38 are set as pixels for which the grayscale value is set to 0 and the opacity is adjusted to express the grayscale level. In a case where images other than the darkened images 38 are superimposed, the opacity of the pixels in the overlapping region is calculated by weighted addition of the opacities of the pixels of the respective images. In a case where the darkened images 38 and the images other than the darkened images 38 are superimposed, the opacity of the pixels in the overlapping region is calculated by weighted averaging of the opacities of the pixels of the respective images. In a case of generating an image by using a method in which data such as the opacity of pixels included in the image can be individually changed in this manner, for example, a brightness of a region where the low beam light distribution pattern PL1 and the spot light distribution pattern overlap each other can be made higher than the brightness of the region in the low beam light distribution pattern PL1. Therefore, with such a configuration, light emitted to a portion of the predetermined target object that overlaps the low beam light distribution pattern PL1 can be made brighter. Furthermore, in a case where the darkened images 38 are superimposed, for example, the opacity of the pixels in the overlapping region may be calculated by weighted averaging of the opacities of the pixels of the respective darkened images 38. Alternatively, in a case where the darkened images 38 are superimposed, the pixels in the overlapping region may be the pixels in the overlapping region in one of the darkened images 38 overlapping each other. In the latter case, it is possible to suppress formation of a region darker than intended in the low beam light distribution pattern PL1.

In addition, similarly to the first aspect, as the ninth aspect, the light source unit 12 may include a plurality of light emitting units capable of individually changing the amount of light to be emitted, and emits light based on the image generated by the image generation unit 20. For example, the light source unit 12 may include a DMD including a plurality of reflective elements arranged in a matrix and a light emission unit that irradiates the DMD with light.

In addition, similarly to the first aspect, as the ninth aspect, at least one of the control unit CO, the image generation unit 20, or the memory ME may be shared by the pair of vehicle headlights 1. Furthermore, a signal output from the detection device 120 may be input to the image generation unit 20 without passing through the ECU 101 of the vehicle 100. In addition, a vehicle including the vehicle headlight 1, the number of vehicle headlights 1 included in a vehicle, and the like are not particularly limited. For example, in a case where the vehicle is a two-wheeled vehicle, the number of vehicle headlights 1 may be one.

According to the first aspect and the fourth to seventh aspects of the present invention, there is provided a vehicle headlight capable of suppressing an uncomfortable feeling for a change of a light distribution pattern of emitted light while suppressing an increase in amount of information, and the vehicle headlight can be used in the field of vehicle headlights of automobiles and the like. In addition, according to the second, third, and eighth aspects of the present invention, there is provided a vehicle headlight a capable of controlling light distribution while suppressing an increase in amount of information, and the vehicle headlight can be used in the field of vehicle headlights of automobiles and the like. Furthermore, according to the ninth aspect of the present invention, there is provided a vehicle headlight that can facilitate driving while suppressing an increase in amount of information, and the vehicle headlight can be used in the field of vehicle headlights of automobiles and the like.

The invention claimed is:

1. A vehicle headlight comprising:
an image generation unit configured to generate an image representing a light distribution pattern including a reference light distribution pattern that is at least a part of a low beam light distribution pattern or at least a part of a high beam light distribution pattern;
a light source unit including a plurality of light emitting units and configured to emit light based on the image generated by the image generation unit, the plurality of light emitting units being configured to individually change an amount of light to be emitted, and arranged in a matrix; and
a memory configured to store a reference image for forming the reference light distribution pattern by light emitted from the light source unit and a plurality of additional images to be superimposed on a part of the reference image, wherein
each of the plurality of additional images is one of a plurality of darkened images of which at least parts overlapping a region of the reference image are different from each other and which are darker than the reference image of the region, and a plurality of brightened images of which at least parts overlapping a region of the reference image are different from each other and which are brighter than the reference image of the region, and
the image generation unit generates the image for forming a predetermined light distribution pattern by light emitted from the light source unit by selecting at least one additional image from among the plurality of additional images based on information from a detection device that detects a predetermined target object positioned in front of a vehicle and superimposing the selected additional image on a part of the reference image, the predetermined light distribution pattern being obtained by changing an amount of light of a predetermined region overlapping the predetermined target object in the reference light distribution pattern.

2. The vehicle headlight according to claim 1, wherein the plurality of darkened images include a slightly darkened image including a first image element and a highly darkened image including a second image element darker than the first image element.

3. The vehicle headlight according to claim 1, wherein the image generation unit generates the image by superimposing the selected additional image on a part of the reference image and fading in the additional image.

4. The vehicle headlight according to claim 1, wherein after generating the image representing the predetermined light distribution pattern, the image generation unit generates the image by fading out the additional image selected from the image in such a way that the image becomes the reference image.

5. The vehicle headlight according to claim 1, wherein the memory stores a drawing image for forming a drawing light distribution pattern in which light emitted from the light source unit draws a predetermined character on a road surface, and
the image generation unit generates the image by superimposing the drawing image on at least a part of the reference image.

6. A vehicle headlight comprising:
an image generation unit configured to generate an image representing a light distribution pattern including a reference light distribution pattern that is at least a part of a low beam light distribution pattern;
a light source unit including a plurality of light emitting units and configured to emit light based on the image generated by the image generation unit, the plurality of light emitting units being configured to individually change an amount of light to be emitted, and arranged in a matrix; and
a memory configured to store a reference image for forming the reference light distribution pattern by light emitted from the light source unit, and a plurality of spot irradiation images for forming different spot light distribution patterns by light emitted from the light source unit, wherein
at least some of the spot light distribution patterns do not overlap the low beam light distribution pattern,
the image generation unit selects at least one of the plurality of spot irradiation images based on information from a detection device that detects a predetermined target object positioned in front of a vehicle, and generates the image for forming a first light distribution pattern by light emitted from the light source unit from the selected spot irradiation image and the reference image, and
the first light distribution pattern is a light distribution pattern in which the spot light distribution pattern overlapping a portion of the predetermined target object that does not overlap the low beam light distribution pattern is added to the reference light distribution pattern.

7. The vehicle headlight according to claim 6, wherein the plurality of spot irradiation images include a first spot irradiation image including a first image element and a second spot irradiation image including a second image element darker than the first image element.

8. The vehicle headlight according to claim 7, wherein when generating the image, the image generation unit sets a brightness of a region in which the first image element and the second image element overlap each other as a brightness of the region in the second image element.

9. The vehicle headlight according to claim 6, wherein the image generation unit alternately generates the image for forming the first light distribution pattern by light emitted from the light source unit and the image for forming a second light distribution pattern by light emitted from the light source unit, and the second light distribution pattern is a light distribution pattern obtained by changing an amount of light of at least a part of the spot light distribution pattern in the first light distribution pattern.

10. The vehicle headlight according to claim 9, wherein the second light distribution pattern is a light distribution pattern obtained by removing the spot light distribution pattern overlapping the predetermined target object from the first light distribution pattern.

* * * * *